United States Patent [19]

Wallman

[11] Patent Number: 4,736,316

[45] Date of Patent: Apr. 5, 1988

[54] MINIMUM TIME, OPTIMIZING AND STABILIZING MULTIVARIABLE CONTROL METHOD AND SYSTEM USING A CONSTRAINT ASSOCIATED CONTROL CODE

[75] Inventor: P. Henrik Wallman, Berkeley, Calif.

[73] Assignee: Chevron Research Company, San Francisco, Calif.

[21] Appl. No.: 894,423

[22] Filed: Aug. 6, 1986

[51] Int. Cl.⁴ .............................................. G05B 13/04
[52] U.S. Cl. .................................. 364/149; 364/151; 364/153; 364/157; 364/159; 364/501
[58] Field of Search ............... 364/149, 151, 153, 157, 364/159, 501

[56] References Cited

U.S. PATENT DOCUMENTS

| | | | |
|---|---|---|---|
| 4,228,509 | 10/1980 | Kennedy | 364/501 |
| 4,349,869 | 9/1982 | Prett et al. | 364/149 |
| 4,358,822 | 11/1982 | Sánchez | 364/501 |
| 4,368,509 | 1/1983 | Li | 364/149 |
| 4,639,853 | 1/1987 | Rake et al. | 364/151 |

*Primary Examiner*—Michael R. Fleming
*Assistant Examiner*—John R. Lastova
*Attorney, Agent, or Firm*—S. R. LaPaglia; E. J. Keeling; H. D. Messner

[57] ABSTRACT

In accordance with the present invention, a constraint dependent control method and system for a large scale refinery, chemical process or the like, is provided that allows on-line optimization of one and preferably two plant inputs without need for optimal set points, through iterative generation of a constraint dependent control code normalized to present time t for "driving" the optimized plant inputs rapidly toward optimization but without destabilizing the plant. The generation of such control code includes evaluation of certain key components associated with elements of an optimizing and stabilizing control vector (OSC) from which the code is derived.

103 Claims, 16 Drawing Sheets

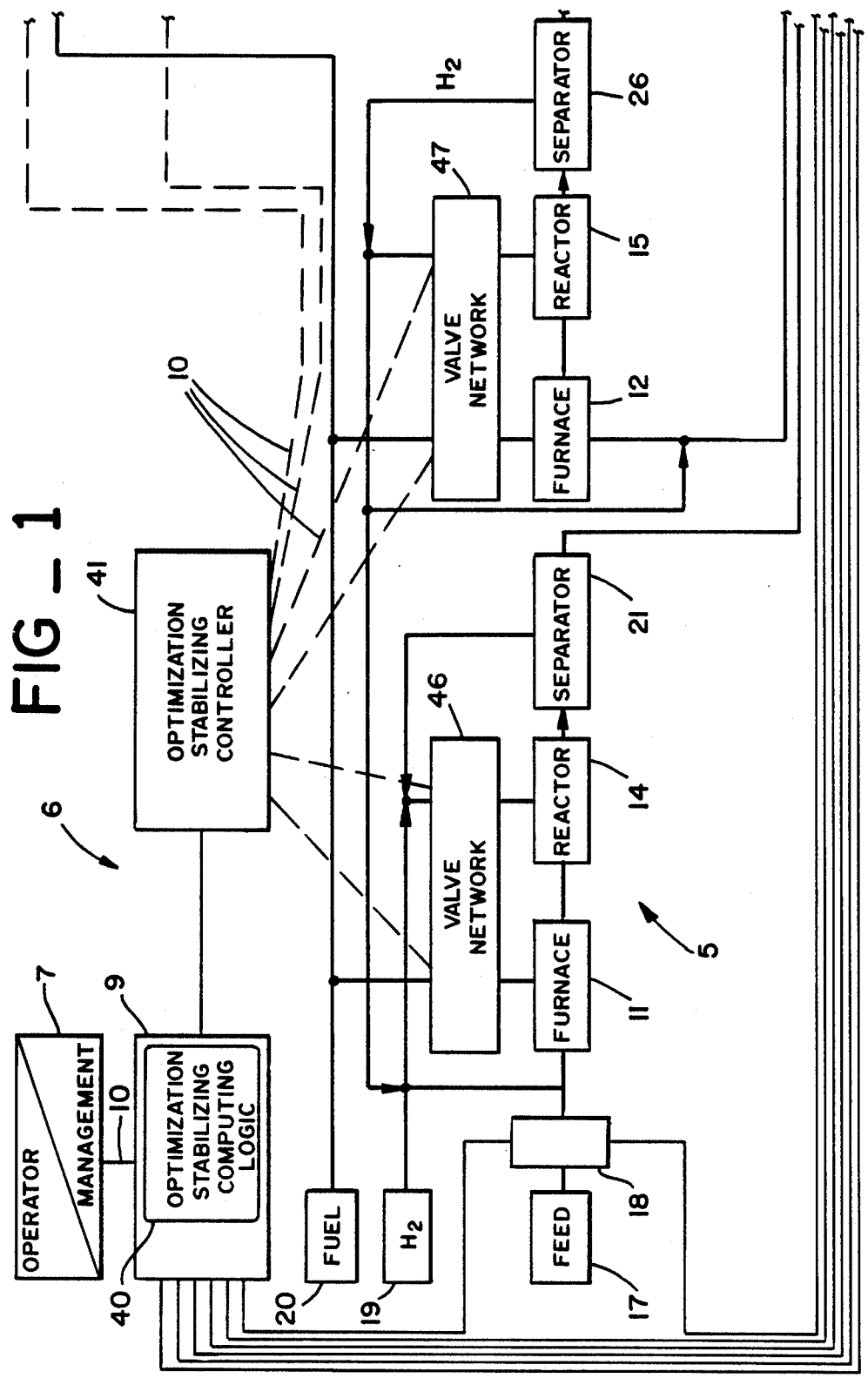

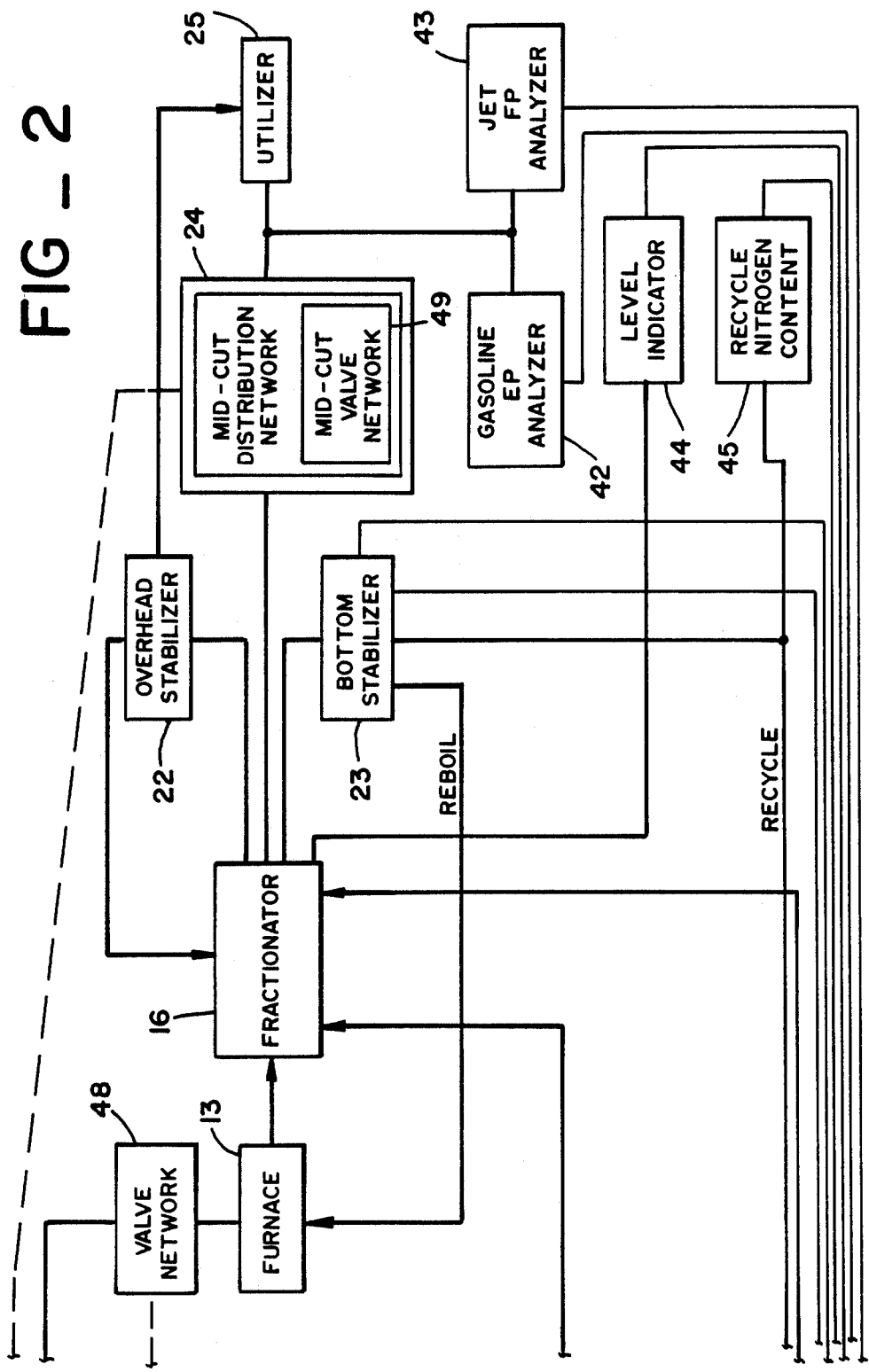
FIG_2

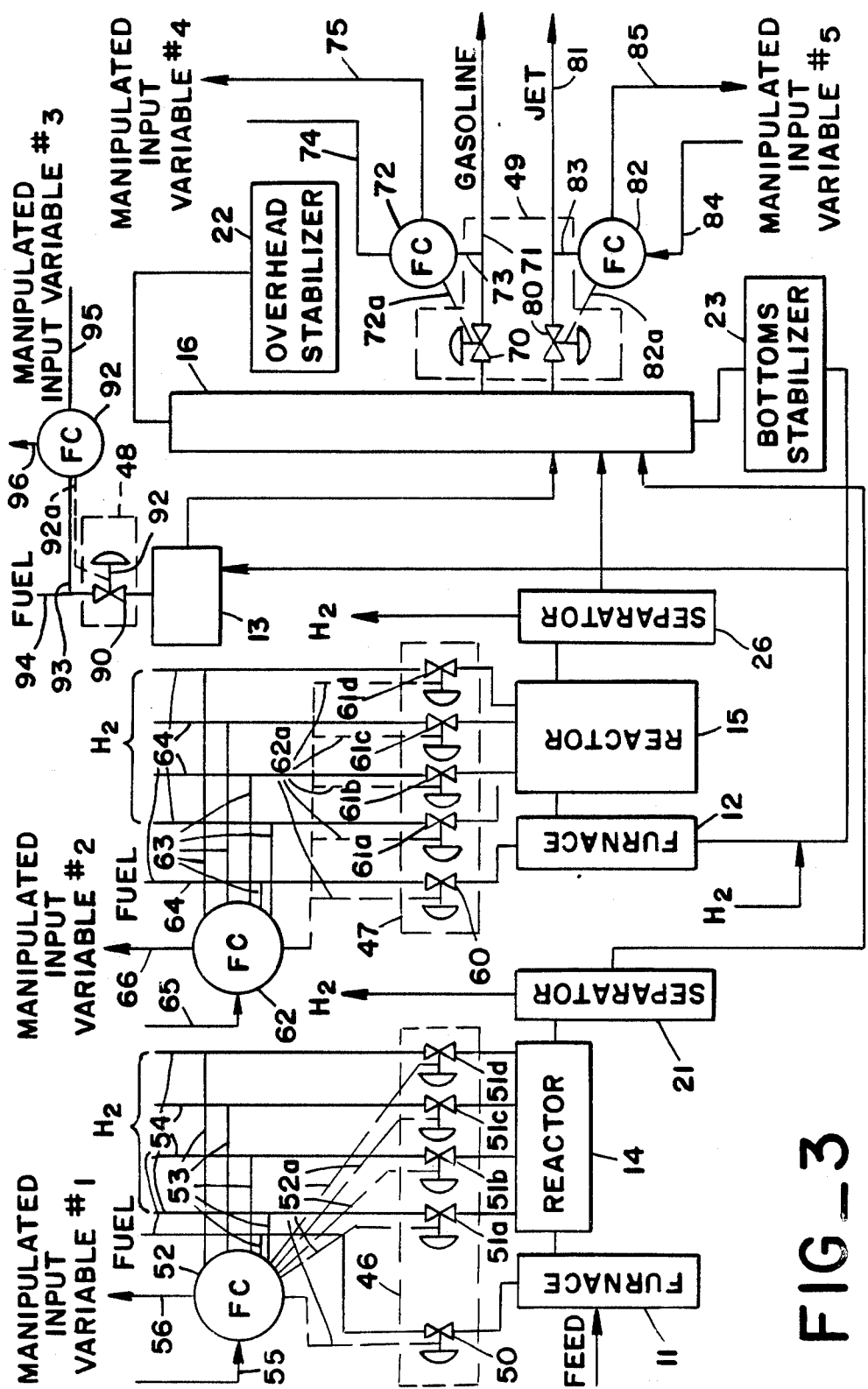
FIG_3

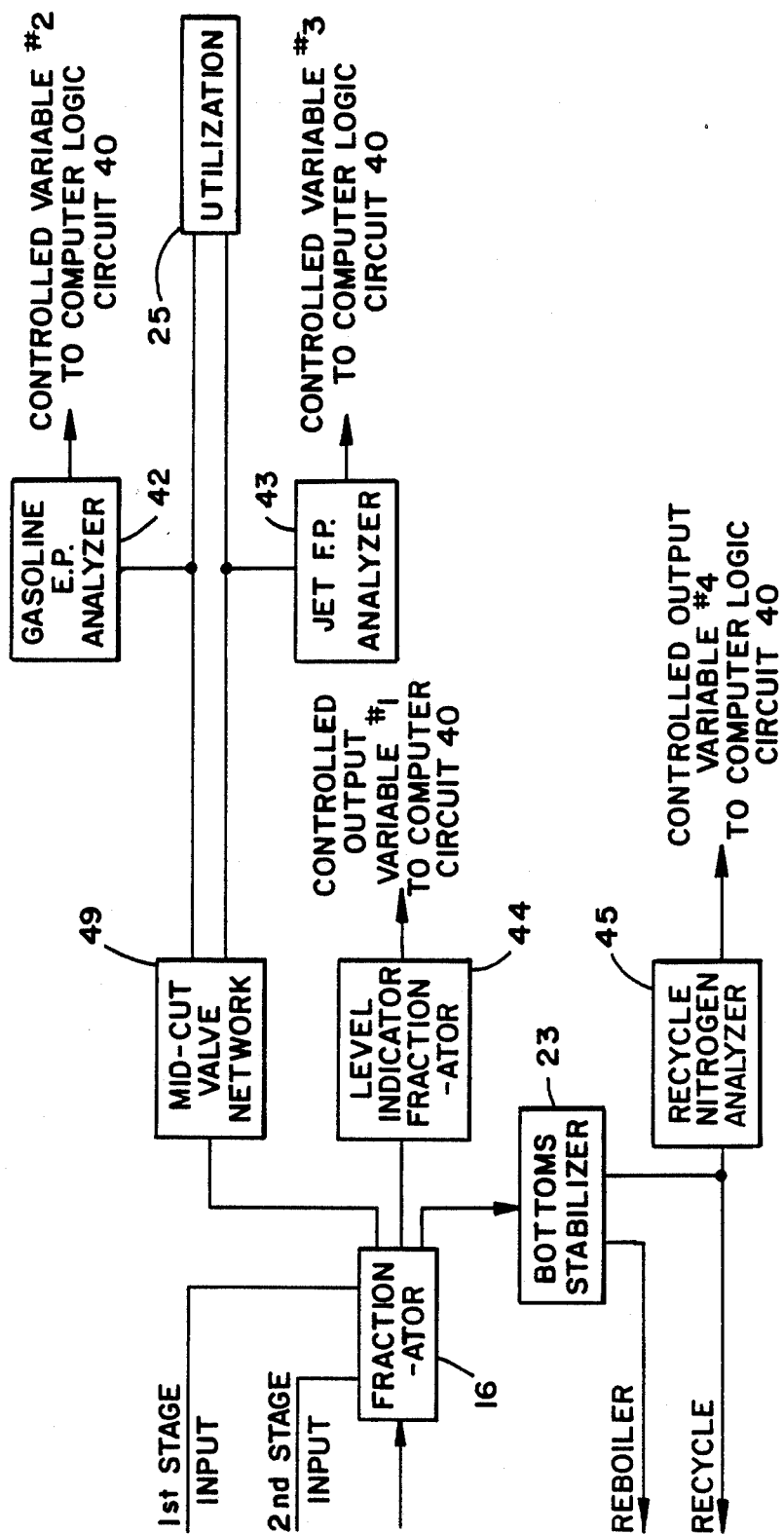
FIG_4

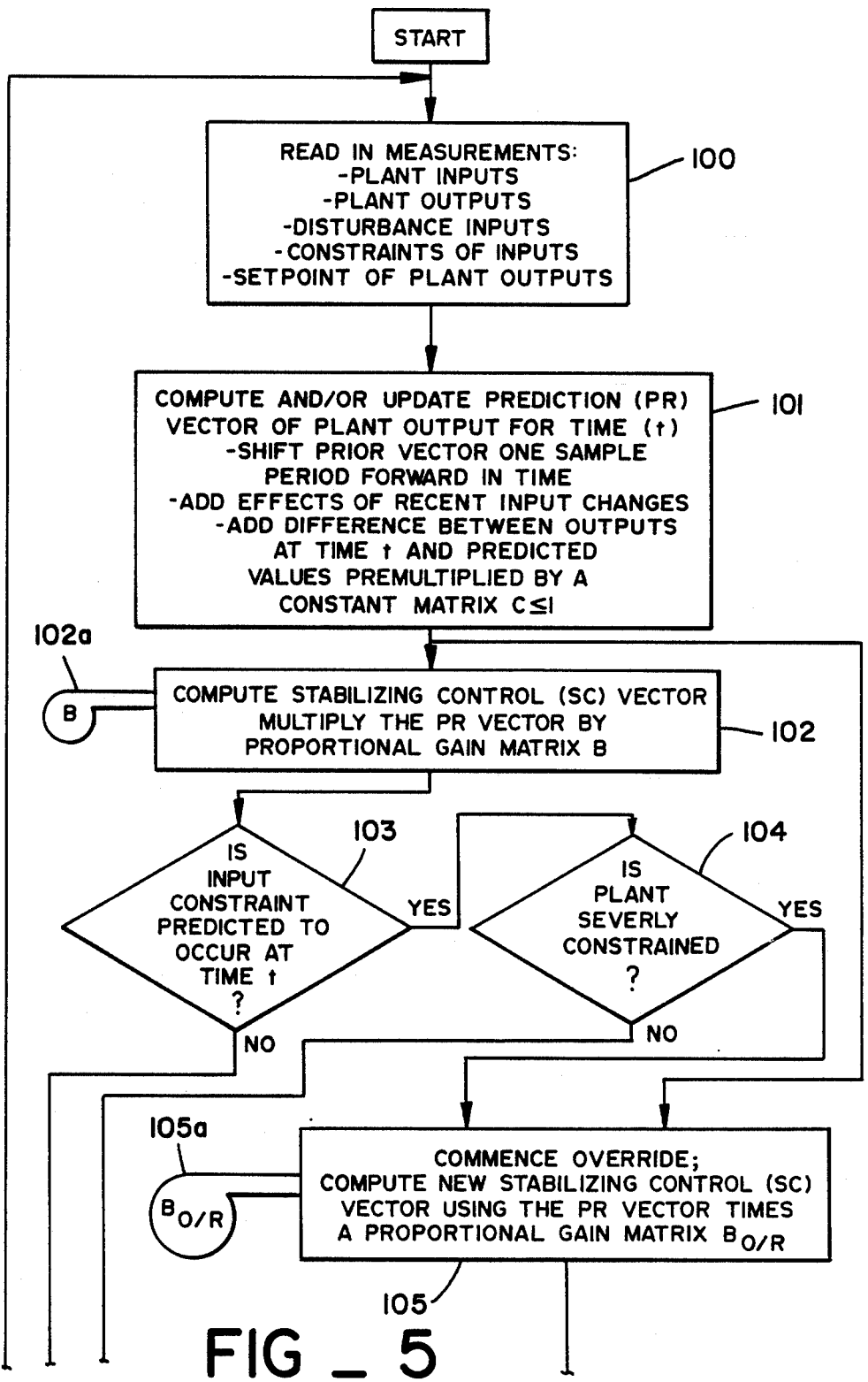
FIG_5

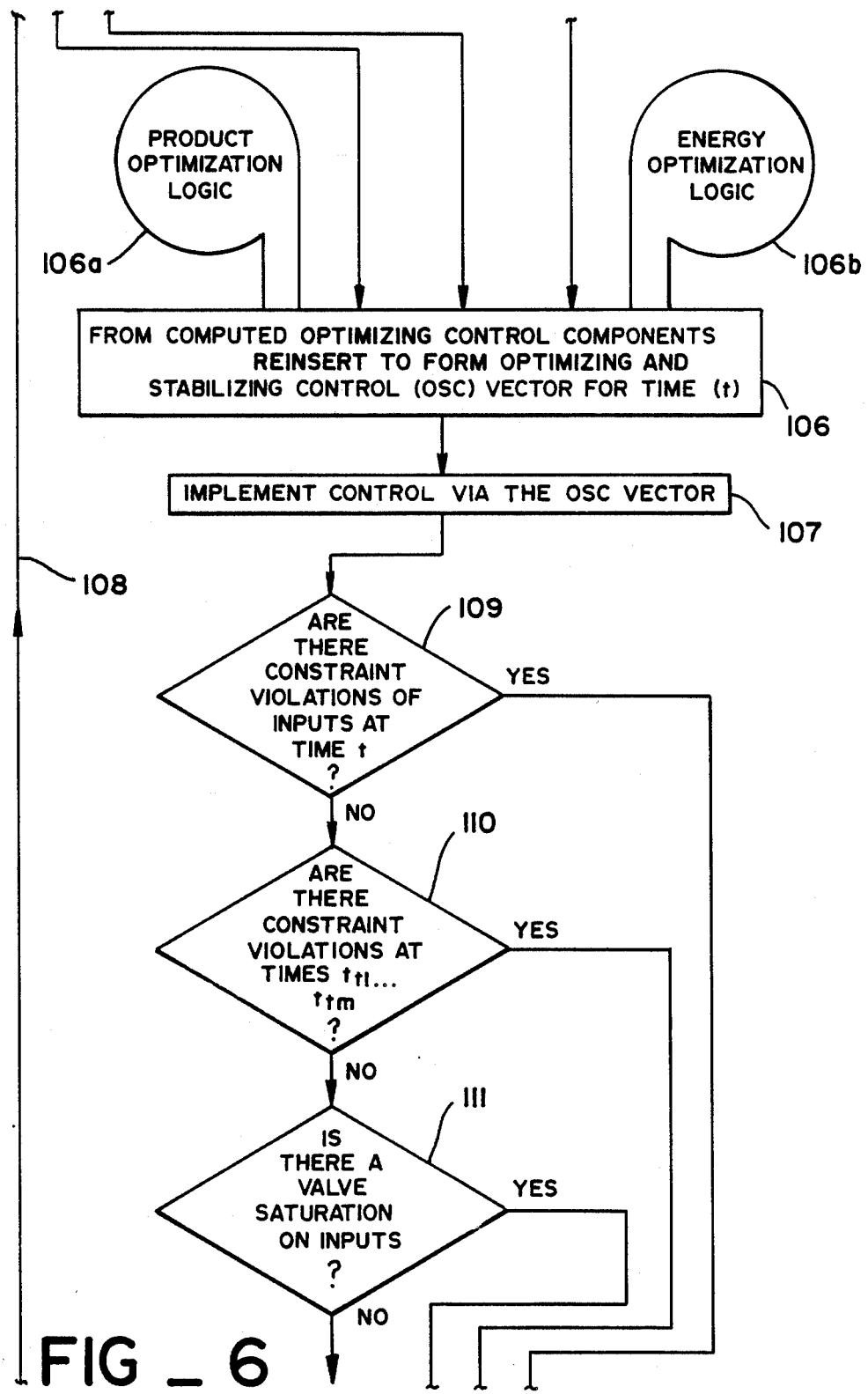
FIG_6

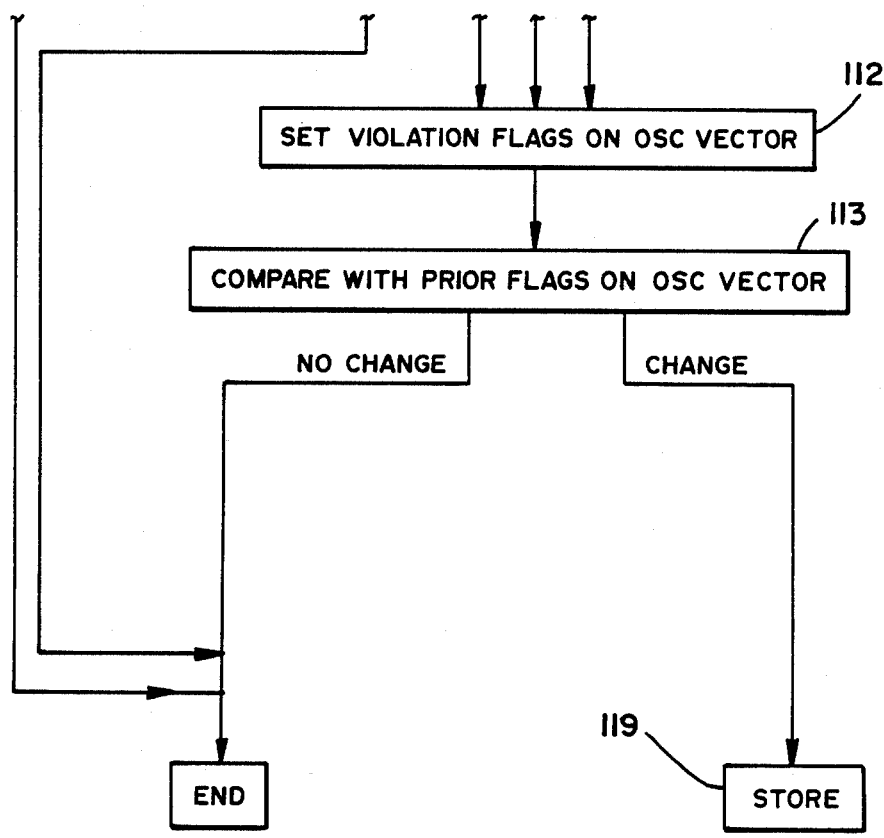
FIG _ 7

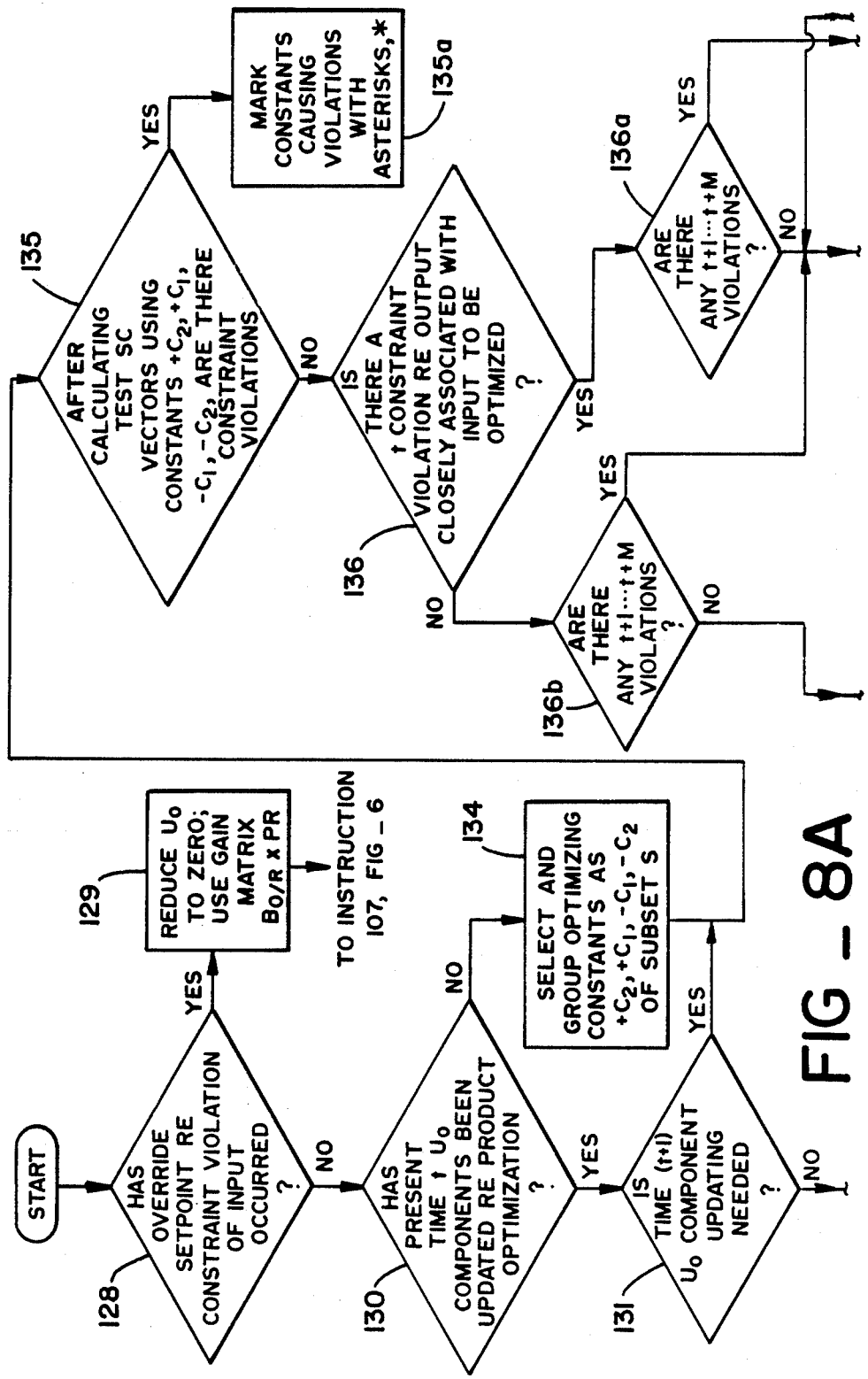
FIG.—8A

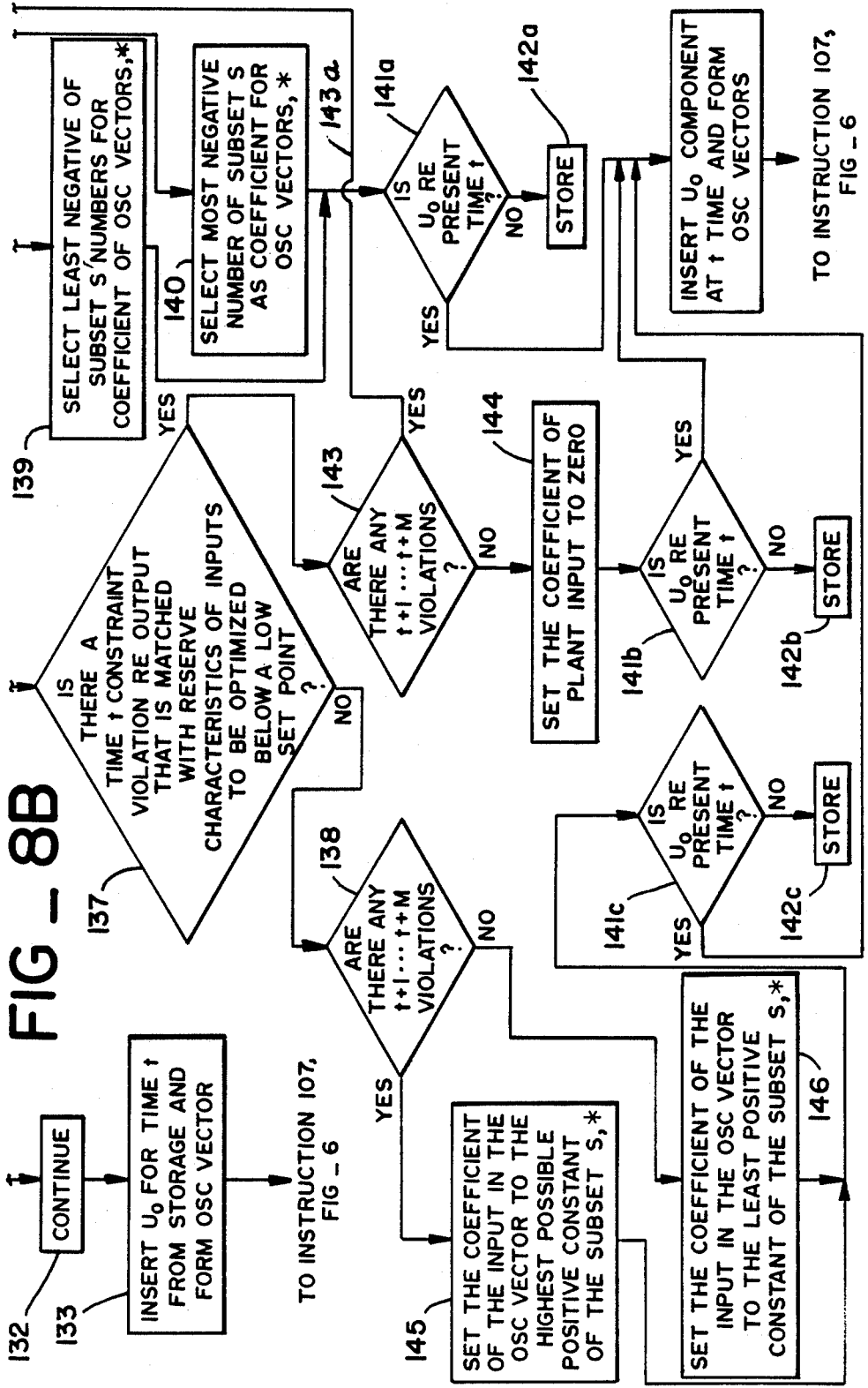
FIG_8B

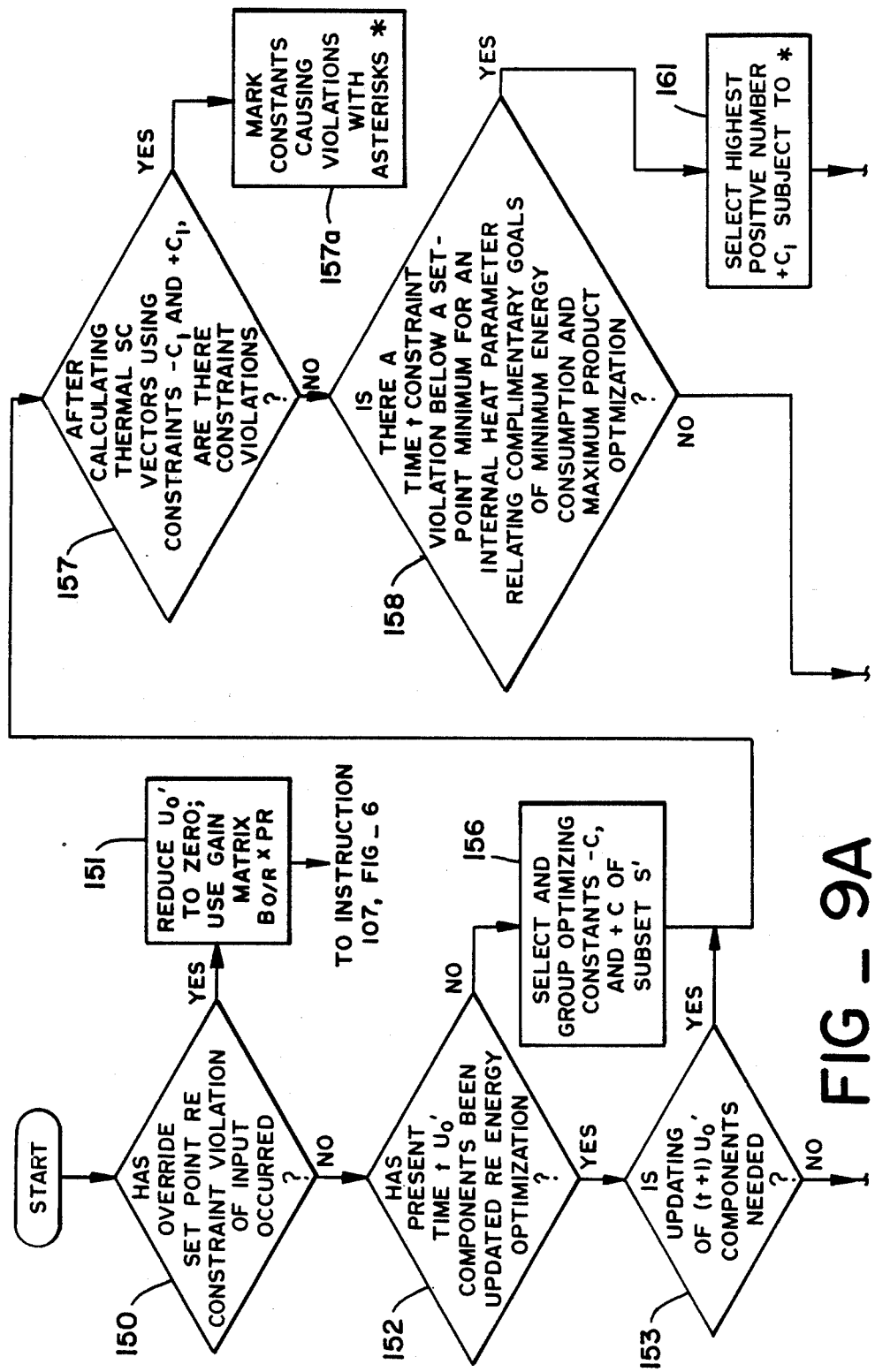
FIG_9A

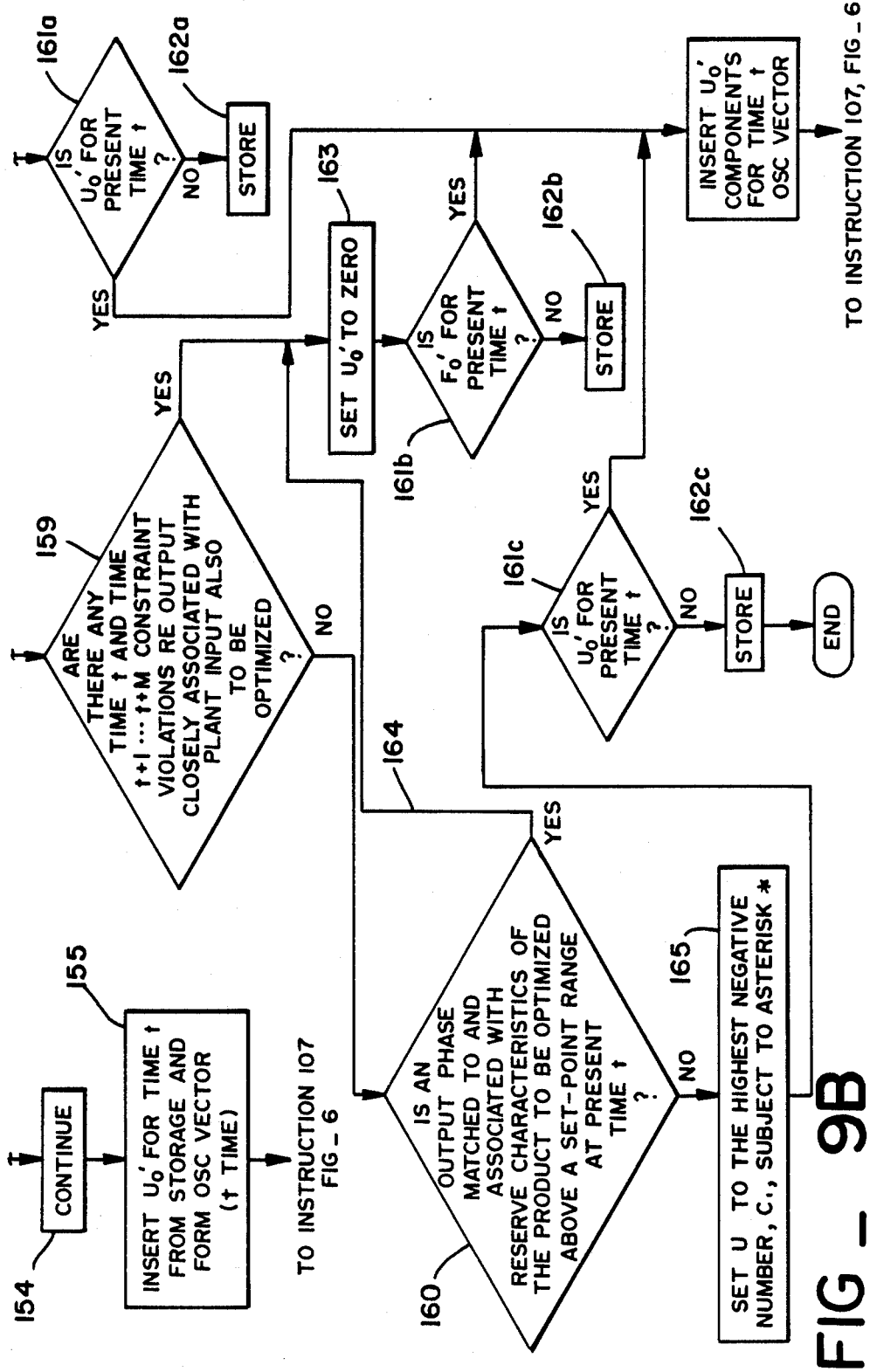

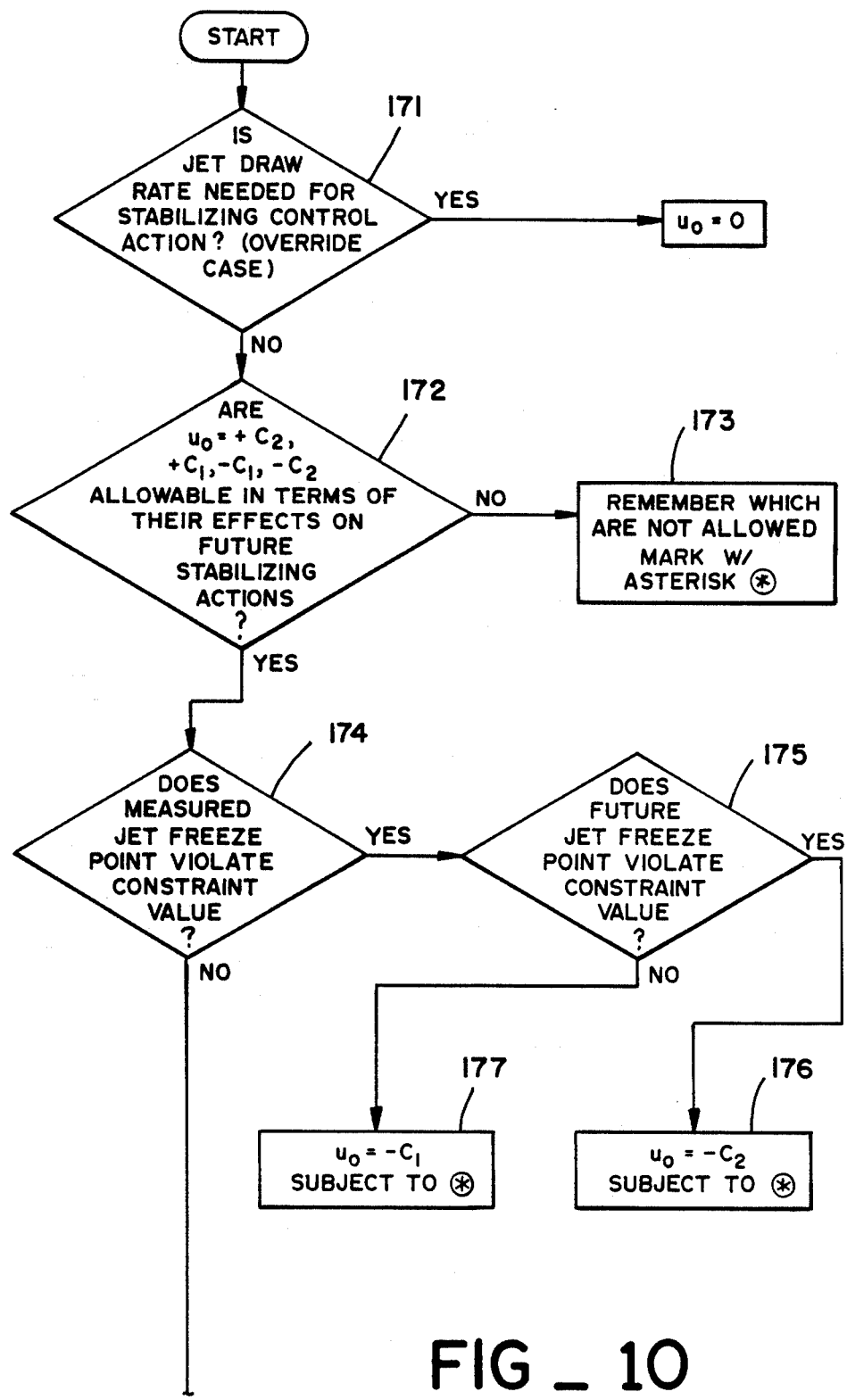
FIG _ 10

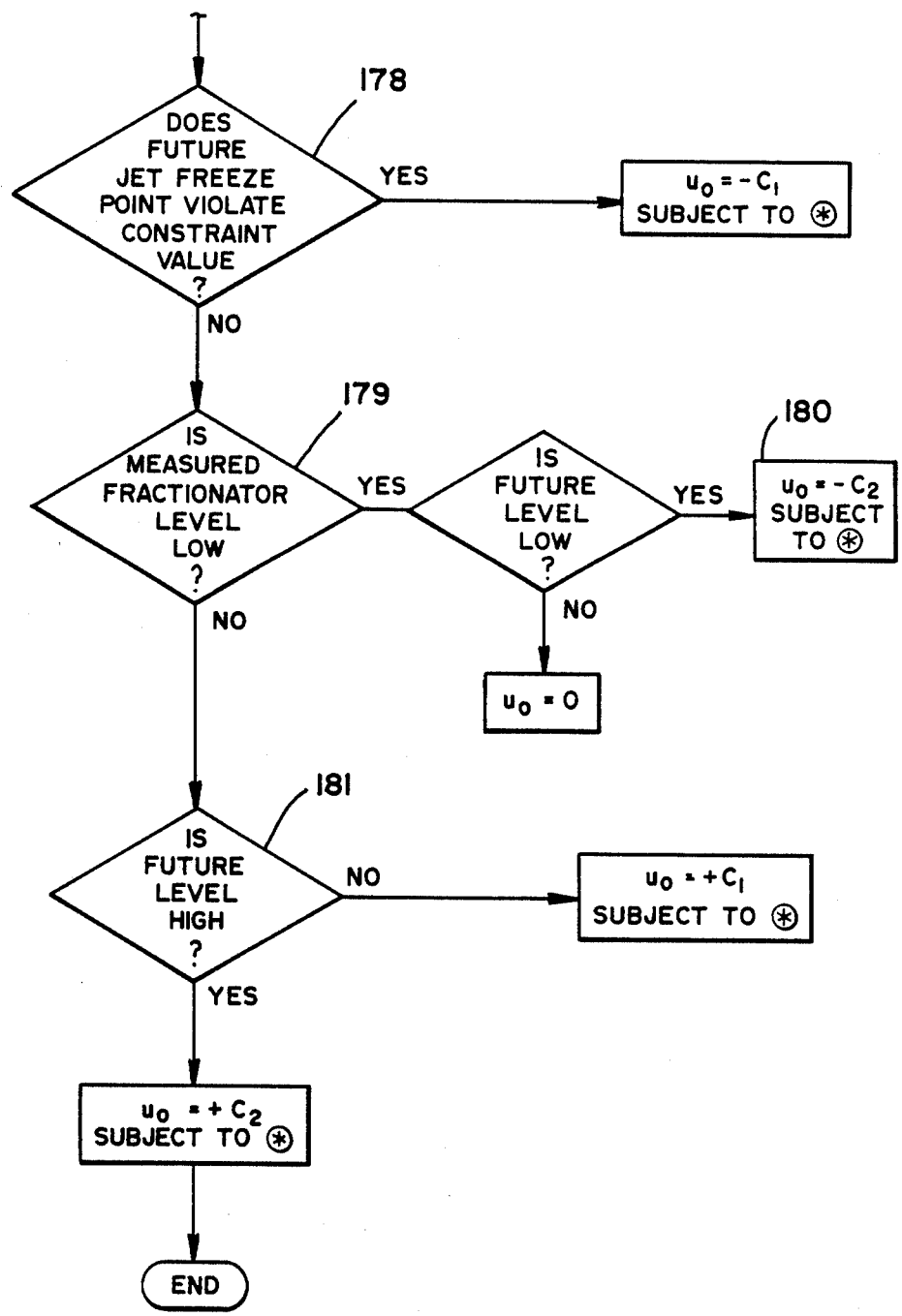
FIG _ 11

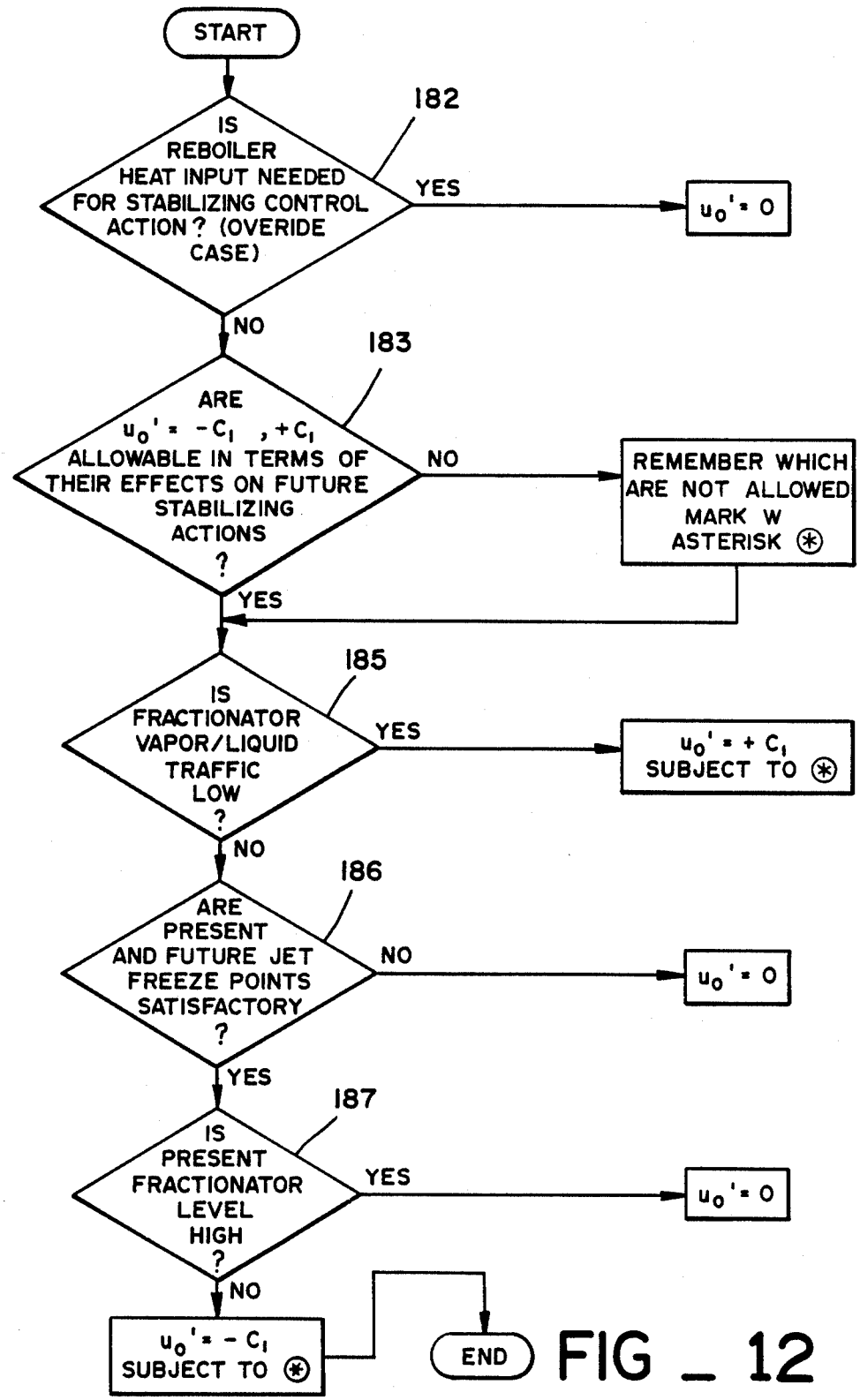
FIG _ 12

| | 206a | 206b | 207c | 208d | 208e | 208f | 208g |
|---|---|---|---|---|---|---|---|
| A↓ | $a_{11}(1)$ | $a_{12}(1)$ | $a_{13}(1)$ | $a_{14}(1)$ | $a_{15}(1)$ | $a_{16}(1)$ | $a_{17}(1)$ |
| 207a | $a_{11}(2)$ | $a_{12}(2)$ | $a_{13}(2)$ | $a_{14}(2)$ | $a_{15}(2)$ | $a_{16}(2)$ | $a_{17}(2)$ |
| | $a_{11}(3)$ | $a_{12}(3)$ | $a_{13}(3)$ | $a_{14}(3)$ | $a_{15}(3)$ | $a_{16}(3)$ | $a_{17}(3)$ |
| | $a_{11}(4)$ | $a_{12}(4)$ | $a_{13}(4)$ | $a_{14}(4)$ | $a_{15}(4)$ | $a_{16}(4)$ | $a_{17}(4)$ |
| | $a_{11}(N)$ | $a_{12}(N)$ | $a_{13}(N)$ | $a_{14}(N)$ | $a_{15}(N)$ | $a_{16}(N)$ | $a_{17}(N)$ |
| 207b | $a_{21}(1)$ | $a_{22}(1)$ | $a_{23}(1)$ | $a_{24}(1)$ | $a_{25}(1)$ | $a_{26}(1)$ | $a_{27}(1)$ |
| | $a_{21}(2)$ | $a_{22}(2)$ | $a_{23}(2)$ | $a_{24}(2)$ | $a_{25}(2)$ | $a_{26}(2)$ | $a_{27}(2)$ |
| | $a_{21}(3)$ | $a_{22}(3)$ | $a_{23}(3)$ | $a_{24}(3)$ | $a_{25}(3)$ | $a_{26}(3)$ | $a_{27}(3)$ |
| | $a_{21}(4)$ | $a_{22}(4)$ | $a_{23}(4)$ | $a_{24}(4)$ | $a_{25}(4)$ | $a_{26}(4)$ | $a_{27}(4)$ |
| | $a_{21}(N)$ | $a_{22}(N)$ | $a_{23}(N)$ | $a_{24}(N)$ | $a_{25}(N)$ | $a_{26}(N)$ | $a_{27}(N)$ |
| 207c | $a_{31}(1)$ | $a_{32}(1)$ | $a_{33}(1)$ | $a_{34}(1)$ | $a_{35}(1)$ | $a_{36}(1)$ | $a_{37}(1)$ |
| | $a_{31}(2)$ | $a_{32}(2)$ | $a_{33}(2)$ | $a_{34}(2)$ | $a_{35}(2)$ | $a_{36}(2)$ | $a_{37}(2)$ |
| | $a_{31}(3)$ | $a_{32}(3)$ | $a_{33}(3)$ | $a_{34}(3)$ | $a_{35}(3)$ | $a_{36}(3)$ | $a_{37}(3)$ |
| | $a_{31}(4)$ | $a_{32}(4)$ | $a_{33}(4)$ | $a_{34}(4)$ | $a_{35}(4)$ | $a_{36}(4)$ | $a_{37}(4)$ |
| | $a_{31}(N)$ | $a_{32}(N)$ | $a_{33}(N)$ | $a_{34}(N)$ | $a_{35}(N)$ | $a_{36}(N)$ | $a_{37}(N)$ |
| 207d | $a_{41}(1)$ | $a_{42}(1)$ | $a_{43}(1)$ | $a_{44}(1)$ | $a_{45}(1)$ | $a_{46}(1)$ | $a_{47}(1)$ |
| | $a_{41}(2)$ | $a_{42}(2)$ | $a_{43}(2)$ | $a_{44}(2)$ | $a_{45}(2)$ | $a_{46}(2)$ | $a_{47}(2)$ |
| | $a_{41}(3)$ | $a_{42}(3)$ | $a_{43}(3)$ | $a_{44}(3)$ | $a_{45}(3)$ | $a_{46}(3)$ | $a_{47}(3)$ |
| | $a_{41}(4)$ | $a_{42}(4)$ | $a_{43}(4)$ | $a_{44}(4)$ | $a_{45}(4)$ | $a_{46}(4)$ | $a_{47}(4)$ |
| | $a_{41}(N)$ | $a_{42}(N)$ | $a_{43}(N)$ | $a_{44}(N)$ | $a_{45}(N)$ | $a_{46}(N)$ | $a_{47}(N)$ |

COLUMN J ↑  ROW →  208 ↗ N

MINIMUM TIME, OPTIMIZING AND STABILIZING MULTIVARIABLE CONTROL METHOD AND SYSTEM USING A CONSTRAINT ASSOCIATED CONTROL CODE

SCOPE OF THE INVENTION

This invention relates to a method and system for control of chemical processes and more particularly to an on-line control system and method for large scale multivariable processes in which stable regulation of plant operations is integrated with dynamic pursuit of plant optimization. In one aspect, the present invention provides for the above-identified objects by generating a constraint driven control code in which both regulation and optimization actions for such processes are achieved in minimum time without usual extended waiting periods between each stepped adjustment of manipulated variables heretofore required. The constraint driven control code of the present invention, is characterized by its capability of simultaneously optimizing at least one and preferable two of the plant control variables for which optimization is sought without use of optimizing set points, as plant stability is maintained.

BACKGROUND OF THE INVENTION

Achieving on-line optimization of complex, large scale chemical and petrochemical plants, is difficult. Processes associated with hydrocracking, catalytic cracking, or reforming as conventionally used in petroleum refining operations are characterized by large scale, multiple plant inputs and outputs. Moreover, the interrelationship of such multiple plant variables is largely unknown. Hence, process modeling for optimization of one or more plant inputs using internal set points, is difficult to achieve since optimization requires a high degree of modeling fidelity for plant variables. A typical example of off-line optimization by high fidelity modeling is set forth in D. M. Prett et al., U.S. Pat. No. 4,349,869 for "Dynamic Matrix Control Method" wherein optimal set points for the control system of the plant, are determined off-line. The set points are then implemented by a dynamic controller employing integral feedback and feedforward action based on output deviations from these set points.

(References presenting good overviews, include Kwakernaak, H., Sivan, R., *Linear Optimal Control Systems*, John Wiley & Sons, Inc., New York, 1972; Marchetti, J. L.; Mellichamp, D. H.; Seborg, D. E., "Predictive Control Based on Discrete Convolution Models", *Ind. Eng. Chem. Process Des. Dev.* 22, 488–495 (1983); and Athans, M. and Falb, P. L., *Optimal Control: Introduction to Theory and Application*, McGraw Hill (1966).)

A simple, but yet quite effective, on-line optimization approach, is a control method referred to as a constraint control (or "hill climbing"). The strategy in choosing optimal directions is usually process dependent, and may involve process goals related to maximization of certain plant variables such as maximizing flow of a certain product fraction, or it may be related to minimization goals such as minimizing energy input to the plant. On-line measurements of plant outputs (controlled variables), are of course necessary in order to determine when constraints have been reached such that further maximization/minimization must be stopped. Also the regulation and optimization efforts usually must be prioritized, so that regulatory effort is paramount, see J. P. Kennedy et al., U.S. Pat. No. 4,228,509 for "Multivariable Control System For Regulating Process Conditions and Process Optimization".

But constraint control, by definition, disturbs the plant. Manipulation of the plant inputs (in optimal directions) automatically influences other plant variables and the magnitude of the effects is hard to predict. Hence, constraint control has hitherto been exercised in a slow, non-dynamic, steady-state fashion. I.e., optimizing action is only taken in small steps with long waiting periods between each step so that a steady-state condition is reached before a new optimizing move or step is attempted. Consequently, the process spends significant time periods away from true optimal conditions and, moreover, even if the process reaches the desired optimal condition or combination of conditions, new external disturbances may occur which cause the process to move away from optimum. An example of such disturbances is a change in feed and/or recycle rates, requiring the control sequence to begin anew.

Therefore, an object of the present invention is the provision of an on-line constraint dependent control method and system in which dynamic stabilization of plant variables is integrated with the dynamic pursuit of optimization of one or more plant inputs in the time domain without the use of optimal pre-determined set points, and in which one or more plant inputs can be constantly driven in pursuit of optimality while other plant inputs reserved for stabilization maintain the plant outputs within preselected limits. Such stability is maintain even in the face of new disturbances within the plant such as changes in feed or recycle rates. In one aspect, the limiting constraint(s) need not be constant as a function of time but can be shifted from one process property to another. In another aspect, the dynamic optimizing action of the present invention also has the capability of reversing itself when a constraint becomes violated.

In this regard, the term "stabilizing control" refers to the stability enhancing effects in two ways. The first involves mitigation against the influences of disturbances. Such disturbances may be intentional; the optimization action itself is an example of the latter; they may also be unintentional as caused by true external disturbances, such as changes in feed or recycle rates. The second function concerns the interrelationship between future stabilization efforts (as, say, required to bring about stable plant operations), and the next-in-time optimization effort. Certain characteristics of the optimizing effort, as explained below, can be used to determine if optimization should occur at the next-in-time operating cycle, and the degree of control (strength) it should exert on plant operations. In other words, the optimization effort is permitted to prejudge its impact before implementation occurs, based at least in part, on the strength of the stabilization effort required to maintain stability of the plant. Thus, the present invention can avoid the situation where the optimization effort might take an action too strong for efficient stabilizing action, but still allow optimization when the plant is stable. This feature makes the present invention "artificially intelligent" because the consequences of plant actions are forecasted before actual implementation occurs.

SUMMARY OF THE INVENTION

In accordance with the present invention, a constraint dependent control method and system is provided that allows rapid, on-line optimization of one and preferably two plant inputs (in the time domain) without use of off-line determined set points through iterative generation of a series of constraint dependent optimizing and stabilizing control (OSC) vectors. Each OSC vector is normalized to the next-in-time operating cycle. A control output is derived from each OSC vector. The latter "drives" the optimized plant inputs toward limiting constraints but without destabilizing the plant.

Generation of each OSC vector is in the time domain and involves mapping a prediction vector of both present and future changes in plant input into an output precursor vector SC by matrix multiplication, followed by evaluation of certain key components associated with elements of the precursor stabilizing control vector SC from which the OSC vector is formed. Both the vector-matrix multiplication and the evaluations are preferably carried out by the computer-dominated control system of the present invention. After evaluation, present time elements of the OSC vector are used to derive the previously mentioned control code.

The concept of the present invention that provides separately evaluatable parts addressable to different groups of plant inputs, provides a technique by which the dynamic requirements of optimization can be systematized without sacrificing plant output goals. For example, the degree of optimization of selected plant inputs can be more easily defined to bring about desired plant goals, e.g., maximization of the draw rate of a desired product fraction, minimization of energy input, maximization of plant feed rate, etc.

ELABORATION I

In still more detail, the method of the present invention includes the steps of:

(i) After designating at least one of the plant inputs for primary optimization of the plant, and reserving the remainder of the plant inputs for stabilization purposes, the plant must be modeled so as to establish mapping constants for relating changes between pairs of plant inputs and plant outputs. The mapping constants between all input-output pairs are preferably in matrix format.

(ii) Next a series of matrix-vector multiplications are carried to produce a prediction (PR) vector normalized to the next-in-time operating cycle t, in which changes in each plant output at common time sample periods $t+1 \ldots t+N$ are predicted, where N is the prediction horizon for the plant output changes. The terms of these multiplications take into account the effect of past plant input changes including changes in plant inputs and measured disturbances, on future changes in plant outputs. A plant model matrix A previously developed and stored within the control system of the invention, together with measured plant input changes from transducers strategically located within the plant, are prominent elements of the process.

(iii) Then in order to provide a proportional controlling action for the plant inputs, the PR vector is multiplied by a gain matrix Bx properly dimensioned to produce a stabilizing control vector SC normalized to time t, in accordance with the equation $$SC = Bx \cdot PR$$

wherein the SC vector comprises elements associated with present and future time, $t, t+1 \ldots t+M$ where M is the control action horizon for incremental plant input changes, and Bx is a gain matrix selected from a group comprising a gain matrix B that provides a constrained SC vector, and a gain matrix Bo/r which provides an unconstrained SC vector. Selection is based on pre-testing procedures. First a constrained SC vector is produced. After constraint violations have been evaluated, the process can be easily repeated using the gain matrix Bo/r to produce an unconstrained SC vector, if required. Otherwise, the evaluation continues for the constrained SC vector. The effect of a set of negative and/or positive constants $C_i$ is analyzed in a set pattern. From the set $C_i$ a constant is selected based upon its influence as to improvement in both rate and direction of optimization of the at least one plant input established in step (i). In this regard, the influences of each constant on present and future plant output violations as well as future violations in connection with the plant inputs reserved for stabilization, are relevant.

(iv) Next the selected constants are inserted in the constrained SC vector to form the OSC vector from which the control output is derived. If pre-testing had previously occurred, the selected constants are fetched from storage for insertion into the next-in-time SC vector to form the corresponding next-in-time OSC vector.

(v) The control output is next derived using the present time t elements of said OSC vector of step (iv). Then, direct control action occurs. Plant inputs are incrementally changed in accordance with the control output, resulting in dynamic changes in operations of the plant;

(vi) Without waiting for steady state conditions to occur, steps (ii)-(v) are repeated and then re-repeated so as to pursue plant optimization without violating stable regulation of associated processes.

ELABORATION II

Note in evaluating the string of constants in accordance with step (iii) of ELABORATION I, supra, that each positive and/or negative constant $C_i$, in seriation, becomes an independent variable as modified theoretical SC vectors are formed. Result: the effects of each such constants $C_i$ can be investigated before actual implementation of the control code of step (v) of ELABORATION I, occurs. If such evaluation occurs in a latter cycle, then only the prior-in-time stabilizing control (SC) vector must be updated. After the selection process in connection with such string of constants is complete, the results are stored. In either the initial or in later control cycles, such evaluation leads to the adoption of a most desirable optimizing control component and is based on observing (in the time domain) whether excessive incremental constraint violations occurs in plant outputs as well as the time of occurrence in connection with the plant inputs reserved for stabilization.

The theoretical SC vectors for testing, are calculated in accordance with $$\text{Theoretical } SC = I'SC(t) + B \, Col[A]Ci$$

where $I'$ is an identity matrix; SC(t) is the stabilizing vector previously generated, B is the proportional controller gain matrix as previously defined; Col[A] are a column of elements of model matrix model A associated the plant input of step (i) for which optimization is sought, and $C_i$ is the series of constants comprising the string mentioned above.

ELABORATION III

In another aspect, the control code of step (v) of ELABORATION I is tailored to specifically control a large scale hydrocracking plant wherein the withdrawal rate of a particular fraction product exiting from the plant, is to be optimized. Energy consumption in connection with the reboiler furnace of the fractionator, is also to be minimized.

ELABORATION IV

Note that where separate goals for optimization are simultaneously occurring, as set forth in ELABORATION III, supra, there must be separate strings of negative and/or positive constants Ci associated with each goal. Separate evaluation is also required. The magnitude and direction of the strings are usually different, however. The first string of constants in connection with product optimization can comprise constants C1, C2, −C2, −C1 where C1>C2, and the second string can comprise constants −Co and Co. Selection rules favor the left most constants of each string over the right most constants, but each includes least preferred negative or positive numbers so that the "drive" direction of optimization can be reversed, if needed. Thus where energy consumption is to be minimized, e.g., fuel flow to the reboiler furnace, the selection rules favor a negative value but a positive value is possible if the optimization drive direction must be reversed.

ELABORATION V

Note that in connection with use of separate optimization goals as set forth in ELABORATION IV, supra, there are no limits either on the number of plant inputs or on the plant outputs that may be controlled. However, the number of plant inputs should be at least two, one for primary optimization and one for primary stabilization. Due to the proportional nature of the stabilizing and optimizing control as set forth in ELABORATION I, supra, the number of controlled plant outputs may exceed the number of manipulated plant inputs. As to limitations in controlling the plant inputs, the magnitude of the control horizon M can be significantly less than that of the prediction horizon N. During modeling the plant in connection with generating input/output pair responses, the prediction horizon N must be greater than the slowest step response of any plant output. The sample period $\Delta t$ should be such as to provide sufficient sampling of the fastest response. Control action horizon M in a range of M=N/2 to N/3 is adequate

ELABORATION VI

Note the method of the present invention can include a series of precursor steps in connection with step (iv) of ELABORATION I, having to do with the calculation of the gain matrix B and of gain matrix Bo/r. Such determinations are in accordance with $$-(R+A_A^T \cdot Q \cdot A_A)^{-1} \cdot A_A^T \cdot Q$$

in which R is a diagonal matrix associated with plant inputs X, Y and Q is a diagonal matrix associated with plant outputs Z; $A_A$ is an augmented matrix of responses of selected input/output pairs; and $A_A^T$ is the transpose of matrix $A_A$. The matrix R associated with the plant inputs X and Y is square of dimension M:Y+X where M is the control horizon, X is the number plant inputs reserved for optimization and Y is the plant inputs reserved for stabilization. R-elements associated with the X plant inputs are either constrained (zeroed) for calculation of matrix B or are left unconstrained for calculation of matrix Bo/r.

ELABORATION VII

The generation of (a) the model matrix A of step (ii) of ELABORATION I, and (b) the augmented matrix $A_A$ in accordance with ELABORATION VI, require systematic measurements of changes between all plant input/output pairs. A method which provides both types of matrices, and meets the accuracy requirements of the present invention, includes the following steps, viz.,:

(i) identifying plant inputs including measured disturbances with a designation 1 ... X where X is the total number of such inputs, and plant outputs with a designation i=1 ... i=Z where Z is the total number of such outputs, all associated with the plant to be controlled by the SC vector;

(ii) implementing a step change in plant input 1;

(iii) after waiting one sample period, measuring all plant outputs in ascending order i=1 ... i=Z;

(iv) calculating step response elements $a_{i,l}$ as change in plant output i/step change in plant input j and storing same as a column segment of a model matrix A relating incremental input/output pair response;

(v) repeating steps (iii) and (iv) in sequence for N periods where N is the prediction horizon so that the left-most column of matrix A is completely formed in accordance $$A = \begin{bmatrix} a_{11}(1) \\ \vdots \\ a_{11}(N) \\ \hdashline a_{21}(1) \\ \vdots \\ a_{21}(N) \\ \hdashline a_{31}(1) \\ \vdots \\ \hdashline \vdots \\ a_{Z,1}(N) \end{bmatrix}$$

wherein each column includes a series of ordered segments each beginning with coefficient 1 and ending with coefficient N;

(vi) for inputs 2 ... X, repeating steps (ii)–(v) in sequence to form the remaining columns of the matrix A for remaining plant inputs including measured disturbances;

(vii) computing the augmented matrix $A_A$ from matrix A of step (vi) by shifting each ordered column segment associated with the plant inputs excluding the measured disturbances, one coefficient at a time downward from row 1 toward row N, inserting zeros in the original row 1 until all column segments have been decremented to form a series of augmented reordered columns and then repeating the process using each of the resulting ordered columns is augmented M times to form the augmented matrix $A_A$, wherein said augmented matrix $A_A$ provides compatible dimensions in connection with the mapping of the M-element input horizon into the N-element output horizon.

BRIEF DESCRIPTION OF THE DRAWINGS

FIGS. 1 and 2 is a schematic of a large scale hydrocracking plant for production of naphtha, gasoline, and jet fuel from a heavy hydrocarbon feedstock in which optimization and stabilization goals can be met using a constraint dependent control system in accordance with the present invention via dynamic control of a plurality of plant inputs while maintaining plant output standards;

FIG. 3 is a detail of the schematic of FIGS. 1 and 2 for illustrating the location and function of particular plant inputs associated with the hydrocracking plant of interest, under control of the control system of the present invention;

FIG. 4 is another detail of the schematic of FIGS. 1 and 2 for illustrating the location and function of particular plant outputs associated with hydrocracking plant operations, under control of the control system of the present invention;

FIGS. 5, 6 and 7 is a flow diagram useful in describing the operation of the constraint dependent control system of the present invention for optimizing at least one and preferably two, of the plant inputs of FIG. 3 while maintaining plant stability, the plant inputs being controlled via generated control action representing certain of the elements of an optimizing and stabilizing control (OSC) vector iterativly provided as a result of a series of vector-matrix manipulations within the computer-dominated control system of the present invention;

FIGS. 8A, 8B, 9A and 9B illustrate the flow of information for determining the optimal action for two plant inputs using the constraint dependent control system of the present invention;

FIGS. 10, 11 and 12 illustrate the optimal action of FIGS. 8A–9B in more detail with respect to jet fuel maximization coupled with hydrocracker reboiler heat input minimization;

FIGS. 13A and 13B illustrate details of generation of model matrices A and $A_A$ in connection with the flow diagrams of FIGS. 5, 6 and 7.

DETAILED DESCRIPTION OF THE INVENTION

The invention can be explained by way of reference to any number of multivariable, large scale refining processes if the goals of operation are stable regulation integrated with dynamic pursuit of optimization. Several applications readily come to mind within the experience of one skilled in the art, viz., control of a large scale reactor-fractionator system of a hydrocracking process and control a large scale regenerationreactor system of a fluid catalytic cracking process. But for reasons that will become evident, experience has shown that a particular set of conditions exists within a typical two-stage hydrocracking plant 5 as set forth in FIGS. 1, 2, 3 and 4 that particularly illustrates the unique capabilities and attributes of the constraint dependent control system 6 of the present invention.

In this regard, assume that the hydrocracking plant 5 has undergone start-up and manual adjustments prior to being fine-tuned by the control system 6 in accordance with the method of the present invention. Conventional control steps are schematically brought about by executing conventional management logic rules within a logic circuit 7 (or its manual equivalent as provided by a human operator) connected to a conventional process control system 9. Implementation of the output of the logic circuit 7 to various conventional control devices within the plant 5 is by way the control system 9 through linkages 10 thereof. Such operations are interactive, symbolized by the fact that there must be a continuous interchange of data between the logic circuit 7 (or the human operator if on manual control) and the hydrocracking plant 5 via transducer devices of the control system 9. Such interchange can include the display of customary measurements of the transducer devices within the plant 5, at a central site sufficient to advise of primary aspects of plant operations.

The plant 5 is generally started up by operator who knows, or has been informed, of a set of parameters which are customarily sufficient to guide initial hydrocracking operations. Such parameters can include rate of feed, temperature limits of first-stage, second-stage and reboil furnaces and standards of the product fractions. Using such information, the conventional control system 9 is usually quite satisfactory in achieving a viable set of operating conditions where, in effect, plant temperatures are kept at setpoints which allow product standards to be maintained within allowable limits.

Such control is largely empirical, however and pursuit of optimal conditions is elusive. After the plant 5 has been placed in the above-described condition, the constraint dependent control system 6 of the present invention can be activated in order to fine-tune operations of the plant 5. Object: optimization of one and preferably two plant inputs while maintaining stability of the plant 5. But before describing such operations in depth, a more detailed description of the two-stage hydrocracking plant 5 is in order and is presented below.

HYDROCRACKING PLANT 5

As shown in FIGS. 1 and 2, the hydrocracking plant 5 includes first and second-stage furnaces 11, 12 and reboil furnace 13. Each furnace 11, 12, 13 is paired with a reactor 14, 15 or fractionator 16, respectively.

In operation, fresh feed controlably enters the plant 5 from source 17 via valve/flow controller 18. The feed is then combined with hydrogen, such hydrogen originating from various sources including an external source 19. The feed and hydrogen are next heated to an elevated temperature, say within first-stage furnace 11 fueled by source 20, and then "cracked" within first-stage reactor 14 to produce a hydrocracked product accompanied by an unreacted hydrocracking effluent. Cracking occurs in the presence of a catalyst supported within the reactor 14. From the reactor 14, the hydrocracked product and unreacted effluent exits to fractionator 16 after passage through separator 21. As is conventional, the fractionator 16 functions in conjunction with associated overhead and bottoms stabilizing equipment 22, 23 and mid-cut distribution network 24 and storage tank 25, to produces various fractions in connection with the hydrocracked product viz.,(i) a high cut overhead fraction of gas and naphtha, and (ii) mid-cut product fractions comprising gasoline and jet fuel.

Unreacted effluent from the fractionator 16 (boiling point above a certain cut point temperature) exits from the fractionator 16 via the bottoms stabilizing equipment 23 and is separated into reboil and recycle effluent. The reboil effluent vapor reenters the fractionator 16 after being heated by the reboil furnace 13 fueled also by source 20. The recycle liquid effluent is recyled to second-stage reactor 15. The latter is usually characterized by containing a large portion of heavy hydrocarbon components. After the recycle effluent is mixed with hydrogen, the combination is heated to an elevated temperature by the second-stage furnace 12 and then "cracked" within reactor 15. Within the reactor 15, the cracking again occurs in the presence of a catalyst. The second stage hydrocracked product and unreacted effluent next flows to the fractionator 16 via separator 26. The various products previously mentioned are again produced and stored (in association with equipment 22–25).

It is obvious from FIGS. 1 and 2 that recycling of components in the depicted manner, suggests that even heavy hydrocarbon feeds from source 17 can be totally cracked into lighter, more salable hydrocarbon products provided on-line control of the large scale hydrocracking plant 5 can be maintained. Hence a brief explanation of the goals and limitations of logic circuit 7 and conventional control system 9 is in order and is presented below.

LOGIC CIRCUIT 7 AND CONTROL SYSTEM 9

As previously mentioned, correct operation of logic circuit 7 in conjunction with control system 9 is essential during start-up and initial phases of operation of the plant 5. Logic commands are centered within logic circuit 7 and then are executed by the control system 9 through linkages 10. Object: to bring the plant 5 through start-up and into the initial stages of hydrocracking operation. Operating conditions within the plant 5 are continuously measured and passed to logic circuit 7 via a series of transducers, analyzers, controllers, etc. located at key positions within the plant 5. The nature of such measurements and conditions are those customarily employed in controlling hydrocracking operations.

More particularly, assume that the plant 5 has undergone start up using certain key steady-state values of set points within logic circuit 7 for operational parameters. These parameters can include but are not limited to the rate of feed from source 17; furnace temperatures at furnaces 11, 12, 13; reactor temperatures at reactors 14, 15; overhead and bottoms flow rates at stabilizing equipment 22, 23; and selected set point ranges for fractions within distribution network 24, such latter data being provided via appropriate property indicating devices such as gasoline end-point temperature analyzer 29 and/or jet fuel freeze point temperature analyzer 30 in FIG. 2. To provide desired output parameters, e.g., the operator may choose to maintain the temperatures of reactors 14, 15 within given setpoint ranges assuming constant feed and recycle flow rates. In this way, the product fractions of interest, say jet fuel, can be maintained within a selected setpoint range, while at the same time, the temperatures of the furnaces 11, 12 and 13 are monitored to assure that the latter are not overstressed. Commands from the logic circuit 7 are carried forward to control the plant 5 using various controller/valve networks strategically positioned and operationally connected thereto via the control system 9 through linkages 10, in a manner that is customary in the art of hydrocracking process control.

As previously mentioned, experience has indicated that a selected optimization objective concerning one of the inputs of the plant 5, can be carried out using a mathematical set of conditions that focuses on the requirement of optimal set points such driving the process toward optimal furnace setpoints, in steps while maintaining the product fractions within selected ranges of set points, in the manner of U.S. Pat. No. 4,228,509. While such modeling is adequate in some circumstances (as for controlling reforming processes such as set forth in U.S. Pat. No. '509), experience has also shown that such mathematical modeling techniques are often inadequate. Reason: in hydrocracking plants, there are higher amounts of coupling action between the reactors 13, 14 and the fractionator 16 in terms of their cause-effect relationship. The recyle effluent from the fractionator to the reactors 13, 14 can introduce backcoupling disturbances of a substantial nature. Such disturbances can continue during a major portion of any control period, cycling back and forth between the reactors 13, 14 and the fractionator 16 each time the plant 5 is driven in an arbitrary direction. While controlling the recycle effluent flow rate to a constant setpoint (to be changed only in proportion to fresh feed changes) has proven effective in reducing disturbances between these units, such condition also requires that the fractionator bottoms level be stabilized by other means. A consequence of this is that long waits between drive changes have been heretofore required but this is not the case where conventional logic circuit 7 and control system 9 have been augmented by the constraint dependent control system 6 of the present invention.

CONTROL STEPS IN ACCORDANCE WITH CONTROL SYSTEM 6

In accordance with the present invention, constraint dependent control system 6 of the present invention provides for both simultaneous optimization and stabilization of plant 5 without need for optimal predetermined set points and without waiting for steady state conditions between driving steps.

In more detail, the method of the present invention first establishes the plant inputs and outputs in accordance with a series of designations. For example, the plurality of independently controlled manipulated plant inputs can be indicated at "X and Y" respectively, while the one or more controlled plant outputs dependent upon said manipulated plant inputs X, Y can be designated as "Z". The method then comprises the following steps:

(i) mapping constants are initially established for relating changes in the X and Y plant inputs plus measured disturbances to changes in the Z plant outputs in matrix format over a certain time horizon N for the outputs and M for the inputs;

(ii) then, a stabilizing and optimizing control (OSC) vector normalized to present time t, is generated by means of a series of matrix-vector multiplications, the OSC vector including elements in positions 1 . . . Y and positions 1 . . . X corresponding to incremental changes in plant inputs Y and X, respectively, normalized to present time t as well as incremental future changes for at least Y plant inputs based on said mapping logic of step (i), and being of a form:

$$OSC = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

whereby said inputs X can be driven in optimal directions without use of optimal pre-determined set points while inputs Y can maintain stability through incremental changes therein, in linear proportion to changes in plant outputs Z. Since the present invention maintain stability while pursing optimization based on linear proportional action in connection with the plant outputs Z, the number of the plant outputs Z can exceed the number of plant inputs X,Y.

To utilize the OSC vector for control purposes, requires the generation of a control output comprising only present time t elements of the OSC vector. After proper mapping of the control output, resulting control signals are used to effect incremental change in set points of controller means associated with the plant inputs X, Y. As a result, controller linkages are activated. Measured conditions associated with plant inputs X, Y are brought into alignment with the required set points wherein the inputs X are "driven" toward optimization without use of optimal set points while the inputs Y maintain stability, in linear proportion to deviations from preselected conditions.

Finally, without waiting for steady-state conditions, the steps, supra, are repeated so as to pursue optimization of the inputs X on a continuing basis without the need for steady-state conditions between the individual control cycles.

In order to add details, note that the above-identified steps can be further described as follows:

DETAILED CIRCUMSTANCES I

In order to provide mapping logic in accordance with step (i), the refinery, chemical process or the like, is modeled prior to actual operations. Test disturbances in the X, Y plant inputs and measured disturbances are introduced as stepped changes. Then, for each step change over a sample period 1, 2 ... N ($\Delta t$ in length), the changes in the Z plant outputs are measured, wherein N is at least equal to the slowest step response of any plant output Z to a change in plant input X, Y and measured disturbances. From a more erudite viewpoint, the resulting plant model is defined as the linear convolution of plant inputs expressed as a superposition of their effects on an output vector moving in time.

DETAILED CIRCUMSTANCES II

In the generation of the OSC vector of step (ii), several multiplication terms are relevant. One is prediction vector (PR) which predicts future changes in the plant outputs Z based on plant inputs X, Y. The PR vector is normalized to the next-in-time operating cycle t, and indicates changes in each plant output at future common time sample periods $t+1 \ldots t+N$, where N is a final prediction horizon for the plant output changes. A series of matrix-vector multiplications carry out the operation. These terms take into account the effect of past plant input changes (including changes in measured disturbances), on future changes in plant outputs using a plant model matrix A previously developed. The results are stored within the control system of the invention, together with measured plant input changes from transducers strategically located within the plant.

DETAILED CIRCUMSTANCES III

In order to provide a proportional controlling action for the plant inputs, the PR vector of CIRCUMSTANCES II, supra, is multiplied by a gain matrix Bx properly dimensioned to produce a stabilizing control (SC) vector normalized to time t, in accordance with the equation $$SC = Bx \cdot PR$$

wherein the SC vector comprises elements associated with present and future time, t, $t+1 \ldots t+M$ where M is the control action horizon for incremental plant input change, and Bx is a gain matrix selected from a group comprising a gain matrix B that provides a constrained SC vector, and a gain matrix Bo/r which provides an unconstrained SC vector. Selection is based on pre-testing procedures. First a constrained SC vector produced. After constraint violations have been evaluated, the process can be easily repeated using the gain matrix Bo/r to produce an unconstrained SC vector, if required. Otherwise, the evaluation continues for the constrained SC vector. A string (or strings) of negative and/or positive constants Ci are tested in a set pattern. Then, one of the constants is selected based upon its capability of most rapidly improving both the rate and direction of optimization of the at least one plant input established in step (i). In this regard, the effects of each constant on present and future plant output violations as well as future violations in connection with the plant inputs reserved for stabilization, are relevant.

After the selected constants are inserted in the constrained SC vector, the OSC vector emerges, from which the control code is derived from the present time (t) elements.

DETAILED CIRCUMSTANCES IV

Note in evaluating the string of constants in accordance with DETAILED CIRCUMSTANCES III, supra, to attain the desired optimizing component for the OSC vector, that each positive and/or negative constant Ci, becomes an independent variable as the modified test SC vectors are formed. Result: The effects of such constants Ci are known well before actual implementation of the control code. The evaluation of the Ci constants is based on observing whether excessive incremental constraint violations in plant outputs as well as the time of occurrence in connection with the plant inputs reserved for stabilization.

The series of test SC vectors are calculated in accordance with $$\text{Test } SC = \Gamma SC(t) + B \, Col[A] Ci$$

where I' is an identity matrix; SC(t) is the stabilizing vector previously generated, B is the proportional gain matrix as previously defined; Col[A] are a column of elements of model matrix model A associated the at least one plant input of step (i) for which optimization is sought, and Ci is a series of of constants comprising said at least one string.

DETAILED CIRCUMSTANCES V

In another aspect, the control code of DETAILED CIRCUMSTANCES III that is derived from the present time t elements of the resulting OSC vector, is tailored to specifically control a large scale hydrocracking plant wherein the withdrawal rate of a particular product fraction, is to be optimized. Likewise, energy consumption in connection with in the reboiler furnace of the fractionator, is also to be minimized.

DETAILED CIRCUMSTANCES VI

Note that where separate goals for optimization are simultaneously occurring, as set forth in DETAILED CIRCUMSTANCES IV, supra, there must be separate strings of negative and/or positive constants Ci associated with each goal. Thus where there is to be both maximization and minimization goals for the plant inputs, separate evaluation is required. The magnitude and direction of the strings can be different however. The first string of constants in connection with product optimization can comprise constants C1, C2, $-$C2, $-$C1 where C1$>$C2, and the second string can comprise constants $-$Co and Co. Selection rules favor the left most constants of each string over the right most constants. But each includes least preferred negative or positive numbers so that optimal directions can be reversed, if needed. Thus where a plant input is to be minimized, e.g., fuel flow to the reboiler furnace, the selection rules favor a negative value. But a positive value is possible if the optimization direction must be reversed.

DETAILED CIRCUMSTANCES VII

Note that in connection with use of separate optimization goals as set forth in DETAILED CIRCUMSTANCES VI, supra, there are no limits either on the number of plant inputs or on the plant outputs that may be controlled. However, the number of plant inputs should be at least two, one for primary optimization and one for primary stabilization. Due to the proportional nature of the stabilizing and optimizing control, the number of controlled plant outputs may exceed the number of manipulated plant inputs. As to limitations in controlling the plant inputs, the magnitude of the control horizon M can be significantly less than that of the prediction horizon N. During pre-testing of the plant in connection with generating input/output pair responses, the prediction horizon N must be greater than the slowest step response. The sample period $\Delta t$ should also provide adequate sampling of the fastest response M in a range of M$=$N/2 to N/3 is sufficient in these regards.

DETAILED CIRCUMSTANCES VIII

Note the method of the present invention, must include a series of precursor steps in connection with the calculation of the gain matrix B and of gain matrix Bo/r. Such determinations are in accordance with $$-(R+A_A{}^T \cdot Q\, A_A)^{-1} \cdot A_A{}^T \cdot Q$$

in which R is a diagonal matrix associated with plant inputs X, Y and Q is a diagonal matrix associated with plant outputs Z; $A_A$ is an augmented matrix of responses of selected input/output pairs; and $A_A{}^T$ is the transpose of matrix $A_A$. The matrix R associated with the plant inputs X and Y is square of dimension M.Y$+$X where M is the control horizon, X is the number plant inputs reserved for optimization and Y is the plant inputs reserved for stabilization. R-elements associated with the X plant inputs are either constrained or are left unconstrained ($R_{o/r}$) as the corresponding gain matrix B or matrix Bo/r is calculated as set forth above.

DETAILED CIRCUMSTANCES IX

The generation of (a) the model matrix A and (b) the augmented matrix $A_A$ in accordance with DETAILED CIRCUMSTANCES VIII, require systematic measurements of changes between all plant input/output pairs. A method which provides both types of matrices, and still meets the accuracy requirements of the present invention, includes the following steps, viz.,:

(i) identifying plant inputs including measured disturbances with a designation 1 ... X where X is the total number of such inputs, and plant outputs with $a_{i,l}$ designation 1 ... Z where Z is the total number of such outputs, all associated with the plant to be controlled by the SC vector, (ii) implementing a step change in plant input designated 1;

(iii) after waiting one sample period, measuring all plant outputs in ascending order i$=$1 ... i$=$Z;

(iv) calculating step response elements $a_{i,l}$ as change in plant output i/step change in plant input j and storing as a column segment of a model matrix A relating incremental input/output pair response;

(v) repeating steps (iii) and (iv) in sequence for N periods so that the left-most column of matrix A is completely formed in accordance $$A = \begin{bmatrix} a_{11}(1) \\ \vdots \\ a_{11}(N) \\ ---- \\ a_{21}(1) \\ \vdots \\ a_{21}(N) \\ ---- \\ a_{31}(1) \\ \vdots \\ ---- \\ \vdots \\ a_{Z,1}(N) \end{bmatrix}$$

wherein each column includes a series of ordered segments each beginning with coefficient 1 and ending with coefficient N;

(vi) for plant inputs 2 ... X, repeating steps(ii)$-$(v) in sequence to form the remaining columns of the matrix A for remaining plant inputs including measured disturbances;

(vii) computing the augmented matrix $A_A$ from matrix A of step (vi) by shifting each ordered column segment associated with the plant inputs excluding the measured disturbances, one coefficient at a time downward from row 1 toward row N, inserting zeros in the original row 1 until all column segments have been decremented to form a series of augmented reordered columns and then repeating the process using each of the resulting ordered columns is augmented M times to form the augmented matrix $A_4$, wherein said augmented matrix $A_4$ provides compatible dimensions in connection with the mapping of the M-element input horizon into the N-element output horizon.

DETAILED CIRCUMSTANCES X

Note that the selection of gain matrix Bx under DETAILED CIRCUMSTANCES I, supra, that the following substeps can be used, viz., (a) generating an initial SC vector in accordance with $$SC = B.PR \quad (1)$$

wherein elements of rows A associated with the X plant inputs are constrained to zero and elements of rows B associated with the Y plant inputs, reflect the constrained condition in connection with rows A, each of the rows A, B having a magnitude (M) equal to $$M = \Delta[Us + Uo] \quad (2)$$

where Us is an evaluated component related to stabilization and Uo is a component related to optimization, (b) evaluating the the M's of B rows with respect to set point limits associated therewith to determine violations, if any, wherein (i) for such condition, Equation (1) is repeated using unconstrained gain matrix Bo/r and after zeroing all Uo's, the OSC vector is formed thereby providing only stabilization action in connection with unconstrained conditions in rows A and B; and (ii) for a complementary condition with respect to the M's of rows B, each of rows A is provided with a magnitude $M = Uoi$ where i is a series of constants individually pre-tested in connection with a series of test SC vectors generated in accordance with $$\text{Test } SC(t+1) = \Gamma.SC(t) + B.Col\,(A).Uoi$$

SC (t) is the prior time SC vector; I' is a time identity matrix; B is the gain matrix as set hereinabove; Col(A) is column of a model matrix associated with the particular X input to be optimized; and Uoi are optimizing components selected from a group of constants C1 comprising the desired magnitude and direction for optimization.

Furthermore the substep (b) can be detailed by the following addition steps involving the evaluation of the Uoi components in connection with the X plant inputs:

(a) pre-testing each constant of a series of constants Ci individually, by determining if the magnitude of the one or more of time t elements of the B rows of the theoretical SC vector, violates the set point limit constraint associated therewith. At such occasion, a winnowing process occurs. Ultimately the most desirable Uoi component is selected and then used to form the OSC vector. Result: the plant inputs can be driven toward optimization without use of optimal set point.

MANIPULATED AND CONTROLLED VARIABLES OF CONTROL SYSTEM 6

While it is apparent that any number of plant input variables (manipulated variables) and plant output variables (controlled variables) can be utilized in the method of the present invention, as previously mentioned, FIGS. 3 and 4 illustrate that two simultaneous optimization goals can be meet simultaneously in connection with the operation of hydrocracking plant 5 of FIGS. 1 and 2.

As shown in FIG. 3 a series of plant output variables are held at a selected set point values by manipulating five plant input variables, labeled manipulated input variables #1–#5, while optimization goals associated with two of the input variables #1–#5 are carried out. The optimization goals occur without the use of pre-determined optimal set points. The manipulated input variables #1–#5 relate to: (i) manipulating the average temperature of reactor 14 using a series of changing set points initiated via appropriate operation of valve network 46 operationally connected to universal controller 41 through optimizing and stabilizing computer 40 of FIG. 1. Object: to control both fuel flow and hydrogen quenching flow to furnace 11 and reactor 14 respectively; (ii) manipulating the average reactor temperature of reactor 15 in similar fashion as (i), supra, except controller 41 initiates operational change in fuel flow and hydrogen quenching flow to furnace 12 and reactor 15, respectively via valve network 47; (iii) manipulating the reboiler heat input to the reboil effluent passing to the fractionator 16 by controlling the temperature of furnace 13 by changing the fuel flow via valve 48; (iv) manipulating the draw flow rate of the gasoline fraction from fractionator 16 via valve network 49,; and (v) manipulating the draw flow rate of the jet fuel fraction exiting fractionator 16 via operation of valve network 49 within the distribution network 24 previously mentioned.

CONTROL OF FIRST STAGE REACTOR

Looking at item (i) in more detail, note that the average temperature of the first-stage reactor 14 is controlled by changes in fuel flow to furnace 11 via changes in valve 50 and by changes in hydrogen quenching flow via valves 51a–51d. Flow controller 52 which is a part of universal controller 41 of FIG. 1, provides mechanical change to the valves 50 and 51a–51d via linkages 52a. Such changes are based on actual measurements provided the controller 52 via connections 53, the latter being capable of accepting signals from a series of sensing devices and transducers (not shown) within the feed lines 54, as compared to signals provided to the controller 52 via line 55. The signals arriving at the controller 52 via line 55 represent a segment of the control code generated by the computer 40 of FIG. 1. The signal portion pertains to plant input variable #1 for which control in accordance with the present invention, is provided. Actual measurements are also transmitted back to the computer 40 of FIG. 1 via connection 56.

CONTROL OF SECOND STAGE REACTOR

In connection with item (ii), control of the second stage reactor 15 is similar in degree and kind to that associated with the first-stage reactor 14. For example, its temperature is similarly controlled, viz., by changes in fuel flow to the furnace 12 via changes in valve 60 and by changes in hydrogen quenching flow via valves 61a–61d. Flow controller 62 that is a part of the universal controller 41 of FIG. 1 provides mechanical changes to the valves 60 and 61a–61d via linkages 62a, the magnitude of which being a function of actual measurements provided the controller 62 via connections 63.

The latter have the capability of accepting signals from a series of sensing devices and transducers (not shown) within the feed lines 64, as compared to signals provided to the controller 62 via line 65. The signals arriving at the controller 52 via line 65 are a portion of the control code generated by the computer 40 of FIG. 1. The signal portion pertains to manipulated input variable #2 of the control system of the present invention. The actual flow measurements are seen to be transmitted back to the computer 40 via connection 66.

CONTROL OF GASOLINE DRAW RATE

Looking at item (iv) in similar detail, the average draw rate of the gasoline fraction of fractionator 16 is controlled by changes in valve 70 within draw line 71 under control of flow controller 72. Note that flow controller 72 that is a part of the universal controller 41 of FIG. 1, provides mechanical change to the valve 70 via linkages 72a that is a function of actual measurements provided the controller 72 via connection 73 that accepts signals from a sensing device and transducer (not shown) within the draw line 71, as compared to signals provided to the controller 72 the via line 74. The signals arriving at the controller 72 via line 74 are a portion of the control code generated by the computer 40 of FIG. 1. The signal portion pertains to manipulated input variable #4 for which control is provided by the present invention. The actual measurements are also transmitted back to the computer 40 via connection 75.

CONTROL OF JET FUEL FLOW RATE

In connection with item (v), the average draw flow rate of the jet fuel fraction of fractionator 16 is controlled by changes in valve 80 within draw line 81 under control of flow controller 82. The flow controller 82 which is a part of the universal controller 41 of FIG. 1, provides mechanical change to the valve 80 via linkage 82a that is a function of actual measurements provided the controller 82 via connection 83, the latter having the capability of accepting signals from a sensing device and transducer (not shown) within the draw line 81, as compared to signals provided to the controller 82 the via line 84. The signals arriving at the controller 82 via line 84 are a portion of the control code generated by the computer 40 of FIG. 1. The signal portion pertains to manipulated input variable #5 for which control is provided by the present invention. The actual flow measurements are seen to be transmitted back to the computer 40 via connection 85.

CONTROL OF REBOILER HEAT INPUT

Looking at item (iii) in detail, the reboiler heat input to the bottoms recycling to the fractionator 16 is controlled by changes in fuel flow to reboil furnace 13 via change in valve 90 under control of flow controller 92. The flow controller 92 which is also a part of the universal controller 41 of FIG. 1, provides mechanical change to the valve 90 via linkage 92a, such change being a function of actual measurements provided the controller 92 via connection 93. The latter accepts signals from a sensing device and transducer (not shown) within the feed line 94, as compared to signals provided to the controller 92 via line 95. The signals arriving at the controller 92 via line 95 are a portion of the control code generated by the computer 40 of FIG. 1. The signal portion pertains to manipulated input variable #3 for which control is provided by the present invention. The actual measurements are also transmitted back to the computer 40 via connection 96.

NATURE OF PLANT OUTPUT VARIABLES

FIG. 4 illustrates the plant output variables of hydrocracking plant 5 of FIGS. 1 and 2, in more detail.

As shown, the output variables are labeled #1-#4, and are controlled by selected manipulation of the plant inputs #1-#5 of FIG. 3. Each represents a measurable property of one or more product fraction exiting from fractionator 16 viz., (i) the gasoline end-point temperature, such value being provided to the computer 40 via analyzer 42 (output #2); (ii) freeze point temperature of the jet fuel fraction as provided by way of analyzer 43 (output #3); (iii) level of unreacted hydrocracking effluent within fractionator 16 (usual in terms of change from a predetermined set point) as provided the computer 40 via pressure transducing level indicator 44 (output #1); and (iv) recycle oil nitrogen content of recycled effluent from fractionator 16 as provided by indicator 45 (output #4). In this regard, note that such analyzers 42, 43 and indicators 44, 45 are commercially available from commercial vendors, and provide a measurable property each operating cycle through either direct inference by direct measurements, (viz., liquid level, jet freeze point or recycled nitrogen content), or indirect inference by other measurement, viz., the gasoline end-point temperature.

As will be explained below, such measurements are used in the evaluation of certain elements in connection with various vector-matrix multiplications carried out within optimizing and stabilizing computer 40 prior to the generation of the next-in-time control code. Since this aspect of evaluation is carried out within computer 40, a brief description of the latter is in order and appears below.

Computer 40 is conventional. It includes a central processing unit (CPU), a program memory for controlling the CPU, and general memory means for storing general data related to the plant output set point conditions as well as to mapping constants relating changes in the plant inputs #1-#5 plus measured disturbances to changes in the plant outputs #1-#4 in matrix format over a series of stepped changes 1 ... N. The general memory means also stores a series of limiting set points for each of the plant inputs reserved for stabilization and for one or more of the plant outputs, #1-#4.

The CPU in association with the program memory and the general memory, is controlled by programming instructions to generate optimizing and stabilizing control (OSC) and precursor vectors as discussed below. Object: to derive the next-in-time control code for manipulating (in a suitable form) the manipulated variables #1-#5.

In this regard, note that moving any one of the manipulated input variables via the control code must be compensated with moves (or step changes) in the remaining input variables #1-#5 reserved for stabilization. Moreover, the computer 40 must take into account the differences in stabilizing and optimizing functions as the plant is driven toward an arbitrary direction.

CONTROL SYSTEM 6

In accordance with the present invention, the objects are achieved by the control system 6 of FIG. 2.

Briefly, the computer 40 first predicts the effects of the next-in-time changes in plant variables using a series of vector-matrix multiplications and then through controller 41 controls the plant outputs within desired levels via selected changes in the plant inputs. Control is in accordance with the magnitudes of present time t evaluated elements of derived vectors within the computer 40 to effect changes in certain of the plant inputs via the controller 41 while driving one and preferably two other plant inputs toward optimal conditions. As explained below, the computer 40 is instructed to provide solutions to a series of vector-matrix multiplications that involve productizing a previously derived prediction (PR) vector with a gain matrix Bx for the evaluation of stabilizing and optimizing components. Such evaluation involves the determination of time t constraint violations of various elements and conditions as well as future time t+1 ... t+M violations thereof, if any, where M is the input control time horizon. Such evaluation permits precise changes in the make-up of the various matrices used to form the OSC vectors from which the control outputs are derived. Since stabilization of the plant, a most desirable goal, its attainment can be assured ahead of optimization goals. Result: plant outputs remain stabilized since their effects in terms of plant input response, have been previously sythesized in the above-mentioned vector-matrix multiplications.

FIGS. 5, 6 and 7 illustrates these steps in detail.

As shown in FIG. 5, process measurements and conditions are read into computer 40 at 100. Such measurements include the properties of interest previously indicated related to the plant inputs, the plant outputs, and disturbances within the process. Constraints related to the plant inputs as well as the setpoint levels related to selected plant inputs, as explained below, must also be of record.

Then a prediction (PR) vector is computed at 101 using the measurements of 100. In connection with the computation of the PR vector, assume that two of the plant inputs have been reserved for optimization (viz., the jet withdrawal rate and the reboiler heat input) and the remainder of the inputs (viz., the first stage reactor temperature, the second stage reactor temperature and the gasoline withdrawal rate), have been designated for stabilization of the plant. If the (PR) vector was not previously of record, a first-in-time PR vector must be computed. But if a PR vector is of record, such prior-in-time PR vector is updated by shifting it forward and adding effects of recent process changes, the up-dated PR vector being generated in accordance with:

$$x_A(t) = \Gamma \cdot x_A(t-1) + A \cdot \begin{bmatrix} u(t-1) \\ d(t-1) \end{bmatrix}_{measured} + C \cdot [x_{measured}(t) - x(t)] \quad (1)$$

where:

$$x_A(t) = \begin{bmatrix} \Delta \text{ Level} & (t+1) \\ \Delta \text{ Level} & (t+2) \\ \vdots \\ \Delta \text{ Level} & (t+N) \\ \Delta \text{ Gasoline EP} & (t+1) \\ \vdots \\ \Delta \text{ Gasoline EP} & (t+N) \\ \Delta \text{ Jet Freeze} & (t+1) \\ \vdots \\ \Delta \text{ Jet Freeze} & (t+N) \\ \Delta \text{ Recycle Nitrogen} & (t+1) \\ \vdots \\ \Delta \text{ Recycle Nitrogen} & (t+N) \end{bmatrix} \quad \begin{array}{l} \text{Future Outputs Predicted at} \\ \text{Present Time t} \end{array} \quad (2)$$

$$x_{measured}(t) = \begin{bmatrix} \Delta \text{ Level} & (t) \\ \Delta \text{ Gasoline EP} & (t) \\ \Delta \text{ Jet Freeze} & (t) \\ \Delta \text{ Recycle Nitrogen} & (t) \end{bmatrix} \quad \begin{array}{l} \text{Measured Present-Time} \\ \text{Values of Controlled Outputs} \end{array} \quad (3)$$

$$x(t) = \begin{bmatrix} \Delta \text{ Level} & (t) \\ \Delta \text{ Gasoline EP} & (t) \\ \Delta \text{ Jet Freeze} & (t) \\ \Delta \text{ Recycle Nitrogen} & (t) \end{bmatrix} \quad \begin{array}{l} \text{Previously Predicted} \\ \text{Present-Time Values of} \\ \text{Controlled Outputs} \end{array} \quad (4)$$

$$u(t-1) = \begin{bmatrix} \Delta \text{ 1st Reactor Temp.} & (t-1) \\ \Delta \text{ 2nd Reactor Temp.} & (t-1) \\ \Delta \text{ Gasoline Rate} & (t-1) \\ \Delta \text{ Jet Rate} & (t-1) \\ \Delta \text{ Reboiler Internal Heat} & (t-1) \end{bmatrix} \quad \begin{array}{l} \text{Manipulated Inputs at} \\ \text{Previous Execution Time } t-1 \end{array} \quad (5)$$

$$d(t-t) = \begin{bmatrix} \Delta \text{ Plant Feed Rate} & (t-1) \\ \Delta \text{ Recycle Rate} & (t-1) \end{bmatrix} \quad \begin{array}{l} \text{Disturbance Input at} \\ \text{Previous Excecution Time } t-1 \end{array} \quad (6)$$

$A$ = (4N × 7) Plant model matrix relating changes in manipulated and disturbance -continued inputs to changes in plant outputs (obtained in separate open-loop experiments. Four is the number of controlled variables and seven is the number of manipulated and disturbance variables.

$C$ = Matrix of constants $C$ (and zeros) for adding prediction error premultiplied by $C$ to appropriate elements of $x_A$ (every $N$-element sequence receives the same error term). (7)

$$\Gamma = \begin{bmatrix} I_s & & & 0 \\ & I_s & & \\ & & I_s & \\ 0 & & & I_s \end{bmatrix} \text{ where } I_s = \begin{bmatrix} 0 & 1 & & \\ & \cdot & \cdot & \\ & & \cdot & 1 \\ & & & 0 \end{bmatrix} \quad N \times N \text{ Shifted Identity Matrix} \quad (8)$$

$N$ = Number of future time steps considered for controlled variables (= prediction horizon).
$\Delta$ = Change relative to previous value, e.g., $\Delta$ level $(t + N)$ = level$(t + N)$ − Level $(t + N - 1)$.

Equation (1) at 101 is recursive in nature: Knowledge of the old prediction vector $x_A(t-1)$ and the measurements $u(t-1)$, $d(t-1)$, and $x_{measured}(t)$ allows calculation of a new prediction vector $x_A(t)$ for updating purposes by moving each element of the $x_A(t-1)$ vector up one position. According to Equation (8), the top element of every N-sequence of controlled variables is dropped; and the new bottom element is assumed to be zero. In some instances a better extrapolation is a new Nth element equal to the N−1st element (or an average of the two previous elements). It should be noted that $x(t)$ of Equation (4) are the top elements of every N-element controlled variable sequence in the full vector $x_A(t-1)$. Thus, it is important to compute the error terms $x_{measured}(t) - x(t)$ before the effects of $u(t-1)$ and $d(t-1)$ are added into $x_A(t-1)$. The prediction error gain C is a constant greater than zero and less than one, with the preferred range of 0.1-0.5, and with an exact value determined specifically for each application of the present invention. In summary, the PR vector normalized to present time t, predicts at a series of future times $t+1, t+2 \ldots t+N$ the outputs of the plant, viz., the incremental changes in liquid level within fractionator 16 of FIG. 4, gasoline EP, jet freeze point, and recycle nitrogen content, where N is a final prediction horizon for the plant. The incremental present time t values of the PR vector are the sum of a series of vector-matrix terms which related the effect of past plant input changes including changes in plant inputs and measured disturbances, on future changes in the above-identified plant outputs. Such determination uses, inter alia, a plant model in matrix format previously developed and stored together with measured plant input changes obtained from transducers within the plant.

The PR vector of 101 is then used to calculate a stabilizing control (SC) vector at 102 in accordance with:

$$SC(t) = B \cdot x_A(t) \quad (9)$$

where:

$$SC(t) = \begin{bmatrix} \Delta \text{ 1st Reactor Temp.} & (t) \ \# \\ \vdots \\ \Delta \text{ 1st Reactor Temp.} & (t + M) \\ \Delta \text{ 2nd Reactor Temp.} & (t) \ \# \\ \vdots \\ \Delta \text{ 2nd Reactor Temp.} & (t + M) \\ \Delta \text{ Gasoline Rate} & (t) \ \# \\ \vdots \\ \Delta \text{ Gasoline Rate} & (t + M) \\ \Delta \text{ Jet Rate} & (t) \ \#\# \\ \Delta \text{ Reboiler Heat} & (t) \ \#\# \end{bmatrix} \begin{array}{l} \text{Present} \\ \text{and} \\ \text{Predicted} \\ \text{Future} \\ \text{Stabilizing} \\ \text{Control} \\ \text{Action} \end{array} \quad (10)$$

$B = [(3M+2) \times 4N]$ Stabilizing controller gain matrix read in via input 102a after generation in a separate design operation.

$M$ = Number of future time steps in stabilizing control action plan (stabilizing control action horizon).

Gain matrix B enters into 102 via a read-in input 102a so as the resulting SC vector can be provided with correct control features of interest, e.g. the jet draw rate and the reboiler heat input elements for which optimization is sought, are not permitted to move in time, i.e., they have only present time t values. Note that the resulting SC vector comprise rows of elements associated with present and future time increment plant inputs. The top most rows are reserved for the stabilizing inputs, viz., the reactor temperatures and the gasoline withdrawal rate, while the optimizing inputs occupy the bottom most rows and are associated with present time t periods only, viz., the jet withdrawal rate and the reboiler heat input.

While the magnitude of the elements of the SC vector are evaluated as formation occurs, there is a first subset of elements indicated at # in Equation (10), supra, and a second subset of elements indicated at ## that undergo further definition. Each is seen to be only associated with present time t values and is symbolized by being made-up of two components, a stabilizing component Us and an optimizing component Uo or $\Delta[Us+Uo]$. As later described, they undergo further evaluation in association with the outcome of decisions of adequacy as to stabilization of the SC vector at 103 and 104.

Initially, the Us components of elements designated ## in Equation (10) associated with the plant inputs to optimized, viz, the jet withdrawal rate and the reboiler heat input are constrained, i.e., Us=0, while the Us components designated # are evaluated. At 103 and 104 each of the Us components designated # in Equation (10) associated with the stabilization of the plant (viz., the first reactor temperature, the second reactor temperature, or the gasoline draw rate where jet rate and reboiler heat input are to be optimized) are each tested against a predetermined constraint condition for each stabilizing plant input. If no constraints are encountered, optimizing components Uo designated ## in Equation (10) are then evaluated at 106. However, if an override condition is triggered at 104, then a new overriding SC vector is computed at 105 using gain matrix Bo/r stored on read-in tape 105a. The specific magnitude of the present time t Us components indicated at # in Equation (10) that trigger this condition is specific to each application. The override involves simply recalculation of Equation (9) with the override gain matrix Bo/r from 105a that allows additional stabilizing control action in both the jet draw rate and the reboiler heat input, to occur, viz., the Us components are not constrained but are permitted to change in time. Under the override condition, all Uo components become zero, i.e. Uo=0, as evaluation occurs at 106.

At 106 in FIG. 6 there is a determination of the optimizing components Uo indicated at # and ## in Equation (10) so as to optimize actions associated with the jet draw rate and the reboiler heat input. The logic rules for selecting the Uo values are read into block 106 from tapes 106a and 106b. While the latter will be explained in greater detail below, suffice to say the tapes 106a and 106b provide the following simplified expressions, where the selectable actions are ordered according to decreasing desirability from left-to-right:

$$Uo_O^{Jet\ Rate}(t) = \text{Select from } [+C_2, +C_1, 0, -C_1, C_2] \quad (11)$$

$$Uo_O^{Reboiler\ Heat}(t) = \text{Select from } [-C'_1, 0, +C'_1] \quad (12)$$

where:
$C'_1$, $C_1$, and $C_2$ are positive constants and $C_2 > C_1$.

In addition, at 106 the Uo components designated ## in Equation (10) associated with integral actions for plant output regulation to set point, are computed in accordance with:

$$u_O^{1\text{-}Reactor\ Temp.}(t) = K_I^1 \cdot \text{[Measured Recycle Nitrogen }(t) - SP(t)] \quad (13)$$

$$u_O^{2\text{-}Reactor\ Temp.}(t) = K_I^2 \cdot \text{[Measured Level }(t)SP(t)]$$

$$u_O^{Gasoline\ Rate}(t) = K_I^3 \cdot \text{[Measured Gasoline }EP(t) - SP(t)]$$

At 107 in FIG. 6 after the optimizing actions from Equations (11), (12), and (13) have been integrated to form the correct optimizing and stabilizing control (OSC) vector at 106, the control code for operation of universal controller 41 of FIG. 1, is derived. Attributes: It comprises present-time elements of the OSC vector only and is designed to operate though the universal controller 41 on a proportional basis only whereby the plant inputs to optimized can be driven toward optimization without use of optimal set points. The remaining plant inputs maintain stability. The latter change in linear proportion to deviations from preselected conditions, to control the plant outputs of interest.

Design of the control code on a proportional basis is based on mathematical relationships to bring about simultaneous stabilizing and optimization of the plant of the corresponding manipulated plant inputs. With implementation of the control actions via the control code of 107, the time-critical tasks are complete; the remaining task of testing for possible gain (Matrices B and $B_{O/R}$) adaptation can be carried out during the waiting period ($\approx$ sample period) or the process is made ready for the next execution via loop 108. For the hydrocracking process described earlier, the sample period is typically about 10 minutes.

After the control code of 107 has been enhanced as by change in form within computer 40 and then allowed to drive the controller 41, in an appropriate signal form, the occurrence of possible constraint violations are investigated at 109, 110 and 111 of FIG. 6. Briefly, such investigation involves the sequence of M actions for each manipulated variable relative to user-defined constraints for the manipulated variables. Mode of occurrence: it is simply carried out by adding one element at a time to the current value of the manipulated variable and comparing the sum with a corresponding constraint each time. If a constraint is reached, an integer "flag" is set equal to the future time step (<M) at which the constraint is predicted to be reached at 112 of FIG. 7. If a manipulated variable is found to be constrained presently, its flag is set to one. The flag is also set to one if the valve associated with a particular manipulated variable is found to be saturated (fully open or closed). After comparison with the prior OSC vector has occurred at 113, a change in the flag may be indicated at 119, as where relaxation of any input constraint or valve saturation has occurred. If any one flag (out of the three flags corresponding to the three stabilizing manipulated variables) has repeated, that resulting condition is also stored at 119.

The universal controller 41 of FIG. 1 is designed to operate in accordance with a linear quadratic (LQ) performance function using proportional control only. Because of iterative generation of the control code, the present invention emphasizes continuous proportional control of the plant inputs.

That is to say, assume that the performance function of the controller has a quadratic performance function which is to be minimnized:

$$\min J = \frac{min}{SC(t)}[x_B^T(t) \cdot Q \cdot x_B(t) + SC^T(t) \cdot R \cdot SC(t)] \quad (14)$$

where:
$x_B(t) = x_A(t) + A_A \cdot SC(t)$ (Closed-loop output prediction)
$SC(t)$ = as in Equation (10);
$Q = (Z \times N)$ Diagonal weighting matrix that penalizes changes in the controlled variables.
$R = M \cdot Y + X$ diagonal weighting matrix that penalizes changes in the manipulated variables.
$A_A$ = An augmented plant model matrix obtained from simple model matrix A associated with only plant input/output pairs and excluding plant disturbances (to be discussed later).

Then re-arranging Equation (9) in terms of Equation (14), proportional control of the SC vector is maintained each control cycle where:

$$B = -(R + A_A^T \cdot Q \cdot A_A)^{-1} \cdot A_A^T \cdot Q \quad (15)$$

Use of a matrix function in the form in Equation (15) where both the controlled outputs and the manipulated inputs are expressed as changes from previous values is important in model-algorithmic control operations. The advantage of this form is that the resulting control code from the computer 40 that drives the universal controller 41 of FIG. 1 is based on the linear proportional changes only and thus does not impose any conditions requiring steady state conditions. In addition, the trade-off between changes in the controlled variables versus changes in the manipulated variables can directly be set by selection of the weighting matrices Q and R in Equation (14). For example, if R is set to a zero matrix, the strongest possible operation in controller 41 is obtained: This type of operation puts no penalty on control actions but rather uses excessive input actions in order to minimize changes in controlled outputs. Such action is unsatisfactory for practical purposes, however. Hence, the diagonal elements of R will in general be nonzero positive constants.

However, the other extreme of infinite (or large) elements has a practical application in plant operations: An infinite element in the R matrix will constrain the corresponding manipulated input from moving, i.e., the move computed according to Equation (9) for the particular manipulated input is zero. This is used for constraining the manipulated inputs used for optimization, i.e., the R elements corresponding to the jet draw rate and the reboiler heat input are made large relative to other elements.

Note also that each stabilizing control input has M R-elements corresponding to the input sequence of M elements in the SC vector. This last property allows stabilizing plant inputs to be constrained at particular times during the M-element sequence, where appropriate, and is the basis for controlling such inputs in accordance with the present invention.

GENERATING GAIN MATRICES B AND Bo/r

The procedure for providing proportional gain matrices B and Bo/r at 102a and 105a of FIG. 5, will now be discussed.

As a brief overview, suffice to say that gain matrices B and Bo/r result from solving Equation (15) twice: (i) once to provide gain matrix B wherein present time t elements associated with the jet draw rate and the reboiler heat input, are constrained based on the use of a sufficiently large R-elements of the R matrix. Result: a constrained SC vector when the B matrix is used in accordance with Equation (9); and (ii) once to provide gain matrix Bo/r wherein optimizing plant inputs are unconstrained, and thus aid in stabilizing the plant.

Now in more detail with respect to generating the gain matrix B and matrix Bo/r:

(i) first the Q and R matrices are evaluated; and then (ii) the matrix B and Bo/r are generated in accordance with $B = -(R + A_A^T.Q \ A_A)^{-1}.A_A^T.Q$ and $Bo/r = -(R_{o/r} + A_A^T.Q \ A_A)^{-1}.A_A^T.Q$ where terms thereof are defined at Equation (15); and (iii) storing the generated gain matrix B and override matrix Bo/r for future use.

Note with respect to step (i), above, that constant weighting matrices Q and R are diagonal matrices because there is no incentive to penalize their cross products. Further, there is also no reason to attach time-dependent penalty factors because their control properties are akin to a continuous moving-window where changes at a certain time are as bad (or as good) as at another time. Hence, every ten-element output move sequence in the predictive state has the same weighting factor, as does every five-element control sequence in the control condition; assuming N is 10 and M is equal to N/2 or 5. Consequently, the number of tuning parameters contained in the Q and R matrices equals the number of controlled outputs and manipulated inputs and hence has physical significance in the control of plant operations. For example, (1) The ratios directly influences the corresponding gain of the control response vis-a-vis, between corresponding controlled outputs and corresponding manipulated inputs; and (2) The Q-factor ratio determines the priorities between the controlled outputs. The Q-values can be deduced by first setting the relevant factors of the output equal to 1 (arguing that a 1° F. or 1% change in any output is as bad as any other). Initially, the Q-factor for level control was set to 0.1 with the argument that a 10% change in level was as bad as a 1° F. change in the temperatures. However, a level Q-factor of 1.0 proved to be more satisfactory.

When the Q-factors have been set, the R-factors can initially be set to zero (or small values) to produce the strongest possible control. The R-factors are then increased to values that produce a reasonable gain for each manipulated variable. But for operations in which certain R-elements must aid in constraining certain plant inputs, the computer 40 can bring about the required conditions by selected increases in the magnitudes of the associated R-elements, say by a factor F. In this regard, the increases via factor F can be in a range of 50 to 150 with 75 to 125 being preferred, centered at F=100. Then when Equation (15) is again solved the provided gain matrices have the correct attributes to bring about the desired conditions.

As to generating the override gain matrix Bo/r, note these additional qualifications as the above steps (i)-(iii) are carried out, viz.,: (a) stabilization is emphasized at the expense of optimization of one or more plant inputs; and (b) the R-elements associated with optimization are decreased by the factor F to bring about a constrained condition in the control of the plant inputs.

UPDATING AND EVALUATION OF OPTIMIZING COMPONENTS Uo AND Uo'

As an overview of FIGS. 8A, 8B, 9A and 9B, the goal of the selection logic is the systematic evaluation of a series of optimizing constants associated with subsets S and S', all constant numbers. All of such constants relate to the optimization of a particular plant input. The control cycle can be in its initial state or can be associated with a later —updating" mode. It is of no great consequence since the essential similarity between the two is apparent from the description which follows. If no prior-in-time OSC vector has been generated (i.e., the controller is in its initial cycle), then the present-in-time stabilizing control (SC) vector is used to provide evaluation of its terms, as explained below. Contrariwise, if the present-in-time optimizing components have been previously evaluated, the situation is a bit more complexed, viz., after the present-in-time elements have restored and execution in connection with the corresponding control code has occurred, the next-in-time optimizing components are evaluated well before the start of the corresponding control cycle.

For initial treatment of the subject matter, assume that control of the plant has passed through initialization and that evaluation is keyed to present-in-time components in order to predict the value of the next-in-time components. Consequently, evaluation as presently discussed is limited to the circumstance where the optimizing and stabilizing control (OSC) vector has been previously been evaluated and employed to control the product sought to be optimized. Such execution is well before the occurrences of the next-in-time stabilizing control (SC) vector, however.

Briefly the evaluation in connection with optimization of a plant product first requires the generation of a series of next-in-time test SC vectors. Updating of the present time t SC vector through its multiplication with an identity matrix I, meets that requirement. The result of such updating is next summed using the following terms, viz., (a) the product of gain matrix B of Equation (15), (b) the particular column-row designation of the model matrix A related to the particular plant input of interest, and (c) the series of constants Ci of predetermined order, direction and magnitude, say where i is equal to 1,2,3 etc. Finally, the results are cross-checked to against constraint violations in connection with plant inputs reserved for stabilization, and with plant outputs closely associated with the particular goal for which optimization is sought. After grading the severity of the violation in a systematic manner, the most desirable constant is readily apparent for use as the Uo component in the next-in-time control cycle.

MATHEMATICAL BASES OF EVALUATION

Evaluation of Uo and Uo' components involve the following steps:

(i) from select subsets S and S' of constants $C_i$, first a series of test SC vectors must be calculated in accordance with $$\text{Test } SC(t+1) = I' \times SC(t) + B \times Col(A) \times Ci$$

where SC(t) is the stabilizing control (SC) vector of present time t; I' is a time increment N×N identity matrix; Col (A) is the column of elements of matrix A associated with the plant input to be optimized; and Ci is a constant selected from subset S comprising +C2, +C1, −C1, and −C2 for Uo components and from subset S' comprising −C1 and +C1 for Uo' components;

(ii) then the elements of the series of test SC (t+1) of step (i) associated with plant inputs reserved for stabilization, are analyzed to determine if they violate constraints as a function of particular Ci constants;

(iii) if any such elements of step (ii) violate constraints, the constants used in the generation of the SC vector are provided with an appropriate identifying annotator such as an asterisk.

(iv) then different elements viz., those associated with predetermined plant outputs of the series of theoretical SC(t+1) vectors, are analyzed for constraint violations as a function of the constants of subsets S and S', such violations being related to quality, phase and reserve capacity directly related to the plant product to be optimized;

(v) then after grading the severity of violation of each output as a function of the magnitude, order and direction of the constants comprising subsets S and S', the most desirable constant is selected as the Uo and Uo' components for use in the next-in-time SC vector.

FIGS. 8A, 8B, 9A and 9B deal with the evaluation selection logic in still more detailed form.

As shown in FIG. 8A after the process begins but before optimization can occur, there is a determination of whether or not an override constraint has been violated at 128. If such condition is triggered, the previously unevaluated Uo component of the SC vector is zeroed at 129 followed by the generation of a new SCo vector as previously described, viz., by solving Equation (9) using Bo/r matrix in the required matrix-vector multiplications. The result is then transferred to instruction 107, FIG. 6. If no override condition is triggered, instruction 130 becomes operative. That instruction determines if the next-in-time evaluation is the initial one or is in connection with a later-in-time cycle. If instruction 130 determines the occurrence of a later-in-time condition via an affirmative answer, then instruction 131 is triggered to start evaluation of the next-in-time components via a "YES" answer, while the previously determined Uo components are recovered from storage and then after progressing through continue instruction at 132, they are inserted at instruction 133 to form the next-in-time OSC vector for that corresponding control cycle. The result is then transferred to instruction 107, FIG. 6. If instruction 130 determines that no Uo components have been previously calculated, i.e., an initialization condition exists via a "NO" at the output of instruction 130, then instruction 134 selects and groups a series of optimization constants for testing the Uo components in connection with the plant input of interest. These constants are denoted as a subset "S" in instruction 134 and are ordered as to magnitude and direction within the subset S, say as a series of positive and negative numbers comprising +C2, +C1, −Ci and −C2. Then at instruction 135 each of the constants of the subset S is tested to determine if any plant inputs associated with stabilization violate constraints. Mathematically, this means computing the corresponding stabilizing control vector as set forth above.

After the series of test SC vectors have been generated and the elements associated with the plant inputs reserved for stabilization have been checked for constraint violations, the particular constants that give rise to such violations are stored at 135a and identified with an asterisk(*).

Next, a series of determinations related to key plant output conditions that are closely associated with the optimized plant input, are carried out at 136 (FIG. 8A), and at 137 and 138 (FIG. 8B) in order to fine tune the constant selection process. In this regard, there is a determination at 136 whether or not present time t elements associated with the plant output having the most strong correlation with the quality of the plant input to be optimized, are violated. If there are present time t violations, additional testing at future times t+1 . . . t+M occurs at 136a resulting in the selection of the least undesirable of the negative numbers (−C1) or (−C2) of the subset S via instructions 139 and 140 of FIG. 8B, subject to the asterisk (*) subcode determination of instruction 135a (FIG. 8A). If the selected constants do not relate to the initial control cycle as determined at 141a, they are stored at 142a. If there are no present time t violations, additional testing at future times t+1 . . . t+M occurs at 136b (FIG. 8A). A positive reading triggers instruction 139 (FIG. 8B) while a negative result, permits conditions associated with the next most closely aligned plant output to be tested at 137 and 138 (FIG. 8B). That is, an plant output next strongest in correlation with the optimized plant input that is phase matched, is next tested in connection with predetermined reserve characteristics in connection therewith. At 137, violations below the setpoint range for that output (i.e., a negative response of instruction 137), e.g., indicate that insufficient capacity in connection with phase matched plant input is available for maximum optimization conditions. Hence a further determination in connection with future times $t+1$ ... $t+M$, is triggered at 143. If there is a positive response to 143, loop 143a is entered, activating instruction 139 with storage occurring at 142a of the most negative constant of the subset S if the cycle is not the initial condition of control in accordance with instruction 141a. If the determination at 143 is negative, the Uo component is set to zero at 144 and that result is stored at 142b provided the control cycle is not the initial one as determined at 141b. At 138, violations above the setpoint range of the plant output of interest, indicate sufficient reserve is available for stronger optimization action. Such a condition triggers further determinations at 145 and 146. At 145 the highest constant for the Uo component resulting the strongest optimization action, is stored at 142c assuming the control cycle is not the initial one as determined at 141c. While at 146 a negative response results in the least positive constant for the Uo component also entering storage at 142c after passing through instruction 141c.

FIGS. 9A and 9B deal with selection logic in connection with subset S' for minimizing energy consumption.

As shown in FIG. 9A there is first a determination of whether or not an override constraint has been violated at 150. If such condition is triggered, the previously unevaluated Uo' component of the SC vector is zeroed at 151 followed by the generation of the SCo vector as previously described, viz., by solving Equation (9) using Bo/r matrix in the required matrix-vector multiplications. The result is then transferred to instruction 107, FIG. 6. If no override condition is triggered, instruction 152 becomes operative. That instruction determines if the next-in-time evaluation is the initial one or is in connection with a later-in-time cycle. If instruction 152 determines the occurrence of a later-in-time condition via an affirmative answer, then instruction 153 is triggered to start evaluation of the next-in-time components via a "YES" answer, while the previously determined Uo' components are recovered from storage and then after progressing through continue instruction at 154, they are inserted at instruction 155 in forming the next-in-time OSC vector for that corresponding control cycle. The result is then transferred to instruction 107, FIG. 6. If instruction 152 determines that no Uo' components have been previously calculated, i.e., an initialization condition exists via a "NO" at the output of instruction 152, then instruction 156 selects and groups a series of optimization constants for testing as the Uo' components in connection with the plant input of interest. These constants are denoted in instruction 156 and are ordered as to magnitude and direction within the subset S', say as a series of positive and negative numbers comprising $-C1$ and $+C1$. Then at instruction 157 each of the constants of the subset S' is tested to determine if any plant inputs associated with stabilization violate constraints. Mathematically, this means computing an estimate of the corresponding stabilizing control vector in accordance with the equation set forth above.

After the series of theoretical SC vectors have been generated and the elements associated with the plant inputs reserved for stabilization have been checked for constraint violations, the particular constants that give rise to such violations are stored at 157a and identified with an asterisk(*).

Next, a series of determinations related to key plant conditions that are closely associated with the optimized plant input, are carried out at 158 (FIG. 9A), and at 159 and 160 (FIG. 9B) in order to fine tune the constant selection process. In this regard, there is a determination at 158 whether or not a constraint violation below a set point of an internal parameter occurs. Such internal parameter is not related to direct measurements associated with either plant inputs or plant outputs, but in a characteristic of say, vapor/liquid flow within the final column where separation of the plant inputs and outputs occur. It is a parameter those minimum set point establishes the minimum quality standards for the product for which optimization is also sought. This parameter is not found within matrix-vector terms from which the series of SC vectors were generated, but is a separate measurement. In effect, such an internal parameter, complementarily relates twin goals of energy minimization with product quality. In some cases, merely maintaining the process above a parameter limit normalized to selected cross-section of the fractionator, is sufficient. However, other times, the limit must be based on more remote variables selected in association with the operations of the reactors upstream of the separation column as well as the characteristics of the streams undergoing processing. The final constraint however, determines a minimum tradeoff between energy usage within the separation column and optimization of the product(s) exiting the plant and represents an internal setpoint having the strongest complementary correlation therebetween. If there is a present time violation of such internal parameter at 158, instruction 161 is triggered whereby the present time t value of the Uo' component for controlling the plant input directly related to energy minimization, say the fuel flow to the reboiler furnace servicing the separation column, is equated to the least active of the constants of the subject S', viz., the positive constant $+C1'$. The determination at 161 is subject to the asterisk (*) subcode resulting from instruction 157a. If the selected Uo' components do not relate to the initial control cycle as determined at 161a, they are stored at 162a. Next, present time t and future time $t+1$ ... $t+M$ elements associated with the next most closely aligned plant output (that output having the next most strong correlation with energy minimization), are evaluated at 159. Such a plant output usually relates to the output characteristics of the plant input for which the plant product production is being simultaneously optimized. If there are violations, instruction 163 is triggered. As a result, the Uo' component to be associated with the present time t elements of the OSC vector associated with energy minimization, is constrained. If the selected Uo' components do not relate to the initial control cycle as determined at 161b, they are stored at 162b. If there is no violations triggered at 159 then a third set of present time constraints are evaluated at 160. These determinations are in connection with the next most closely aligned plant output vis-a-vis energy minimization, viz., having too much liquid within the final separation column available for recycling. Such condition means there is a violation of a constraint above a maximum setpoint. If the determination at 160 is affirmative, loop 164 is entered, and instruction 163 is again activated. If the determination at 160 is negative, then instruction 165 is triggered wherein the Uo' component in connection with energy minimization is set equal to —C1′ of subset S′ for greatest control effect. At instruction 165, use of the −C1 constant is subject to the asterisk subcode provided at instruction 161a. If the selected Uo′ components do not relate to the initial control cycle as determined at 161c, they are stored at 162c.

FURTHER ILLUSTRATIVE EXAMPLES

In order to better illustrate which particular plant outputs are chosen in aiding the selection of the optimizing components Uo and Uo′ in the hydrocracking plant 5 of FIGS. 1 and 2, attention is now directed to FIGS. 10, 11 and 12.

In FIGS. 10 and 11 in connection with optimizing the jet final fraction of the plant 5, determinations at 171 and 172 are the same as those at 128, 134 and 135 of FIGS. 8A and 8B. Note that the first test at 171 is for the override stabilizing control case wherein no optimizing control action is taken if this degree of freedom has been sacrificed for stabilizing control. Next at 172 and 173 determines if the full set of selectable optimizing actions must be limited to a subset and remembers this subset (marked * at instruction 173). The instruction 172 provides the present invention with "artificial intelligence" since it is based on judging the effects for all four selectable actions on the next-in-time stabilizing control action plan assuming initialization has been completed. Mathematically, this means computing an estimate of the next-in-time stabilizing control action plan using Equation 16 in the same way as previously used.

The decision to allow different Uo components is based on the elements of SC(t+1), i.e., if excessive control action is detected such as an input constraint violation of plant inputs reserved for stabilization, the particular Uo component is disallowed. The testing should begin with the strongest optimizing actions $+C_2$ and $-C_2$ because if these are allowed, so are the weaker actions $+C_1$ and $-C_1$. In some applications, the equation in common with the theoretical SC vectors need not be solved but rather the effect of testing the Uo(t) components is known by experience. Hence such values can be allowed or disallowed based on the current stabilizing plan.

Instructions 174 and 175 test for constraint violation in the jet fuel freeze point temperature which is the most important plant output relative to the withdraw rate of the jet fuel fraction (correlation between the two is strong). If the jet freeze point is currently in violation (about its constraint value in °F.) at 174, instruction 175 checks the future situation; and depending on the outcome, the jet draw rate is reduced either by a large step at 176 or by a smaller step at 177. Note that the direction of these moves is against the optimal direction. Reason: product specification has priority over production rate. Instruction 178 of FIG. 11 is a repetition of instruction 175.

Instruction 179 of FIG. 11 deals with another plant output characteristic (viz., the controlled variable associated with the liquid level within the fractionator 16 of FIG. 2) in much the same way as instruction 174 dealt with jet freeze point. However, the liquid level need not be kept as tightly controlled as to set point as the jet freeze quality, and hence only the weaker $-C_1$ correction is called for at instruction 180. Finally, instruction 181 decides between strong optimizing action $+C_2$ and weak optimizing action $+C_1$.

Now turning to the particular decision logic for minimizing reboiler heat input, note the features of FIG. 12 wherein the steps for establishing the optimizing control action for the reboiler heat input are similar to the jet draw rate optimizing steps set forth in FIGS. 10 and 11, except there are fewer constants are present, viz., $-C_1$, $+C_1$ and 0, for determination at 185, 186 and 187. The primarily instructions 182 and 183 to such determinations, are similar to the instructions 155, 158 and 159 of FIGS. 9A and 9B. But the decision logic for optimizing the reboiler heat input then becomes simpler because only three selectable actions are considered according to Equation (12). Note that instruction 185 tests an internal parameter of vapor/liquid traffic within the fractionator 16 that is neither a manipulated variable (plant input) nor controlled variable (plant output), but one that relates in complementary fashion to the two inputs undergoing optimization. This characteristic of interest, viz., of the ratio of vapor and liquid traffic within fractionator 16 of FIG. 2, is a parameter that has long been recognized as a prerequisite to adequate fractionation efficiency.

Simply stated, experience has taught that the ratio of vapor to liquid traffic within fractionator 16, must must not drop below an user-defined minimum setpoint constraint, or plant performance is severely restrained. Reason: below such constraint, there is a severe reduction of fractionation efficiency. Thus the ratio of vapor and liquid traffic determines the trade-off between energy usage (reboiler heat input) and product optimization (maximum jet fuel fraction) for the case of the hydrocracking plant 5 of FIGS. 1 and 2. While such constraint is specific to the hydrocracking plant 5 of FIGS. 1 and 2, optimization as to minimizing energy consumption, may require the use of a different parameter well known in the processing art. In this regard, note that such characteristic has the attribute that is relates the two plant inputs for which optimization is sought, in a complementary manner. Note in future circumstances, that it need not be as simple as the vapor/liquid traffic condition of Block 51 in FIG. 5.

MODELING OF THE HYDROCRACKING PLANT 5

As previously discussed, modeling of the hydrocracking plant 5 of FIGS. 1 and 2 (or any process to be controlled) is a first requirement for generating a correct control code that satisfies both optimizing and stabilizing criteria for the processes involved. Such modeling data is employed in the generation of the required mathematical matrices forming, ultimately, OSC vector of Equation (13) from which the present time t control code of the present invention, is generated. Such code optimizes one or more plant inputs while maintaining plant stability. The modeling is achieved by tests involving a known stepped changes in the manipulated variables #1–#5 of FIG. 3 and measurements of the effect of such changes on the controlled variables #1–#4 of FIG. 4 and results in a model matrix A and an augmented matrix $A_A$ that helps in predicting future changes in plant input/output pairs.

Preliminarily to such operations, the plant input and measured disturbances must be identified as to particular designations in terms of function within the plant or process to be controlled; likewise, the plant outputs must be likewise designated. In the hydrocracking plant of FIGS. 1 and 2, the plant inputs and measured disturbances as well as plant outputs are indicated as follows:

| Plant Input Type | No. |
|---|---|
| 1st Stage Reactor Temp. | 1 |
| 2nd Stage reactor Temp. | 2 |
| Gasoline Withdrawal Rate | 3 |
| Jet Fuel Withdrawal Rate | 4 |
| Measured Disturbance | |
| Plant Feed Rate | 5 |
| Recycle Rate to 2nd Stage Reactor | 6 |
| Plant Output Type | |
| Liquid Level w/in Fractionator | 1 |
| Gasoline End-point | 2 |
| Jet Freeze Point | 3 |
| Nitrogen Content, Recycle Stream | 4 |

Briefly in accordance with this aspect of the present invention, a method is provided for generating the model matrix A and the augmented matrix $A_A$ having compatible time dimensions in connection with controlling a plant having a series of plant inputs and outputs. The method comprises the steps of:

(i) identifying plant inputs including measured disturbances with a designation $1 \ldots X$ where X is the total number of such inputs, and plant outputs with a i designation $1 \ldots Z$ where Z is the total number of such outputs, all associated with the plant to be controlled by the SC vector;

(ii) incrementing a step change in a plant input 1;

(iii) after waiting one sample period, measuring all plant outputs in ascending order $i=1 \ldots i=Z$;

(iv) calculating step response elements $a_{i,j}$ as change in plant output i/step change in plant input j and storing as a column segment of a model matrix A relating incremental plant input/output pairs response;

(v) repeating steps (iii) and (iv) in sequence so that the left-most column of matrix A is completely formed in accordance $$A = \begin{bmatrix} a_{11}(1) \\ \vdots \\ a_{11}(N) \\ \text{----} \\ a_{21}(1) \\ \vdots \\ a_{21}(N) \\ \text{----} \\ a_{31}(1) \\ \vdots \\ \text{----} \\ \vdots \\ a_{Z,1}(N) \end{bmatrix}$$

wherein each column includes a series of ordered segments each beginning with coefficient 1 and ending with coefficient N;

(vi) repeating steps(ii)–(v) in sequence to form the remaining columns of the matrix A for remaining plant inputs including measured disturbances;

(vii) computing the augmented matrix $A_A$ from matrix A of step (vi) by shifting each ordered column segment associated with the plant inputs excluding the measured disturbances, one coefficient at a time downward from row 1 toward row N, but inserting zeros in the original row 1 until all column segments have been decremented to form a series of augmented reordered columns and then repeating the process using each of the resulting ordered columns is augmented M times to form the augmented matrix $A_A$, wherein said augmented matrix $A_A$ provides compatible dimensions in connection with the series of matrix-vector multiplications for the generation of the gain matrix Bx.

Figure 13B:
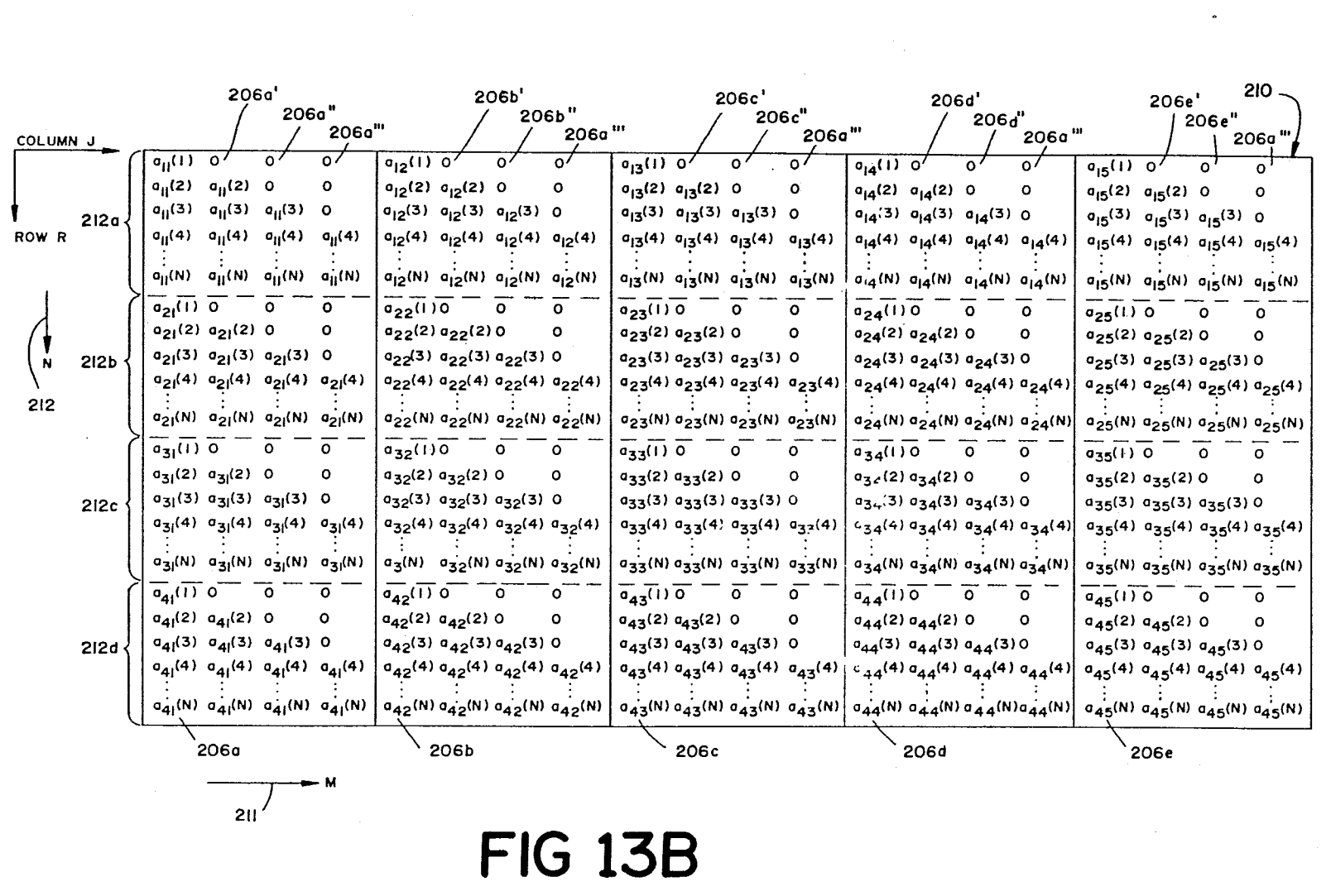

FIG. 13A illustrates final form of matrix A in detail.

As shown, the matrix 205 have been readdressed so that each column J, viz., columns $206a, 206b \ldots 206g$ of elements relating to common inputs as indicated by the second number in the subscript of each element, are segmented into intervals $207a, 207b \ldots 207d$. Within each interval, the elements begin with the time horizon N and ends with time interval (1), and is associated with a common output as indicated by the common first subscript within each interval. That is, over each segment of N intervals, each output is common within each of the intervals $207a, 207b \ldots 207d$ but are not uniform from interval to interval. The input remains common for the entire length of each column $206a, 206b \ldots 206g$, however, as indicated by the common second subscript of each elements. Arrow 208 indicates the N dimension. Each row R has a common plant output and common time interval as designated by the first number in the subscript and by the common interval in parenthesis.

FIG. 13B illustrates the augmented matrix $A_A$ in detail.

As shown, the augmented matrix 210 only includes the columns $206a \ldots 206e$ of FIG. 15A in connection with the plant inputs, and not columns $206f$ and $206g$. The changes involving the latter are not included in the augmented matrix 210 since the interrelationship of disturbances and measured plant outputs in the future is not predictable. Side-by-side to each column $206a \ldots 206e$ is a series of subcolumns $206a', 206a'', 206a''', 206b', 206b'' \ldots 206e'''$ that together provide dimension integrity in connection with vector-matrix multiplications involving the augmented matrix $A_A$ such as in Equation (13) for generation of the OSC vector. Present time t elements of the OSC vector provides the control code for operation of the plant at present time t in the manner previously described. Arrow 211 indicates the M dimension of the matrix 210. Arrow 212 disregards the N dimension. In FIG. 15B, M is seen to be equal to four (4). Note that in forming the matrix 210 that the prior order of each column $206a, 206b$, is used. For example from column $206a$, the columns $206a'$ is formed by decrementing the locations of the rows of elements R1 through $Rn-1$ one row at a time beginning at 1 row and ending at each interval N but allowing the last decremented row Rn to become zeroed. For column $206a''$, the procedure is repeated using column $206a'$ and then rerepeated for the subsequent generation of the column $202a''$. Thereafter, the entire process is repeated for columns $206b, 206c \ldots 206e$. With respect to the augmented matrix 210, there is no constraint placed on the output prediction time horizon (N) nor on the stabilizing control action time horizon (M). A rule of thumb is that N sample periods should cover most of the slowest step response in the plant prediction involving plant input-output pairs, while the sample period itself should provide adequately frequent sampling of the fastest response. A further rule of thumb is that M may be significantly less than N such as N/2 or N/3.

What is claimed is:

1. A method for integrating on-line optimization without destabilizing a refinery, chemical process or the like associated with a plurality of independently controlled manipulated plant inputs X, Y, and one or more controlled plant outputs Z dependent upon said manipulated plant inputs X, Y in which proportional control using the manipulated plant inputs X, Y can occur using control codes generated from a plurality of matrix-vector multiplications, in a manner that allows rapid optimization of the X plant inputs without need of optimal set points to define optimal conditions, said method comprising (i) establishing mapping logic for relating changes in the X and Y plant inputs plus measured disturbances to changes in the Z plant outputs in matrix format over a series of stepped changes 1 ... N;

(ii) after establishing measurements of said Z plant outputs and of prior incremental changes in connection with X and Y plant inputs and measured disturbances, generating a stabilization and optimizing control (OSC) vector normalized to present time t by means of a series of matrix-vector multiplications, said OSC vector including elements in rows 1 ... Y and rows 1 ... X corresponding to incremental changes in plant inputs Y and X, respectively, normalized to present time t as well as incremental future changes in at least Y plant inputs based on said mapping logic of step (i), and being of a form:

$$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said process, whereby a present time t control code derived from said OSC vector causes incremental changes in said inputs X and Y in accordance therewith, so that said inputs X can be driven toward optimization without use of optimal set points while inputs Y can maintain stability using only incremental changes therein, to control outputs Z in linear proportion thereto.

2. Method of claim 1 with the additional step of repeating step (ii) without waiting for steady-state conditions so as to pursue optimization of said inputs X without the need for steady-state conditions between control cycles.

3. Method claim 2 in which the additional step is further characterized by a series of control signals being derived from said present time t control code for the purpose of providing correct incremental set point levels for said X and Y plant inputs so as to effect the desired incremental changes in said inputs X and Y in accordance therewith.

4. Method of claim 1 in which Z plant outputs exceed the number of plant inputs X,Y.

5. Method of claim 4 in which M is greater than N.

6. Method of claim 1 in which the mapping logic of step (i) is obtained by modeling the refinery, chemical process or the like prior to actual operations, by introducing test disturbances in said X, Y plant inputs and measured disturbances as stepped changes and measuring for each step change over a sample period 1, 2 ... N the changes in said Z plant outputs, wherein N is at least equal to the slowest step response of any plant output Z to a change in plant input X,Y and measured disturbances.

7. Method of claim 6 in which each sample interval $\Delta t$ in the total sampling interval 1, 2 ... N associated with said mapping logic stored in a computer means, is adequate to sample the fastest step response of any plant output Z to a change in plant input X,Y and measured disturbances.

8. Method of claim 7 in which said mapping logic comprises a series of stored elements in matrix format in which columns are associated with common X, Y plant input or measured disturbance and in which rows are associated with common Z plant output.

9. Method of claim 1 in said OSC vector of step (ii) is further characterized by said incremental changes of rows 1 ... Y being normalized to time t, t+1 ... t+M where M is the limit in time of control horizon, and said incremental changes of rows 1 ... X having magnitudes selected after at least one precursor stabilizing control (SC) vector has been generated and evaluated.

10. Method of claim 9 said at least one precursor SC vector is generated by matrix-vector multiplications in accordance with $$SC = B_x \cdot PR$$

where SC comprises a single column vector having rows 1 ... X' and 1 ... Y' of elements and being of a form $$SC(t) = \begin{bmatrix} \Delta Z_1(t+1) \\ \Delta Z_1(t+2) \\ \vdots \\ \Delta Z_1(t+N) \\ \Delta Z_2(t+1) \\ \vdots \\ \Delta Z(t+N) \end{bmatrix};$$

$B_x$ is a proportional gain matrix selected from the group of gain matrices B and Bo/r, wherein the selection of matrix B or Bo/r is based on constraint violations involving limiting set points in connection with rows 1 .. . Y' above a selected level, and PR is a multi-row, single column prediction vector normalized to the time t.

11. Method of claim 10 in which said B gain matrix is of the form YN+X rows by ZM columns while said Bo/r matrix is of the form (Y+X)N rows by ZN columns, wherein gain matrix B produces constrained elements in connection with rows 1 ... X' with said SC vector but wherein gain matrix Bo/r produces unconstrained elements in connection with both rows 1 ... X' and 1 ... Y' within said SC vector.

12. Method of claim 10 in which said PR vector comprises a column of predicted changes in each plant output at common time sample periods t+1 ... t+N where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods t+1 . . . t+N using said previously stored plant model of incremental input vs. output operations, together with measured plant input changes.

13. Method of claim 10 in which said selection of gain matrix Bx includes the substeps of
  (a) generating an initial SC vector in accordance with $$SC = B \cdot PR \qquad (1)$$

wherein elements of rows A associated with the X plant inputs are constrained to zero and elements of rows B associated with the Y plant inputs, reflect the constrained condition in connection with rows A, each of the rows A,B having a magnitude (M) equal to $$M = \Delta[Us + Uo[ \qquad (2)$$

where Us is an evaluated component related to stabilization and Uo is a component related to optimization,
  (b) evaluating the the M's of rows B with respect to set point limits therefor to determine violations, if any, wherein (i) for such condition, Equation (1) is repeated using gain matrix Bo/r and after zeroing all Uo's, the OSC vector is formed thereby providing only stabilization in connection with unconstrained conditions in rows A and B; and (ii) for a complementary condition with respect to the M's of rows B, each of rows A is provided with a magnitude M=Uoi where i is a series of constants individually pre-tested in connection with a series of test SC vectors generated in accordance with $$SC(t+1) = I' \cdot SC(t) + B \cdot Col\ (A) \cdot Uoi$$

where
  SC(t+1) is the test SC vector;
  SC (t) is the prior time SC vector; I' is a time identity matrix; B is the gain matrix as set hereinabove; Col(A) is column of a model matrix associated with the particular X input to be optimized; and Uoi are optimizing components selected from a group of constants comprising the desired magnitude and direction of optimization.

14. Method of claim 13 in which substep (b) involving the evaluation of said Uoi components in connection with said X plant inputs, is further characterized by pre-testing each Uoi component individually, by determining if the magnitude of said one or more of time t elements of said rows B of the test SC vector, violates the set point limit constraint associated therewith wherein a winnowing of selectable Uoi components occurs whereby ultimately the most desirable Uoi component therein, is selected and then used to form said OSC vector to drive said X inputs toward optimization without use of optimal set points.

15. A method for integrating on-line optimization without destabilizing for a refinery, chemical process or the like associated with a plurality of independently controlled manipulated plant inputs X and Y, and one or more controlled plant outputs Z dependent upon said manipulated plant inputs X, Y in which closed loop, proportional control of the manipulated plant inputs X, Y can occur in accordance with a series of pre-tested optimizing control components, Uo, whereby optimization of the X plant inputs can be accelerated, deaccelerated, zeroed, or reversed without use of optimal set points in association therewith, said Y plant inputs being reserved for stabilization in connection with set points established for themselves as well as the Z plant outputs, incremental changes of said Y plant inputs being essentially defined by a series of stabilizing control components, Us, reflecting constraints associated with the X plant inputs but bringing about stabilization employing only changes in the Y plant inputs, whereby said X plant inputs do not require optimal set points to define optimal conditions, said method comprising
  (i) establishing mapping logic for relating changes in the X and Y plant inputs plus measured disturbances to changes in the Z plant outputs in matrix format over a series of stepped changes 1 ... N;
  (ii) after establishing measurements in said Z plant outputs and in prior incremental changes in connection with X and Y plant inputs and measured disturbances, generating a stabilizing and optimizing control (OSC) vector normalized to present time t by means of a series of matrix-vector multiplications, said OSC vector including elements in rows 1 ... Y and rows 1 ... X corresponding to incremental changes in plant inputs Y and X, respectively, normalized to present time t as well as incremental future changes in at least Y plant inputs based on said mapping logic of step (i), and being of a form:

$$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said process,
  (iii) deriving a present time t control code from said OSC vector and causing incremental changes in said inputs X and Y in accordance therewith, whereby said inputs X can be driven toward optimization without use of optimal set points while inputs Y can maintain stability using only incremental changes therein to control outputs Z, in linear proportion thereto, (iv) without waiting for steady-state conditions, repeating step (ii) and (iii) so as to pursue optimization of said inputs X without the need for steady-state conditions between control cycles.

16. Method of claim 15 in which Z plant outputs exceed the number of plant inputs X,Y, and in which M is greater than N.

17. Method of claim 15 in which step (ii) of generating said OSC vector, is characterized by the generation of a precursor SC vector for evaluation purposes prior in time in accordance with $$SC = B_x \cdot PR$$

where SC comprises a single column, multi-row vector; Bx is a proportional gain matrix selected from the group consisting of a gain matrix B and a gain matrix Bo/r,- where selection is on the basis of constraint violations involving limiting set points in connection with said Y inputs above a selected level, and PR is a multi-row, single column prediction vector normalized to the time t.

18. Method of claim 17 in which said PR vector comprises a column of predicted changes in each plant output at common time sample periods $t+1 \ldots t+N$ where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods $t+1 \ldots t+N$ using said previously stored plant model of incremental input vs. output operations, together with measured plant input changes.

19. Method of claim 17 in which selection of gain matrix Bx includes the substep of:

(a) generating an initial SC vector in accordance with $$SC = B \cdot PR \quad (1)$$

wherein elements of rows A associated with the X plant inputs are constrained to zero and elements of rows B associated with the Y plant inputs reflect the constrained condition in the rows A, each of the elements of rows A,B having a magnitude (M) equal to $$M = \Delta[Us + Uo]$$

where Us is an evaluated component related to stabilization and Uo is a component related to optimization, (b) evaluating the M's of rows B with respect to a set point limit therefor wherein (i) for such condition, Equation (1) is repeated using gain matrix Bo/r and after zeroing all Uo's, the OSC vector is formed thereby so as to provide only stabilization action in connection with unconstrained conditions in rows A and B; and (ii) for a complementary condition, each of elements of rows A is provided with a magnitude $M = Uoi$ where i is a series of constants individually pre-tested in connection with a series of test SC vectors in accordance with $$SC(t+1) = I' \cdot SC(t) + B \cdot Col(A) \cdot Uoi \text{ where}$$

SC(t+1) is the test SC vector;

SC (t) is a prior time t SC vector; I' is a time identity matrix; B is the gain matrix as set forth hereinabove; Col(A) is column of a model matrix associated with the particular X input to be optimized; and Uoi are optimizing components selected from a group of constants comprising the desired magnitude and direction of optimization.

20. A method for integrating on-line optimization without destabilizing of a large-scale refinery, chemical plant or the like associated with a plurality of independently controlled manipulated plant inputs X, Y, and one or more controlled plant outputs Z dependent upon said manipulated plant inputs X, Y in which proportional control of the manipulated plant inputs X, Y can occur in a manner that allows rapid optimization of the X plant inputs wherein said X plant inputs are equal to at least two (2) in number undergoing simultaneous rapid optimization without the need of optimal set points, said method comprising (i) after establishing measurements in said Z plant outputs and in prior incremental changes in connection with X and Y plant inputs and measured disturbances, generating a stabilizing and optimizing control (OSC) vector normalized to present time t by means of a series of matrix-vector multiplications, said OSC vector including elements in rows $1 \ldots Y$ and rows $1 \ldots X$ corresponding to incremental changes in plant inputs Y and X, respectively, normalized to present time t as well as incremental future changes in at least Y plant inputs based on mapping logic relating changes in plant inputs to changes in Z plant outputs, and being of a form:

$$OSC = \begin{array}{c} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{array}$$

where M is a limit in future time for controlling said process, (ii) deriving a present time t control code from said OSC vector and causing incremental changes in said inputs X and Y in accordance therewith, whereby said inputs X can be driven toward optimization without use of optimal set points while inputs Y can maintain stability using only incremental changes therein to control outputs Z in linear proportion thereto, (iii) without waiting for steady-state conditions, repeating step (i) and (ii) so as to pursue optimization of said inputs X without the need for steady-state conditions between control cycles.

21. Method of claim 20 in which one of said X plant inputs comprises a characteristic associated with a product of said refinery, chemical plant or the like, for which maximization is sought during optimization.

22. Method of claim 21 in which said characteristic for which maximization is sought during optimization, is withdrawal flow rate in connection with said product associated with said refinery, chemical plant or the like.

23. Method of claim 20 in which another of said X plant inputs comprises a characteristic associated with energy conservation in connection with said refinery, chemical plant or the like for which minimization is sought during optimization.

24. A method for controlling a two-stage hydrocracking process including a first-stage reactor for reacting a feed and a hydrogen charge under hydrocracking conditions to produce a hydrocracked product and an unreacted hydrocracking effluent, a distillation column fractionator for producing a jet fuel fraction and a jet fuel fraction of said hydrocracked product as well as separating the hydrocracked product from said hydrocracking effluent, into recycle and reboil effluent, and a second stage reactor for reacting the recycled hydrocracking effluent also under hydrocracking conditions with addition hydrogen to produce additional hydrocracked product, by a computer-dominated, constrained-dependent control system integrating on-line optimization without destabilizing the process by controlling controlled outputs Z including particular set points associated with gasoline end point and jet fuel freeze point properties, recycle effluent nitrogen content and hydrocracking effluent level within said distillation column fractionator, via appropriate, proportional manipulation of a series of independently controlled manipulated plant inputs X, Y, said plant inputs Y being associated with temperatures within the first-stage and second-stage reactors, and withdrawal rate of the one of the jet fuel and gasoline fractions from the fractionator, while said plant inputs X being associated with at least the rapid optimization the withdrawal rate of the other of the jet fuel and gasoline fractions whereby said X plant inputs are no longer limited to slow steady-state pursuit toward optimization nor require optimal set points to define said optimal conditions, said method comprising (i) establishing mapping logic for relating changes in the X and Y plant inputs plus measured disturbances in connection with feed and recycle flow rates, to changes in the Z plant outputs in matrix format over a series of stepped changes 1 . . . N;

(ii) after establishing measurements in said Z plant outputs and measurements in connection with prior incremental changes in X and Y plant inputs and in measured disturbances, generating a stabilizing and optimizing control (OSC) vector normalized to present time t by means of a series of matrix-vector multiplications, said OSC vector including elements in rows 1 . . . Y and rows 1 . . . X corresponding to incremental changes in plant inputs Y and X, respectively, normalized to present time t as well as incremental future changes in at least Y plant inputs based on said mapping logic of step (i), and being of a form:

$$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said hydrocracking process, (iii) deriving a present time t control code from rows 1 . . . X and 1 . . . Y of said OSC vector and causing incremental changes in said inputs X and Y in accordance therewith, whereby said inputs X can be driven toward optimization without use of optimal set points while inputs Y can maintain stability using only incremental changes therein to control outputs Z in linear proportion thereto.

25. Method of claim 24 with the additional step of repeating step (ii) and (iii) without waiting for steadystate conditions so as to pursue optimization of said inputs X without the need for steady-state conditions between control cycles.

26. Method of claim 24 in which Z plant outputs exceed the number of plant inputs X, Y and in which M is greater than N.

27. Method of claim 24 in which the mapping logic of step (i) is obtained by modeling the two-stage hydrocracking process prior to actual operations, by introducing tests changes in said X, Y plant inputs and measured disturbances in connection with flow rates of said feed and recycle effluent, as stepped changes and measuring for each step change over a sample period 1, 2 . . . N the changes in said Z plant outputs, wherein N is at least equal to the slowest step response of any plant output Z to a change in plant input X,Y and measured disturbances.

28. Method of claim 27 in which magnitude of each sample interval $\Delta t$ in the total sampling interval 1, 2 . . . N associated with said mapping logic stored in a computer means being adequate to sample the fastest step response of any plant output Z to a change in plant input X,Y and measured disturbances.

29. Method of claim 27 in which said mapping logic comprises a series of stored elements in matrix format in which columns are associated with common X, Y plant input or measured disturbances in connection with changes in the feed and recycle flow rates, and in which rows are associated with common Z plant output.

30. Method of claim 24 in which step (iii) includes the substep of generating a precursor SC vector by vector-matrix multiplication for evaluation purposes prior in time to said OSC vector in accordance with $$SC = B_x \cdot PR$$

where SC comprises a single column vector having rows 1 ... X' and 1 ... Y' of evaluated elements of the form $$SC(t) = \begin{bmatrix} \Delta Z_1(t+1) \\ \Delta Z_1(t+2) \\ \vdots \\ \Delta Z_1(t+N) \\ \Delta Z_2(t+1) \\ \vdots \\ \Delta Z(t+N) \end{bmatrix};$$

Bx is a proportional gain matrix of a group comprising gain matrix B and gain matrix Bo/r wherein matrix selection is based on occurrence and intensity of violations in connection with said Y inputs above selected levels, and PR is a multi-row, single column prediction vector normalized to the time t.

31. Method of claim 30 in gain matrix B is of the form YN+X rows by ZM columns, while said gain matrix Bo/r is of the form (Y+X)N rows by ZM columns, wherein gain matrix B produces constrained elements in connection with rows 1 ... X' within said SC vector but wherein gain matrix Bo/r produces unconstrained elements in connection with rows 1 ... X' and 1 ... Y' within the SC vector.

32. Method of claim 30 in which said PR vector comprises a column of predicted changes in each plant output at common time sample periods t+1...t+N where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods t+1 ... t+N using said previously stored plant model of incremental input vs. output operations, together with measured plant input changes.

33. Method of claim 30 in which in which selection of gain matrix Bx includes the substeps of:

(i) generating an initial SC vector in accordance with $$SC_i = B.PR \quad (1)$$

wherein elements of rows A associated with the X plant inputs are constrained to zero and elements of rows B associated with the Y plant inputs, reflect the constrained condition in connection with rows A, each of the rows A,B having a magnitude (M) equal to $$M = \Delta[Us + Uo[ \quad (2)$$

where Us is an evaluated component related to stabilization and Uo is a component related to optimization, (b) evaluating the M's of rows B with respect to set point limits therefor to determine violations, if any, wherein (i) for such condition, Equation (1) is repeated using gain matrix Bo/r and after zeroing all Uo's, and the OSC vector is formed so as to provide only stabilization in connection with unconstrained conditions in rows A and B; and (ii) for a complementary condition with respect to the M's of rows B, each of prior constrained rows A is provided with a magnitude M=Uoi where i is a series of constants individually pre-test in connection with a series of test SC vectors generated in accordance with Test $SC(t+1) = \Gamma.SC(t) + B.Col(A).Uoi$ where
SC(t+1) is the SC vector;
SC (t) is the prior time t SC vector; $\Gamma$ is a time identity matrix; B is the gain matrix; Col(A) is a column of a model matrix associated with the particular X input to be optimized; and Uoi are optimizing components selected from a group of constants comprising the desired magnitude and direction of optimization.

34. Method of claim 33 in which substep (b) involving the evaluation of said Uoi components in connection with said X plant inputs, is further characterized by pre-testing each Uoi component individually by determining the occurrence and degree of violations of set point limits associated with time t elements in connection with rows B of each generated test SC vector, wherein for each violation in association therewith, a winnowing of selectable Uoi components occurs whereby ultimately the most desirable Uo component for use therein, is selected and then used to form said OSC vector to drive said X inputs toward optimization without use of optimal set points.

35. Method of claim 34 wherein the Uoi components are in connection with withdrawal rate of jet fuel fraction from the two-stage hydrocracking process, said Uoi components comprising a string of constants +C2, +C1, 0, −C1 and −C2 with leftmost constants of said string being most desirable in connection with maximizing said withdrawal rate.

36. Method of claim 34 wherein the Uoi components are in connection with rate of fuel flow to the reboiler furnace in connection with the reboil hydrocracking effluent, said Uoi components comprising a string of constants −C1 and +C1 with the leftmost constant of said string being the most desirable in connection with minimizing energy consumption therein.

37. Method for controlling a two-stage hydrocracking process including a first-stage reactor for reacting a feed and a hydrogen charge under hydrocracking conditions to produce a hydrocracked product and an unreacted effluent, a distillation column fractionator for providing gasoline and jet fuel fractions from the hydrocracked product as well as separating said said hydrocracked product from said unreacted effluent into recycle and reboil effluent, and a second stage reactor for reacting the recycle effluent also under hydrocracking conditions with addition hydrogen to produce additional hydrocracked product, said system integrating on-line optimization without destabilizing the process by controlling controlled outputs Z including particular set points associated with gasoline end point temperature, jet fuel freeze point temperature, recycle nitrogen content and hydrocracking effluent level within said distillation column fractionator, via appropriate, proportional manipulation of a series of independently controlled manipulated plant inputs Y associated with temperatures within the first-stage and second-stage reactors, and withdrawal rate of one of the gasoline and jet fuel fractions from the fractionator, while optimizing other plant inputs X in accordance with a series of pretested optimizing control components, Uo, in a manner that allows them to be driven toward optimization under constrained conditions, whereby optimization of said X plant inputs can be accelerated, deaccelerated, zeroed, or reversed without use of optimal set points, said Y plant inputs being reserved for stabilization in connection with maximum set points established for themselves as well as the Z plant outputs, incremental changes of said Y plant inputs being essentially defined by a series of stabilizing control components, Us, reflecting constraints associated with the X plant inputs but bringing about stabilization employing only changes in the Y plant inputs, irrespective of disturbance changes in the process associated with changes in feed and recycle flow rates, said method comprising (i) establishing mapping logic for relating changes in the X and Y plant inputs plus measured disturbances to changes in the Z plant outputs in matrix format over a series of stepped changes 1 ... N;

(ii) after establishing measurements in said Z plant outputs and in prior incremental changes in connection with X and Y plant inputs and in measured disturbances, generating a stabilizing and optimizing control (OSC) vector normalized to present time t by means of a series of matrix-vector multiplications, said OSC vector including elements in rows 1 ... Y and rows 1 ... X corresponding to incremental changes in plant inputs Y and X, respectively, normalized to present time t as well as incremental future changes in at least Y plant inputs based on said mapping logic of step (i), and being of a form:

$$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said hydrocracking process, (iii) deriving a present time t control code from rows 1 ... X and 1 ... Y of said OSC vector and causing incremental changes in said inputs X and Y in accordance therewith, whereby said inputs X can be driven toward optimization without use of optimal set points while inputs Y can maintain stability using only incremental changes therein to control outputs Z in linear proportion thereto, (iv) without waiting for steady-state conditions, repeating step (ii) and (iii) so as to pursue optimization of said inputs X without the need for steady-state conditions between control cycles.

38. Method of claim 37 in which step (iii) includes the substep of generating a precursor SC vector by vector-matrix multiplication prior in time to said OSC vector in accordance with $$SC = Bx.PR$$

where SC comprises a single column vector having rows 1 ... X' and 1 ... Y' of evaluated elements of the form $$SC(t) = \begin{bmatrix} \Delta Z_1(t+1) \\ \Delta Z_1(t+2) \\ \vdots \\ \Delta Z_1(t+N) \\ \Delta Z_2(t+1) \\ \vdots \\ \Delta Z(t+N) \end{bmatrix};$$

Bx is a proportional gain matrix of a group comprising gain matrix B and gain matrix Bo/r wherein matrix selection is based on occurrence and intensity of violations in connection with said Y inputs above selected levels, and PR is a multi-row, single column prediction vector normalized to the time t.

39. Method of claim 38 in which said PR vector comprises a column of predicted changes in each plant output at common time sample periods t+1 ... t+N where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods t+1 . . . t+N using said previously stored plant model of incremental input vs. output operations, together with measured plant input changes.

40. Method of claim 38 in which selection of gain matrix Bx includes the substeps of:

(i) generating an initial SC vector in accordance with $$SC_i = B.PR \qquad (1)$$

wherein elements of rows A associated with the X plant inputs are constrained to zero and elements of rows B associated with the Y plant inputs, reflect the constrained condition in connection with rows A, each of the rows A,B having a magnitude (M) equal to $$M = \Delta[Us + Uo] \qquad (2)$$

where Us is an evaluated component related to stabilization and Uo is a component related to optimization, (b) evaluating the M's of rows B with respect to set point limits therefor to determine violations, if any, wherein (i) for such condition, Equation (1) is repeated using gain matrix Bo/r and after zeroing all Uo's, the OSC vector is formed so as to provide only stabilization action in connection with unconstrained conditions in rows A and B; and (ii) for a complementary condition with respect to the M's of rows B, each of prior constrained rows A is provided with a magnitude M=Uoi where i is a series of constants individually pre-test in connection with a series of test SC vectors generated in accordance with $$\text{test } SC(t+1) = I'SC(t) + B \text{ Col } (A) \text{ Uoi}$$

where

SC(t+1) is the test SC vector;
SC (t) is the prior time t SC vector; I' is a time identity matrix; B is the gain matrix; Col(A) is column of a model matrix associated with the particular X input to be optimized; and Uoi are optimizing components selected from a group of constants comprising the desired magnitude and direction of optimization.

41. Method of claim 40 in which substep (b) involving the evaluation of said Uoi components in connection with said X plant inputs, is further characterized by pretesting each Uoi component individually by determining the occurrence and degree of violations of set point limits associated with time t elements in connection with rows B of each generated test SC vector, wherein for each violation in association therewith, a winnowing of selectable Uoi components occurs whereby ultimately the most desirable Uo component for use therein, is selected and then used to form said OSC vector to drive said X inputs toward optimization without use of optimal set points.

42. Method of claim 41 wherein the Uoi components are in connection with withdrawal rate of jet fuel fraction from the two-stage hydrocracking process, said Uoi components comprising a string of constants +C2, +C1, 0, −C1 and −C2 with leftmost constants of said string being most desirable in connection with maximizing said withdrawal rate.

43. Method of claim 41 wherein the Uoi components are in connection with rate of fuel flow to the reboiler furnace in connection with the reboil hydrocracking effluent, said Uoi components comprising a string of constants −C1 and +C1 with the leftmost constant of said string being the most desirable in connection with minimizing energy consumption therein.

44. A method for controlling a large-scale hydrocracking process that includes first-stage and second stage hydrocracking reactor means for producing a hydrocracked product and means for providing a gasoline fraction and a jet fuel fraction of said hydrocracked product as well as separating said hydrocracked product from a hydrocracking effluent so as to produce a recyle portion and a reboil portion, in connection with a computer-dominated constraint-dependent control system that integrates on-line optimization of at least two plant inputs X without using optimal set points in connection therewith, with stabilization of Z plant outputs, said X plant inputs including at least one input related to a characteristic associated with incremental change in one of said gasoline and jet fuel fractions and at least another input related to incremental change in a characteristic associated with said reboil portion of said hydrocracking effluent, said plant outputs Z of the process including gasoline end point temperature, jet freeze point temperature, recycle hydrocracking effluent level and nitrogen content of the recycled hydrocracking effluent, said plant inputs Y being reserved for stabilization and including incremental changes in connection with temperatures within said first-stage and second-stage reactor means, and a characteristic associated with other of said gasoline and jet fuel fractions, said system manipulating said inputs using a present time t control code generated from a series of matrix-vector multiplications, whereby said plant inputs X can be driven toward optimization without use of optimal set points while inputs Y can maintain stability using only incremental changes therein to control outputs Z in linear proportion thereto, said method comprising:

(i) establishing mapping logic for relating changes in the X and Y plant inputs plus measured disturbances to changes in the Z plant outputs in matrix format over a series of stepped changes 1 ... N;

(ii) after establishing measurements in said Z plant outputs and in connection with in prior incremental changes in X and Y plant inputs and in measured disturbances, generating a stabilizing and optimizing control (OSC) vector normalized to present time t by means of a series of matrix-vector multiplications, said OSC vector including elements in rows 1 ... Y and rows 1 ... X corresponding to incremental changes in plant inputs Y and X, respectively, normalized to present time t as well as incremental future changes in at least Y plant inputs based on said mapping logic of step (i), and being of a form:

$$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

M is a limit in future time for controlling said hydrocracking process, (iii) deriving a present time t control code from rows 1 ... X and 1 ... Y of said OSC vector and causing incremental changes in said inputs X and Y in accordance therewith, whereby said inputs X can be driven toward optimization without use of optimal set points while inputs Y can maintain stability using only incremental changes therein, in linear proportion to deviations from preselected conditions, to control outputs Z, (iv) without waiting for steady-state conditions, repeating step (ii) and (iii) so as to pursue optimization of said inputs X without the need for steady-state conditions between control cycles.

45. The method of claim 44 in which step (iii) includes the substep of generating a precursor SC vector by vector-matrix multiplication prior in time to said OSC vector in accordance with $$SC = Bx.PR$$

where SC comprises a single column vector having rows $1 \ldots X'$ and $1 \ldots Y'$ of elements of the form $$SC(t) = \begin{bmatrix} \Delta Z_1(t+1) \\ \Delta Z_1(t+2) \\ \cdot \\ \cdot \\ \cdot \\ \Delta Z_1(t+N) \\ \Delta Z_2(t+1) \\ \cdot \\ \cdot \\ \cdot \\ \Delta Z(t+N) \end{bmatrix};$$

Bx is a proportional gain matrix of a group comprising gain matrix B and gain matrix Bo/r wherein matrix selection is based on occurrence and intensity of violations in connection with said Y inputs above selected levels, and PR is a multi-row, single column prediction vector normalized to the time t.

46. Method of claim 45 in gain matrix B is of the form YN+X rows by ZM columns, while said gain matrix Bo/r is of the form (Y+X)N rows by ZM columns, wherein gain matrix B produces constrained elements in connection with rows $1 \ldots X'$ within said SC vector but wherein gain matrix Bo/r produces unconstrained elements in connection with rows $1 \ldots X'$ and $1 \ldots Y'$ within SC vector.

47. Method of claim 45 in which in which selection of gain matrix Bx includes the substeps of:
  (i) generating an initial SC vector in accordance with $$SC_i = B.PR \tag{1}$$

wherein elements of rows A associated with the X plant inputs are constrained to zero and elements of rows B associated with the Y plant inputs, reflect the constrained condition in connection with rows A, each of the rows A,B having a magnitude (M) equal to $$M = \Delta[Us + Uo] \tag{2}$$

where Us is an evaluated component related to stabilization and Uo is a component related to optimization,
  (b) evaluating the M's of rows B with respect to set point limits therefor to determine violations, if any, wherein (i) for such condition, Equation (1) is repeated using gain matrix Bo/r and after zeroing all Uo's, the OSC vector is formed so as to provide only stabilization action in connection with unconstrained conditions in rows A and B; and (ii) for a complementary condition with respect to the M's of rows B, each of prior constrained rows A is provided with a magnitude M=Uoi where i is a series of constants individually pre-test in connection with a series of test SC vectors generated in accordance with $$Test\ SC(t+1) = I'.SC(t) + B.Col\ (A).Uoi$$

where
SC(t+1) is the test SC vector;
SC(t) is the prior time t SC vector; I' is a time identity matrix; B is the gain matrix; Col(A) is column of a model matrix associated with the particular X input to be optimized; and Uoi are optimizing components selected from a group of constants comprising the desired magnitude and direction of optimization.

48. Method of claim 47 in which substep (b) involving the evaluation of said Uoi components in connection with said X plant inputs, is further characterized by pre-testing each Uoi component individually by determining the occurrence and degree of violations of set point limits associated with time t elements in connection with rows B of each generated theoretical SC vector, wherein for each violation in association therewith, a winnowing of selectable Uoi components occurs whereby ultimately the most desirable Uo component for use therein, is selected and then used to form said OSC vector to drive said X inputs toward optimization without use of optimal set points.

49. Method of claim 48 in which said one of said X plant inputs for optimization, is the withdrawal flow rate of the jet fuel fraction from the hydrocracking process for which maximization thereof, is sought, and wherein the Uoi components in connection therewith comprising a string of constants +C2, +C1, 0, −C1 and −C2 with leftmost constants of said string being most desirable in connection with maximizing said withdrawal rate.

50. Method of claim 48 in which the another of said said X plant inputs for optimization, is the fuel flow to a reboil furnace for heating said reboil effluent for energy conservation purposes and wherein the Uoi components in connection therewith comprising a string of constants −C1 and +C1 with the leftmost constant of said string being the most desirable in connection with minimizing energy consumption therein.

51. A computer-dominated constraint-dependent control system for integrating on-line optimization without destabilizing a refinery, chemical process or the like associated with a plurality of independently controlled manipulated plant inputs X, Y, and one or more controlled plant outputs Z dependent upon said manipulated plant inputs X, Y in which proportional control of the manipulated plant inputs X, Y can occur using control codes generated from a plurality of matrix-vector multiplications, in a manner that allows rapid optimization of the X plant inputs but wherein said X plant inputs do not require optimal set points to define optimal conditions, said system comprising
  a series of flow control means within said refinery, chemical process or the like, associated with said X and Y inputs for effecting incremental changes therein, and a series of transducer means for measuring said Z plant outputs and measured disturbances associated with inputs X, Y,
  controller means including mechanical linkage means operationally connected to said flow control means associated with said X and Y plant inputs for independently effecting incremental change therein, said controller means also including separate transducer means for measuring incremental changes in said X and Y plant inputs, computer means operationally connected to said series of transducer means and said controller means for generating a present time t control code as well as for predicting future conditions associated therewith, thereby providing for the systematic control of said Z plant outputs by manipulating said X and Y plant inputs, wherein on an incremental proportional basis alone, said X inputs pursuing optimization, said Y inputs pursuing stabilization in connection with themselves as well as said Z plant outputs said computer means including a central processing unit (CPU), a program memory for controlling said CPU, and general memory means for storing general data related to the refinery, chemical process or the like to be controlled, including mapping logic for relating changes in the X and Y plant inputs plus measured disturbances to changes in the Z plant outputs in matrix format over a series of stepped changes 1 . . . N;

said general memory means also storing a series of limiting set points for each of said Y plant inputs and for one or more of said plant outputs, said CPU in association with said program memory and said general memory, generating an optimizing and stabilizing control (OSC) vector normalized to time t as a result of a series of matrix-vector multiplications, said OSC vector including elements corresponding to incremental changes in inputs X and Y normalized to present time t as well as including incremental future changes in at least Y plant inputs, and being of a form $$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said process, whereby said inputs X can be driven toward optimization without use of optimal set points while inputs Y can maintain stability as a function of incremental changes therein to thereby maintain plant outputs Z, in linear proportion thereto.

52. System of claim 51 in said elements of said OSC vector comprise rows 1 . . . Y, and rows 1 . . . X, respectively, associated with incremental changes of inputs 1 . . . Y and 1 . . . X normalized from prior in time changes, said incremental changes of inputs 1 . . . Y being a function of time t, t+1 . . . t+M for stabilization purposes, said incremental changes for inputs 1 . . . X having magnitudes selected on a pre-test criterion after a precursor stabilizing control (SC) vector has been generated with said row 1 . . . X constrained, whereby optimization of the associated plant inputs X can rapidly occur without the need of steady-state conditions between control cycles.

53. System of claim 51 in which the mapping logic stored in said general memory means is obtained by modeling the refinery, chemical process or the like prior to actual operations, by introducing tests disturbances in said X, Y plant inputs and measured disturbances as stepped changes and measuring for each step change over a sample period 1, 2 . . . N the changes in said Z plant outputs, wherein N is at least equal to the slowest step response of any plant output Z to a change in plant input X,Y and measured disturbances.

54. System of claim 53 in which each sample interval $\Delta t$ in the total sampling interval 1, 2 . . . N associated with said mapping logic stored in said computer means, is adequate to sample the fastest step response of any plant output Z to a change in plant input X,Y and measured disturbances 55. System of claim 54 in which said mapping logic of said general memory means comprises a series of stored elements in matrix format in which columns are associated with common X, Y plant input or measured disturbance and in which rows are associated with common Z plant output.

56. System of claim 51 in said general memory means of also stores a series of gain matrices Bx including a proportional gain B matrix and a proportional gain Bo/r matrix associated with generating said precursor SC vector in said CPU in accordance with SC = Bx.PR where SC comprises a single column vector having rows 1 . . . Y' and 1 . . . X' of elements of the form $$SC(t) = \begin{bmatrix} \Delta Z_1(t+1) \\ \Delta Z_1(t+2) \\ \vdots \\ \Delta Z_1(t+N) \\ \Delta Z_2(t+1) \\ \vdots \\ \Delta Z(t+N) \end{bmatrix};$$

PR is a multi-row, single column prediction vector normalized to time t.

57. System of claim 56 in which said B gain matrix stored in said general memory means of said computer means is of the form YN+X rows by ZM columns while said Bo/r matrix is of the form (Y+X)N rows by ZN columns, respectively.

58. System of claim 56 in which the selection of gain matrix Bx stored in said general memory for use in said CPU in generating said precursor SC vector in accordance with SC=Bx.PR is based on constraint violations involving limiting set points in connection with elements 1 . . . Y' above selected levels.

59. System of claim 56 or 58 in which said PR vector comprises a column of predicted changes in each plant output at common time sample periods $t+1 \ldots t+N$ where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods $t+1 \ldots t+N$ using said previously stored plant model of incremental input vs. output operations, together with measured plant input changes 60. System of claim 56 or 58 in which the selection of gain matrix B or Bo/r employs said CPU to generate an initial SC vector in accordance with $$SC=B.PR \qquad (1)$$

wherein elements of rows $1 \ldots X'$ associated with the X plant inputs, are constrained to zero, and elements of rows $1 \ldots Y'$ associated with the Y plant inputs reflect the constraint condition in connection with rows $1 \ldots X'$, each of the elements of rows $1 \ldots X'$ and $1 \ldots Y'$ having a magnitude (M) equal to $$M = \Delta[Us+Uo]$$

where Us is an evaluated component related to stabilization and Uo is a component related to optimization, said M's being evaluated with respect to set point limits therefor to determine violations, if any, wherein (i) for such condition, Equation (1) is iterated using gain matrix Bo/r and after zeroing all Uo's, the OSC vector is formed thereby providing only stabilization action in connection with unconstrained conditions of elements of rows $1 \ldots X'$ and $1 \ldots Y'$; and (ii) for a complementary condition with respect to the M's of rows $1 \ldots X'$, each element thereof is provided with a magnitude $M = Uoi$ where i is a series of constants for individually pre-testing each constant in connection with a series of test SC vectors generated in said CPU in accordance with $$Test\ SC(t+1) = I'.SC(t) + B.Col\ (A).Uoi$$

where
SC(t+1) is the test SC vector;
SC (t) is the present t SC vector; I' is a time identity matrix; B is the gain matrix stored in the memory; Col(A) is column of a model matrix associated with the particular X input to be optimized; and Uoi are optimizing components selected from a group of constants comprising the desired magnitude and direction of optimization.

61. System of claim 60 in which said CPU pre-tests said Uoi components in connection with said X plant inputs prior to generation of said OSC vector by determining if present and future time t, $t+1 \ldots t+M$ one or more plant outputs Z closely associated with the X plant input to be optimized, exceed a limiting set point limit constraint associated therewith.

62. System of claim 61 in which selection of Uoi components in said CPU is based on constraint violations by one or more plant outputs Z, normalized to occurrences of violations at present time only versus present and future times.

63. System of claims 60 in which said computer means is further characterized by input/output means and signal-converting and enhancing means attached thereto for decoding measurements from said series and separate transducer means and encoding said controller means with correct control signals for said controller means, said control signals being derived from said present time t control code associated with the present time t rows of said OSC vector and providing correct set point levels in said controller means associated with said X and Y plant inputs wherein said flow controller means are activated so as to effect the desired incremental changes in said inputs X and Y in accordance therewith.

64. A computer-dominated constraint-dependent control system for integrating on-line optimization without destabilizing a refinery, chemical process or the like associated with a plurality of independently controlled manipulated plant inputs X and Y, and one or more controlled plant outputs Z dependent upon said manipulated plant inputs X, Y in which closed loop, proportional control of the manipulated plant inputs X, Y can occur in accordance with a series of pre-tested optimizing control components, Uo, whereby optimization of the X plant inputs can be accelerated, deaccelerated, zeroed, or reversed without use of optimal set points in association therewith, said Y plant inputs being reserved for stabilization in connection with set points established for themselves as well as the Z plant outputs, incremental changes of said Y plant inputs being essentially defined by a series of stabilizing control components, Us, reflecting constraints associated with the X plant inputs but bringing about stabilization employing only changes in the Y plant inputs, whereby said X plant inputs do not require optimal set points to define optimal conditions, said system comprising a series of flow control means for effecting incremental changes in said X and Y inputs within said refinery, chemical process or the like, and a series of transducer means for measuring changes in said Z plant outputs and measured disturbances associated with said plant inputs X and Y, universal controller means including mechanical linkage means operationally connected to said control means for independently effecting change in each of said X and Y plant inputs over a time t control cycle, said controller means having separate transducer means for measuring incremental changes in said X and Y plant inputs, computer means including input/output means operationally connected to said series of transducer means and said controller means, a central processing unit (CPU) that includes a control unit and general and program memories, for generating a present time t control code therefor as well as for predicting future conditions, based on measurements from both said series and said separate transducer means storable within said general memory in correct format and subsequent manipulations employing a series of instructions stored within said program memory, thereby providing for the systematic control of said Z plant outputs by manipulating said X and Y plant inputs, wherein said X inputs pursue optimization while Y inputs pursue stabilization in connection with themselves as well as said Z plant outputs said general memory also being capable of storing mapping logic for relating actual changes in the X and Y plant inputs plus measured disturbances to changes in the Z plant outputs in matrix format over a series of stepped changes 1 . . . N;

said general memory also being capable of storing a series of limiting set points for each of said Y plant inputs and for one or more of said plant outputs, as well as storing a series of gain matrices Bx, said gain matrices Bx consisting of a proportional gain B matrix associated with constrained stabilization, and a proportional gain Bo/r matrix associated with unconstrained stabilization, for use in synthesizing control of said refinery, chemical process or the like, on a proportional basis alone without need for optimal set points in connection with said X plant inputs, said CPU under control of said control unit in association with instructions from said program memory, generating an optimizing and stabilizing control (OSC) vector normalized to time t through a series of matrix-vector multiplications, said OSC vector including elements related to present time t elements from which said time t control code can be derived as well as future times associated with at least said Y plant inputs, and being of the form $$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

whereby said inputs X can be driven toward optimization without use of optimal set points while inputs Y can maintain stability as a function of incremental changes therein to thereby control plant outputs Z in linear proportion thereto.

65. System of claim 64 in which said OSC vector includes rows 1 . . . Y and 1 . . . X, respectively, of elements denoting incremental changes in inputs 1 . . . Y and 1 . . . X, said incremental changes of inputs 1 . . . Y being normalized from a prior in time cycle, as a function of time t, t+1 . . . t+M for stabilization purposes, said incremental changes for inputs 1 . . . X having magnitudes pre-tested on a criterion that provides a best-fit with respect to incremental changes in connection with inputs Y and outputs Z, whereby rapid optimization of the associated plant inputs X can occur without the need of steady-state conditions between control cycles.

66. System of claim 64 in said B gain matrix stored in said general memory of said computer means is of the form YN+X rows by ZM columns while said Bo/r matrix is of the form (Y+X)N rows by ZN columns.

67. System of claim 64 in which said CPU associated with generating said OSC vector, also generates a precursor SC vector prior in time in accordance with $$SC = Bx.PR$$

where SC comprises a single column, multi-row vector; Bx is a proportional gain matrix selected from a group comprising gain matrices B and Bo/r stored in said general memory, said CPU also selecting matrix B or Bo/r on the basis of constraint violations involving limiting set points in connection with said Y inputs above a selected level, and PR is a multi-row, single column prediction vector normalized to the time t.

68. System of claim 67 in which said PR vector comprises a column of predicted changes in each plant output at common time sample periods t+1 . . . t+N where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods t+1 . . . t+N using said previously stored plant model of incremental input vs. output operations, together with measured plant input changes.

69. System of claim 67 in which said precursor SC vector is determined by said CPU under control from instructions from said program memory (a) employing said B gain matrix in accordance with $$SC = B.PR \quad (1)$$

wherein rows A associated with the X plant inputs are constrained to zero and rows B associated with the Y plant inputs, reflect the condition in the rows A, each element of the rows A,B having a magnitude (M) equal to $$M = \Delta[Us + Uo]$$

where Us is an evaluated component related to stabilization and Uo is a component related to optimization, (b) evaluating the M's of rows B with respect to a set point limit therefor wherein (i) for such condition, Equation (1) is iterated using gain matrix Bo/r and after zeroing all Uo's, the OSC vector is formed thereby providing only stabilization action in connection with unconstrained conditions in rows A and B; and (ii) for a complementary condition, each of rows A is provided with a magnitude M=Uoi where i is a series of constants individually pre-tested in connection with a series of test SC vectors in accordance with $$Test\ SC(t+1) = I'.SC(t) + B.Col\ (A).Uoi$$

where

SC(t+1) is the test SC vector;

SC (t) is the present t SC vector; I' is a time identity matrix; B is the gain matrix stored in the general memory; Col(A) is column of a model matrix associated with the particular X input to be optimized; and Uoi are optimizing components selected from a group of constants comprising the desired magnitude and direction of optimization.

70. System of claim 69 in which said CPU pre-tests said Uoi components in connection with said X plant inputs prior to generation of said OSC vector by determining constraint violations in connection with one or more plant outputs Z.

71. System of claim 70 in which said the determination of constraint violations in connection with one or more plant outputs Z, focuses on the timing of occurrence of each violation.

72. System of claims 69, 70 or 71 further characterized by said input/output unit of said computer means being connect to separate signal encoding and decoding circuit means between said series and separate transducer means and said controller means for providing correct formatted signals at said controller means and at said general memory, whereby in its encoding state, said signal encoding and decoding circuit means generating control signals to said controller means, said control signals being derived from said present time t control code from present time t rows of said OSC vector and providing appropriate set points levels in said controller means associated with said X and Y plant inputs, said controller means correspondingly changing said flow control means in accordance with said set point levels in accordance therewith.

73. A computer-dominated constraint-dependent control system for integrating on-line optimization without destabilizing of a large-scale refinery, chemical plant or the like associated with a plurality of independently controlled manipulated plant inputs X, Y, and one or more controlled plant outputs Z dependent upon said manipulated plant inputs X, Y in which proportional control of the manipulated plant inputs X, Y can occur in a manner that allows rapid optimization of the X plant inputs wherein said X plant inputs are equal to at least two (2) in number undergoing simultaneous rapid optimization without the need of optimal set points, said system comprising a series of transducer means for measuring said Z plant outputs and changes in known disturbances associated with inputs X, Y, controller means including flow control means positioned within said refinery, chemical plant or the like for independently effecting incremental changes in said X and Y plant inputs, said controller means also including separate transducer means for measuring incremental changes in said X and Y plant inputs, computer means operationally connected to said series of transducer means and said controller means for generating a present time t control code for effecting incremental changes in said X and Y plant inputs on a systematic basis as well as for predicting future conditions associated therewith, thereby providing for the systematic control of said Z plant outputs, in linear proportion thereto, said at least two X inputs pursuing optimization without use of optimal set points within said controller means while Y inputs pursue stabilization in connection with themselves as well as said Z plant outputs using maximum set point limits, said computer means including a central processing unit (CPU), a program memory for controlling said CPU, and general memory means for storing general data related to the refinery, chemical plant or the like to be controlled, including mapping logic for relating changes in the X and Y plant inputs plus measured disturbances to changes in the Z plant outputs in matrix format over a series of stepped changes 1 ... N;

said CPU in association with said program memory and said general memory, generating an optimizing and stabilizing control (OSC) incremental vector normalized to time t as a result of a series of matrix-vector multiplications, said OSC vector including present time t elements as well as future time elements and being of a form from which said present t control code can be derived:

$$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

whereby said inputs X can be driven toward optimization without use of optimal set points while inputs Y can maintain stability as a function of incremental changes therein to control plant outputs Z in linear proportion thereto.

74. System of claim 73 in which said OSC vector includes rows 1 ... Y and 1 ... X, respectively, of elements denoting incremental changes in inputs 1 ... Y and 1 ... X, said incremental changes of inputs 1 ... Y being normalized from a prior in time cycle, as a function of time t, t+1 ... t+M for stabilization purposes, said incremental changes for inputs 1 ... X having magnitudes pre-tested on a criterion that provides a best-fit with respect to incremental changes in connection with inputs Y and outputs Z, whereby rapid optimization of the associated plant inputs X can occur without the need of steady-state conditions between control cycles.

75. System of claim 73 in which one of said X plant inputs comprises a characteristic associated with a product of said refinery, chemical plant or the like, for which maximization is sought during optimization.

76. System of claim 75 in which said characteristic for which maximization is sought during optimization, is withdrawal flow rate in connection with said product associated with said refinery, chemical plant or the like.

77. System of claim 73 in which another of said X plant inputs comprises a characteristic associated with energy conservation in connection with said refinery, chemical plant or the like for which minimization is sought during optimization.

78. A computer-dominated constraint-dependent control system for controlling a two-stage hydrocracking process including a first-stage reactor for reacting a feed and a hydrogen charge under hydrocracking conditions to produce a hydrocracked product and an unreacted hydrocracking effluent, a distillation column fractionator for producing a jet fuel fraction and a jet fuel fraction of said hydrocracked product as well as separating the hydrocracked product from said hydrocracking effluent, into recycle and reboil effluent, and a second stage reactor for reacting the recycled hydrocracking effluent also under hydrocracking conditions with addition hydrogen to produce additional hydrocracked product, said system integrating on-line optimization without destabilizing the process by controlling controlled outputs Z including particular set points associated with gasoline end point and jet fuel freeze point characteristics, recycle effluent nitrogen content and hydrocracking effluent level within said distillation column fractionator, via appropriate, proportional manipulation of a series of independently controlled manipulated plant inputs X, Y, said plant inputs Y being associated with temperatures within the first-stage and second-stage reactors, and withdrawal rate of the one of the jet fuel and gasoline fractions from the fractionator, while said plant inputs X being associated with at least the rapid optimization the withdrawal rate of the other of the jet fuel and gasoline fractions whereby optimization of said X plant inputs do not use optimal set points, said system comprising a series of flow control means within said two-stage hydrocracking process associated with said X and Y inputs for effecting incremental change, and a series of transducer means for measuring changes in said Z plant outputs and measured disturbance changes in connection with flow rates of said feed and recycle effluent, controller means including mechanical linkage means operationally connected to said flow control means associated with said X and Y plant inputs for independently effecting incremental change thereto, said controller means also including separate transducer means for measuring changes in said X and Y plant inputs and for establishing maximum set points for said X plant inputs only, computer means operationally connected to said series of transducer means and said controller means for generating a present time t control code as well as for predicting future conditions associated therewith, as a result of a series of matrix-vector multiplications, said control code providing for the systematic control of said Z plant outputs by manipulating said X and Y plant inputs on a proportional basis alone, said X inputs pursuing optimization, said Y inputs pursuing stabilization in connection with themselves as well as said Z plant outputs said computer means including a central processing unit (CPU), a program memory for controlling said CPU, and general memory means for storing general data related to said two-stage hydrocracking process, including mapping logic for relating changes in the X and Y plant inputs plus measured changes in the feed and recycle rates to changes in the Z plant outputs in matrix format over a series of stepped changes 1 . . . N;

said general memory means also storing a series of limiting set points for each of said Y plant inputs and for one or more of said plant outputs Z, said CPU in association with said program memory and said general memory, generating an optimizing and stabilizing control (OSC) vector normalized to time t for control purpose, but including incremental future changes in at least Y plant inputs, said OSC vector including present t elements from which said time t control code can be derived and being of a form $$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said hydrocracking process, whereby said inputs X can be driven toward optimization without use of optimal set points while inputs Y can maintain stability as a function of incremental changes therein to control said plant outputs Z in linear proportion thereto.

79. System of claim 78 in which said OSC vector includes rows 1 . . . Y and 1 . . . X, respectively, of elements denoting incremental changes in inputs 1 . . . Y and 1 . . . X, said incremental changes of inputs 1 . . . Y being normalized from a prior in time cycle, as a function of time t, t+1 . . . t+M for stabilization purposes, said incremental changes for inputs 1 . . . X being normalized from a prior in time cycle as a function present time t only, and having magnitudes pre-tested on a criterion that provides a bestfit with respect to incremental changes in connection with inputs Y and outputs Z whereby rapid optimization of the associated plant inputs X can occur without the need of steady-state conditions between control cycles.

80. System of claim 78 in which said optimized X plant inputs relate to (i) withdrawal rate of the jet fuel fraction from the distillation column fractionator, and (ii) flow rate of fuel to a fractionator reboiler furnace heating said reboiler effluent.

81. System of claim 78 in which Z plant outputs exceed the number of plant inputs X, Y.

82. System of claim 78 in which the mapping logic stored in said general memory means is obtained by modeling the two-stage hydrocracking process prior to actual operations, by introducing test changes in said X, Y plant inputs and in said measured disturbances in connection with said feed and recycle flow rates, as stepped changes and measuring for each step change over a sample period 1, 2 . . . N the changes in said Z plant outputs, wherein N is at least equal to the slowest step response of any plant output Z to a change in plant input X,Y and the measured disturbances relating to flow rates of the feed and the recycle effluent.

83. System of claim 82 in which magnitude of each sample interval $\Delta t$ in the total sampling interval 1, 2 . . . N associated with said mapping logic stored in said computer means being adequate to sample the fastest step response of any plant output Z to a change in plant input X,Y and measured disturbances.

84. System of claim 78 in which said CPU for generating said OSC vector, also generates a precursor SC vector prior in time to said OSC vector in accordance with $$SC = Bx.PR$$

where SC comprises a single column, multi-row vector; Bx is a proportional gain matrix of a group comprising gain matrices B and Bo/r stored in said memory, selection of matrix B or Bo/r being on the basis of constraint violations involving limiting set points in connection with said Y inputs above a selected level, and PR is a multi-row, single column prediction vector normalized to the time t.

85. System of claim 84 in which said PR vector comprises a column of predicted changes in each plant output at common time sample periods $t+1 \ldots t+N$ where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods $t+1 \ldots t+N$ using said previously stored plant model of incremental input vs. output operations, together with measured plant input changes.

86. System of claim 84 in which said precursor SC vector is generated by said CPU
(a) employing said B gain matrix in accordance with $$SC = B.PR \qquad (1)$$

wherein rows A associated with the X plant inputs are constrained to zero and rows B associated with the Y plant inputs comprises incremental elements reflecting such constraint condition in the rows A, each element of the rows A,B having a magnitude (M) equal to $$M = \Delta[Us + Uo]$$

where Us is an evaluated component related to stabilization and Uo is a component related to optimization,
(b) evaluating the M's of rows B with respect to a set point limit therefor to determine violations, if any, wherein (i) for such condition, Equation (1) is iterated using gain matrix Bo/r and after zeroing all Uo's, the OSC vector is formed so as to provide only stabilization action in connection with unconstrained conditions in rows A and B; and (ii) for a complementary condition with respect to the M's of rows B, each element of rows A is provided with a magnitude M = Uoi where i is a series of constants individually pre-tested in connection with a series of test SC vectors generated in accordance with $$SC(t+1) = \Gamma.SC(t) + B.Col(A).Uoi$$

where
SC(t+1) is the test SC vector;
SC (t) is the prior time t SC vector; $\Gamma$ is a time identity matrix; B is the gain matrix stored in the memory; Col(A) is column of a model matrix associated with the particular X input to be optimized; and Uoi are optimizing components selected from a group of constants comprising the desired magnitude and direction of optimization.

87. System of claim 86 in which said CPU pre-tests said Uoi components in connection with said X plant inputs prior to generation of said OSC vector by determining the occurrence of set points violations associated with one or more the plant outputs Z.

88. System of claims 85, 86 or 87 in which said computer means is further characterized by input/output means and signal-converting and enhancing means attached thereto for decoding measurements from said series and separate transducer means and encoding said controller means with correct control signals for said controller means, said control signals being derived from said present time t control code associated with the present time t rows of said OSC vector and providing correct set point levels in said controller means associated with said X and Y plant inputs wherein said flow controller means are activated so as to effect incremental changes associated with said inputs.

89. A computer-dominated constraint-dependent control system for for controlling a two-stage hydrocracking process including a first-stage reactor for reacting a feed and a hydrogen charge under hydrocracking conditions to produce a hydrocracked product and an unreacted effluent, a distillation column fractionator for providing gasoline and jet fuel fractions from the hydrocracked product as well as separating said hydrocracked product from said unreacted effluent into recycle and reboil effluent, and a second stage reactor for reacting the recycle effluent also under hydrocracking conditions with addition hydrogen to produce additional hydrocracked product, said system integrating on-line optimization without destabilizing the process by controlling controlled outputs Z including particular set points associated with gasoline end point temperature, jet fuel freeze point temperature, recycle nitrogen content and hydrocracking effluent level within said distillation column fractionator, via appropriate, proportional manipulation of a series of independently controlled manipulated plant inputs Y associated with temperatures within the first-stage and second-stage reactors, and withdrawal rate of one of the gasoline and jet fuel fractions from the fractionator, while optimizing other plant inputs X in accordance with a series of pretested optimizing control components, Uo, in a manner that allows them to be driven toward optimization under constrained conditions, whereby optimization of said X plant inputs can be accelerated, deaccelerated, zeroed, or reversed without use of optimal set points, said Y plant inputs being reserved for stabilization in connection with maximum set points established for themselves as well as the Z plant outputs, incremental changes of said Y plant inputs being essentially defined by a series of stabilizing control components, Us, reflecting constraints associated with the X plant inputs but bringing about stabilization employing only changes in the Y plant inputs, irrespective of disturbance changes in the process associated with changes in feed and recycle flow rates, said system comprising
  a series of flow control means within said two-stage hydrocracking process associated with said X and Y inputs for effecting incremental change, and a series of transducer means for measuring changes in said Z plant outputs and measured disturbance changes in connection with said feed and recycle flow rates, controller means including mechanical linkage means operationally connected to said flow control means associated with said X and Y plant inputs for independently effecting incremental change thereto, said controller means also including separate transducer means for measuring changes in said X and Y plant inputs and for establishing maximum set points for said X plant inputs only, computer means including input/output means operationally connected to said series of transducer means and said controller means and a central processing unit (CPU) that includes a control unit and general and program memories for generating a present time t control code therefor as well as for predicting future conditions, based on measurements from both said series and said separate transducer means storable within said general memory in correct format and operatable on employing a series of instructions stored within said program memory, thereby providing for the systematic control of said Z plant outputs by manipulating said X and Y plant inputs, wherein said X inputs pursue optimization while Y inputs pursue stabilization in connection with themselves as well as said Z plant outputs, said general memory also being capable of storing mapping logic for relating actual changes in the X and Y plant inputs plus changes in the measured disturbances in connection with feed and recycle flow rates, to changes in the Z plant outputs in matrix format over a series of stepped changes 1 . . . N; said general memory also being capable of storing a series of limiting set points for each of said Y plant inputs and for one or more of said plant outputs, as well as storing a series of gain matrices Bx, said gain matrices Bx consisting of a proportional gain B matrix associated with constrained stabilization, and a proportional gain Bo/r matrix associated with unconstrained stabilization, for use in synthesizing control of said process, on a proportional basis alone without need for optimal set points in connection with said X plant inputs, said CPU under control of said control unit in association with instructions from said program memory, generating an optimizing and stabilizing control (OSC) vector normalized to time t but including incremental future changes in at least Y plant inputs, said OSC vector including present t elements from which said time t control code can be derived and being of the form $$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said process, whereby said inputs X can be driven toward optimization without use of optimal set points while inputs Y can maintain stability as a function of incremental changes therein to control said plant outputs Z in linear proportion thereto.

90. System of claim 89 in which said OSC vector includes rows 1 . . . Y and 1 . . . X, respectively, of elements denoting incremental changes in inputs 1 . . . Y and 1 . . . X, said incremental changes of inputs 1 . . . Y being normalized from a prior in time cycle, as a function of time t, t+1 . . . t+M for stabilization purposes, said incremental changes for inputs 1 . . . X having magnitudes pre-tested on a criterion that provides a best-fit with respect to incremental changes in connection with inputs Y and outputs Z, whereby rapid optimization of the associated plant inputs X can occur without the need of steady-state conditions between control cycles.

91. System of claim 90 in which the X plant inputs controlled in accordance with said OSC vector include incremental present time t changes for the withdrawal rate of of the jet fuel fraction for maximization purposes, and incremental t changes for changing fuel flow to the fractionator reboiler furnace heating the reboil effluent, for energy conservation purposes.

92. System of claim 89 in which the mapping logic stored in said general memory is obtained by modeling the process prior to actual operations, by introducing tests changes in said X, Y plant inputs and measured disturbances in connection with the feed and recycle flow rates, as stepped changes and measuring for each step change over a sample period 1, 2 . . . N, the changes in said Z plant outputs, wherein N is at least equal to the slowest step response of any plant output Z to a change in plant input X,Y and measured disturbances.

93. System of claim 92 in which magnitude of each sample interval $\Delta t$ in the total sampling interval 1, 2 . . . N associated with said mapping logic stored in said computer means being adequate to sample the fastest step response of any plant output Z to a change in plant input X,Y and measured disturbances.

94. System of claim 89 in which said CPU associated with generating said OSC vector, also generates a precursor SC vector prior in time in accordance with SC=Bx.PR where SC comprises a single column, multi-row vector; Bx is a proportional gain matrix comprising gain matrices B and Bo/r stored in said general memory, said CPU also selecting matrix B or Bo/r on the basis of constraint violations involving said set points in connection with said Y inputs above a selected level, and PR is a multirow, single column prediction vector normalized to the time t.

95. System of claim 94 in which said PR vector comprises a column of predicted changes in each plant output at common time sample periods $t+1 \ldots t+N$ where N is a final prediction horizon for the plant output changes, said changes in plant outputs of said PR vector being the sum of a series of vector-matrix terms which relate the the effect of past plant input changes including changes in plant inputs and measured disturbances, on future changes in plant outputs at the periods $t+1 \ldots t+N$ using said previously stored plant model of incremental input vs. output operations, together with measured plant input changes.

96. System of claim 94 in which said precursor SC vector is determined by said CPU under control from instructions from said program memory
   (a) employing said B gain matrix to generate an initial SC vector in accordance with $$SC = B.PR \qquad (1)$$

wherein rows A associated with the X plant inputs are constrained to zero and rows B associated with the Y plant inputs, reflect such constraint condition in the rows A, each element of the rows A,B having a magnitude (M) equal to $$M = \Delta[U_s + U_o]$$

where Us is an evaluated component related to stabilization and Uo is a component related to optimization,
   (b) evaluating the M's of rows B with respect to a set point limits therefor wherein (i) for such condition, Equation (1) is iterated using gain matrix Bo/r and after zeroing all Uo's, the OSC vector is formed thereby providing only stabilization action in connection with unconstrained conditions in rows A and B; and (ii) for a complementary condition, each element of rows A is provided with a magnitude $M = U_{oi}$ where i is a series of constants individually pre-tested in connection with a series of test SC vectors in accordance with $$SC(t+1) = I'.SC(t) + B.Col\,(A).U_{oi}$$

where
   $SC(t+1)$ is the test SC vector;
   SC (t) is the prior time SC vector; I' is a time identity matrix; B is the gain matrix stored in the general memory; Col(A) is column of a model matrix associated with the particular X input to be optimized; and $U_{oi}$ are optimizing components selected from a group of constants comprising the desired magnitude and direction of optimization.

97. System of claim 96 in which said CPU pre-tests said $U_{oi}$ components in connection with said X plant inputs prior to generation of said OSC vector based in part on determining time of occurrence of said violations.

98. System of claims 95, 96 or 97 further characterized by said input/output unit of said computer means being connect to separate signal encoding and decoding circuit means between said series and separate transducer means and said controller means for providing correct formatted signals at said controller means and at said general memory, whereby in its encoding state, said signal encoding and decoding circuit means generating control signals to said controller means, said control signals being derived from said present time t control code from present time t rows of said OSC vector and providing appropriate set points levels in said controller means associated with said X and Y plant inputs, said controller means correspondingly changing said flow control means in accordance with said set point levels in accordance therewith.

99. A computer-dominated constraint-dependent control system for a large-scale hydrocracking process that includes first-stage and second stage hydrocracking reactor means for producing a hydrocracked product and means for providing a gasoline fraction and a jet fuel fraction of said hydrocracked product as well as separating said hydrocracked product from a hydrocracking effluent so as to produce a recycle portion and a reboil portion, said system integrating simultaneous on-line optimization of at least two plant inputs X without using optimal set points in connection therewith, one of said X plant inputs being related to a characteristic associated with incremental change in one of said gasoline and jet fuel fractions and the other being related to incremental change in a characteristic associated with said reboil portion of said hydrocracking effluent, said system also stabilizing controlled plant outputs Z of the process including gasoline end point temperature, jet freeze point temperature, recycle hydrocracking effluent level and nitrogen content of the recycled hydrocracking effluent, via manipulating remaining plant inputs Y using a present time t control code generated from a series of matrix-vector multiplications, said plant inputs Y being reserved for stabilization, and including incremental changes in connection with temperatures within said first-stage and second-stage reactor means, and a characteristic associated with other of said gasoline and jet fuel fractions,
   controller means including flow control means positioned within said process for independently effecting incremental changes in said X and Y plant inputs, said controller means also including separate transducer means for measuring incremental changes in said X and Y plant inputs,
   computer means operationally connected to said series of transducer means and said controller means for generating a present time t control code for effecting incremental changes in said X and Y plant inputs on a systematic basis as well as for predicting future conditions associated therewith, thereby providing for improved control of said Z plant outputs, said at least two X inputs pursuing optimization without use of optimal set points within said controller means, said Y inputs pursuing stabilization in connection with themselves as well as said Z plant outputs using maximum set point limits integral therewith,
   said computer means including a central processing unit (CPU), a program memory for controlling said CPU, and general memory means for storing general data related to said process including mapping logic for relating changes in the X and Y plant inputs plus measured disturbances to changes in the Z plant outputs in matrix format over a series of stepped changes 1 . . . N;

said CPU in association with said program memory and said general memory, generating an optimizing and stabilizing control (OSC) incremental vector normalized to time t, as a product of a series of matrix-vector multiplications with said CPU, said OSC vector also including both incremental future changes in at least Y plant inputs, as well as present t elements from which said time t control code can be derived, and being of a form $$OCS = \begin{bmatrix} \Delta Y_1(t) \\ \Delta Y_1(t+1) \\ \vdots \\ \Delta Y_1(t+M) \\ \Delta Y_2(t) \\ \vdots \\ \Delta Y_2(t+M) \\ \Delta Y_3(t) \\ \vdots \\ \Delta Y(t+M) \\ \Delta X_1(t) \\ \Delta X_2(t) \\ \vdots \\ \Delta X(t) \end{bmatrix}$$

where M is a limit in future time for controlling said process, whereby said inputs X can be driven toward optimization without use of optimal set points while inputs Y can maintain stability as a function of incremental changes therein to control said plant outputs Z in linear proportion thereto.

100. System of claim 99 in which said OSC vector includes a series of rows 1 . . . Y and 1 . . . X, respectively, of elements corresponding to incremental changes for plant inputs 1 . . . Y reserved for stabilization, and for plant inputs 1 . . . X reserved for optimization, said incremental changes for inputs 1 . . . Y being normalized with respect to incremental changes from prior in time changes associated with present time t as well as future times t+1 . . . t+M for stabilization purposes, said incremental changes for inputs 1 . . . X having magnitudes have been selected on pretest criterion after a precursor stabilizing control (SC) vector has been generated with rows 1 . . . X constrained, whereby optimization of the associated plant inputs X is systematically provided as outputs Z remain stabilized without the introduction of optimal set points in connection therewith, as well as without the need of steady-state conditions between control cycles.

101. System of claim 100 in which Z plant outputs exceed the number of plant inputs X,Y.

102. System of claim 100 in which said one of said X plant inputs for optimization, is the withdrawal flow rate of the jet fuel fraction from the hydrocracking process for which maximization thereof, is sought.

103. System of claim 100 in which the other of said said X plant inputs for optimization, is the fuel flow to a reboil furnace for heating said reboil effluent for energy conservation purposes.

* * * * *